US008717686B2

(12) United States Patent
Yamamoto et al.

(10) Patent No.: US 8,717,686 B2
(45) Date of Patent: May 6, 2014

(54) OPTICAL SYSTEM, OPTICAL APPARATUS AND OPTICAL SYSTEM MANUFACTURING METHOD

(75) Inventors: Hiroshi Yamamoto, Kawasaki (JP); Issei Tanaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 104 days.

(21) Appl. No.: 13/299,524

(22) Filed: Nov. 18, 2011

(65) Prior Publication Data

US 2012/0127594 A1     May 24, 2012

(30) Foreign Application Priority Data

| Nov. 22, 2010 | (JP) | 2010-259967 |
| Nov. 22, 2010 | (JP) | 2010-259968 |
| Nov. 22, 2010 | (JP) | 2010-259969 |
| Oct. 7, 2011 | (JP) | 2011-223412 |
| Oct. 7, 2011 | (JP) | 2011-223413 |
| Oct. 7, 2011 | (JP) | 2011-223414 |

(51) Int. Cl.
*G02B 13/04* (2006.01)
*G02B 9/04* (2006.01)

(52) U.S. Cl.
USPC ............ 359/749; 359/793; 359/750; 359/751

(58) Field of Classification Search
CPC ................ G02B 13/04; G02B 13/18
USPC ......................... 359/749–753, 793
See application file for complete search history.

(56) References Cited

U.S. PATENT DOCUMENTS

| 7,336,421 B2 * | 2/2008 | Tanaka .......................... 359/581 |
| 7,715,117 B2 * | 5/2010 | Hatada .......................... 359/749 |

FOREIGN PATENT DOCUMENTS

| JP | 59-216114 A | 12/1984 |
| JP | 04-050910 A | 2/1992 |
| JP | 2004-245967 A | 9/1994 |
| JP | 08-110467 A | 4/1996 |
| JP | 09-113800 A | 5/1997 |
| JP | 11-125767 A | 5/1999 |
| JP | 11-211978 A | 8/1999 |
| JP | 2000-356704 A | 12/2000 |
| JP | 2001-174700 A | 6/2001 |
| JP | 2008-145586 A | 6/2008 |
| JP | 2010-102056 A | 5/2010 |
| JP | 2011-102871 A | 5/2011 |
| JP | 2011-150196 A | 8/2011 |
| JP | 2011-227351 A | 11/2011 |

\* cited by examiner

*Primary Examiner* — David N Spector
(74) *Attorney, Agent, or Firm* — Miles & Stockbridge P.C.

(57) ABSTRACT

An optical system WL has, in order from an object, a first lens group G1 having negative refractive power and a second lens group G2 having positive refractive power, wherein the first lens group G1 is fixed and the second lens group G2 moves upon focusing from an object at infinity to an object at a finite distance, and the second lens group G2 is formed of a front group G2a located closer to the object than an aperture stop S disposed in the second lens group G2, and a rear group G2b located closer to an image than the aperture stop S.

68 Claims, 33 Drawing Sheets

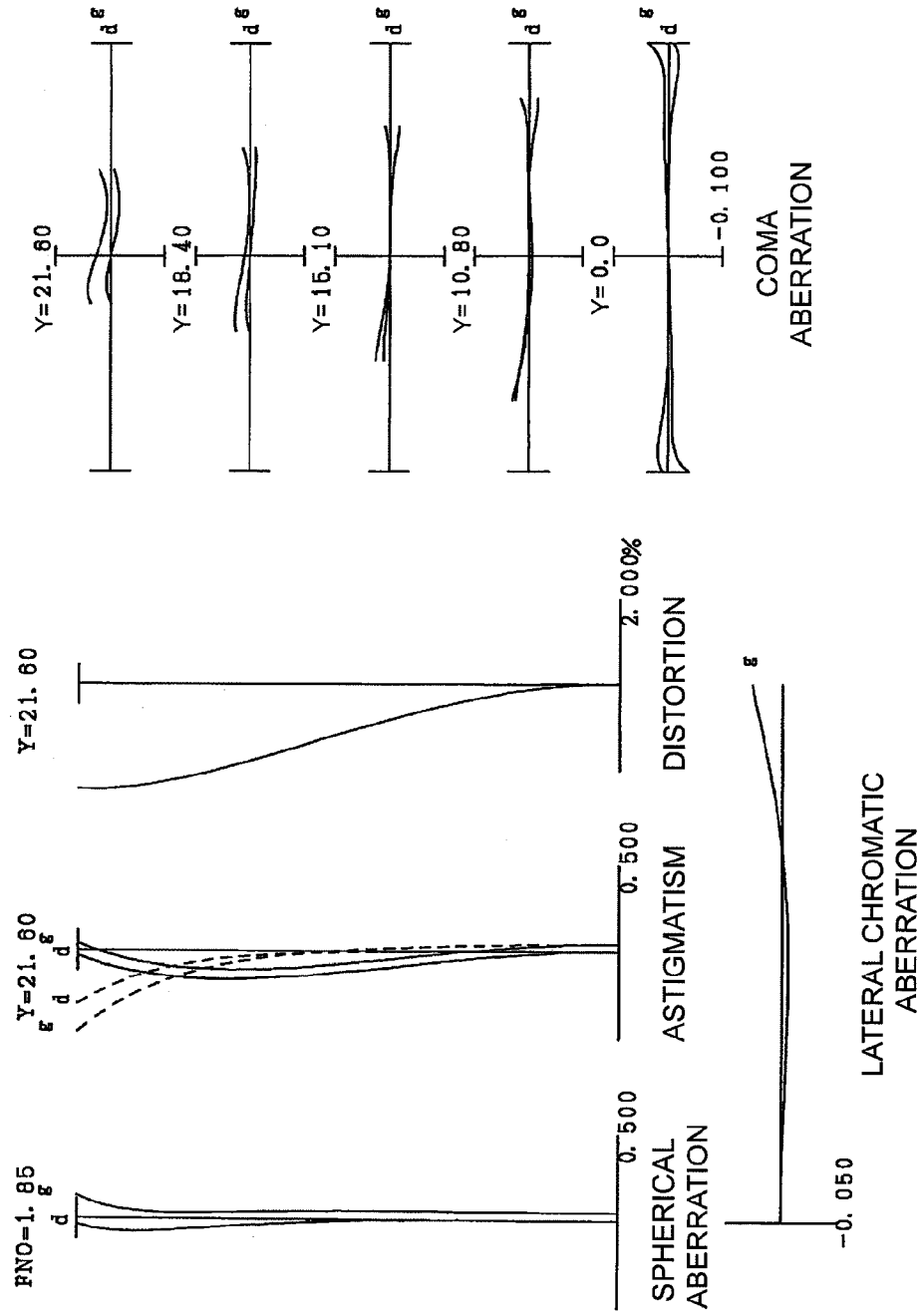

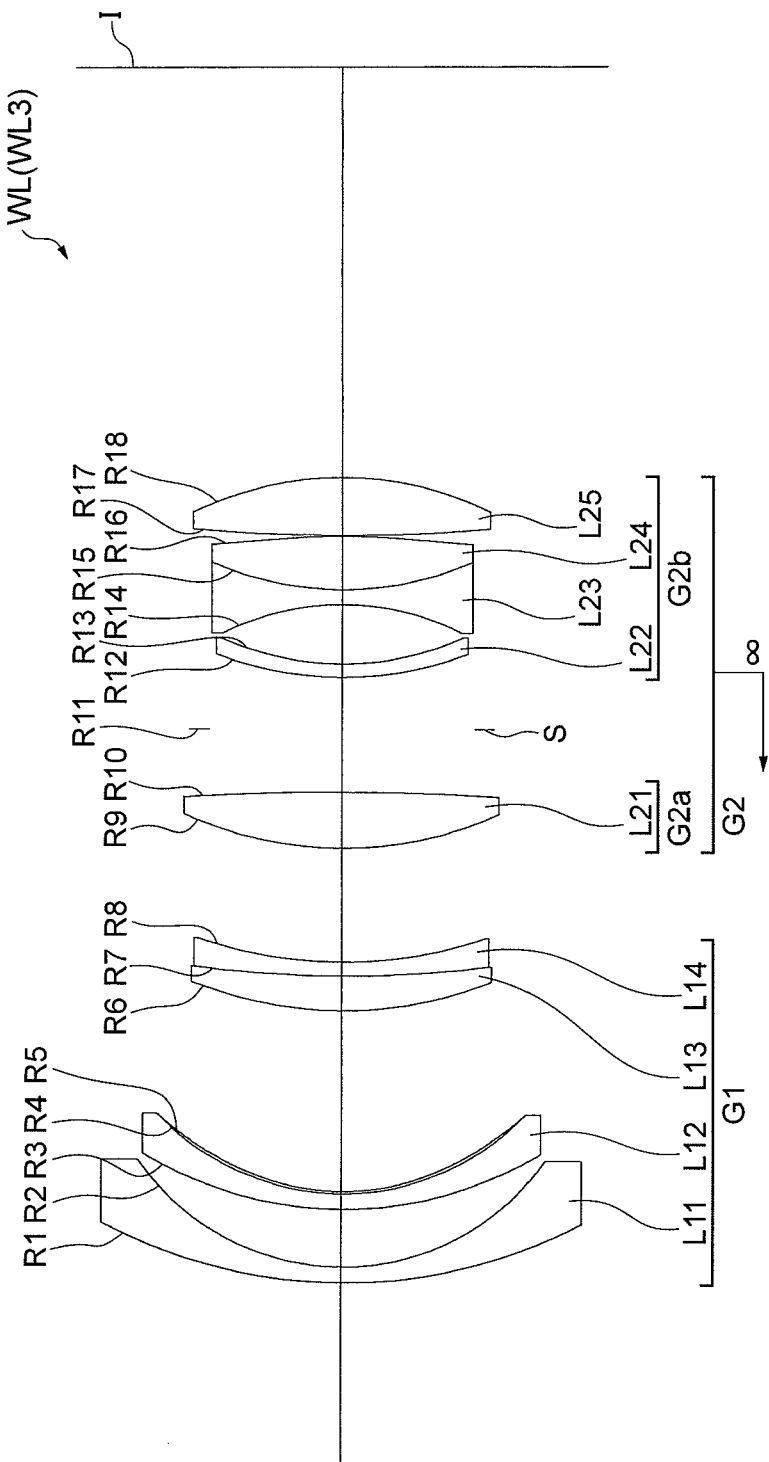

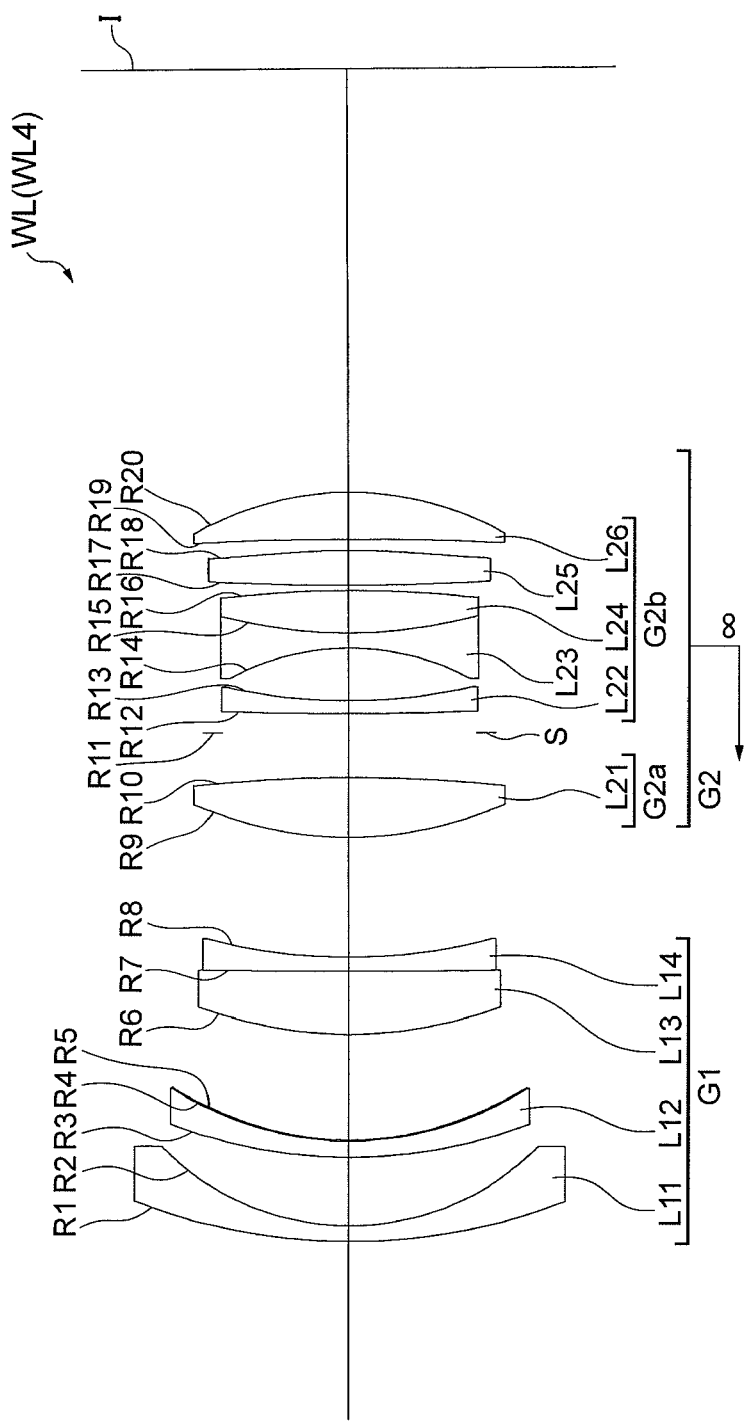

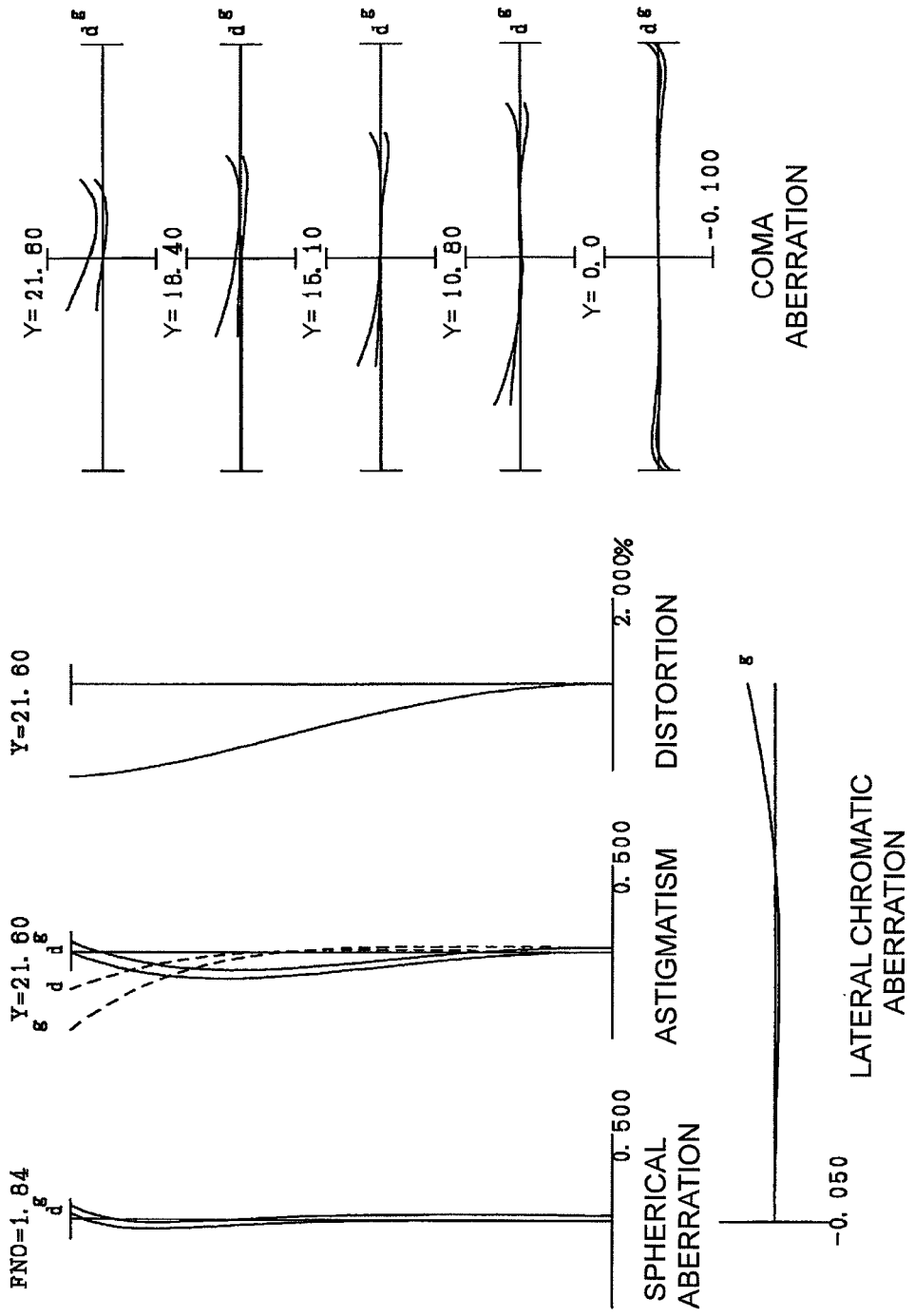

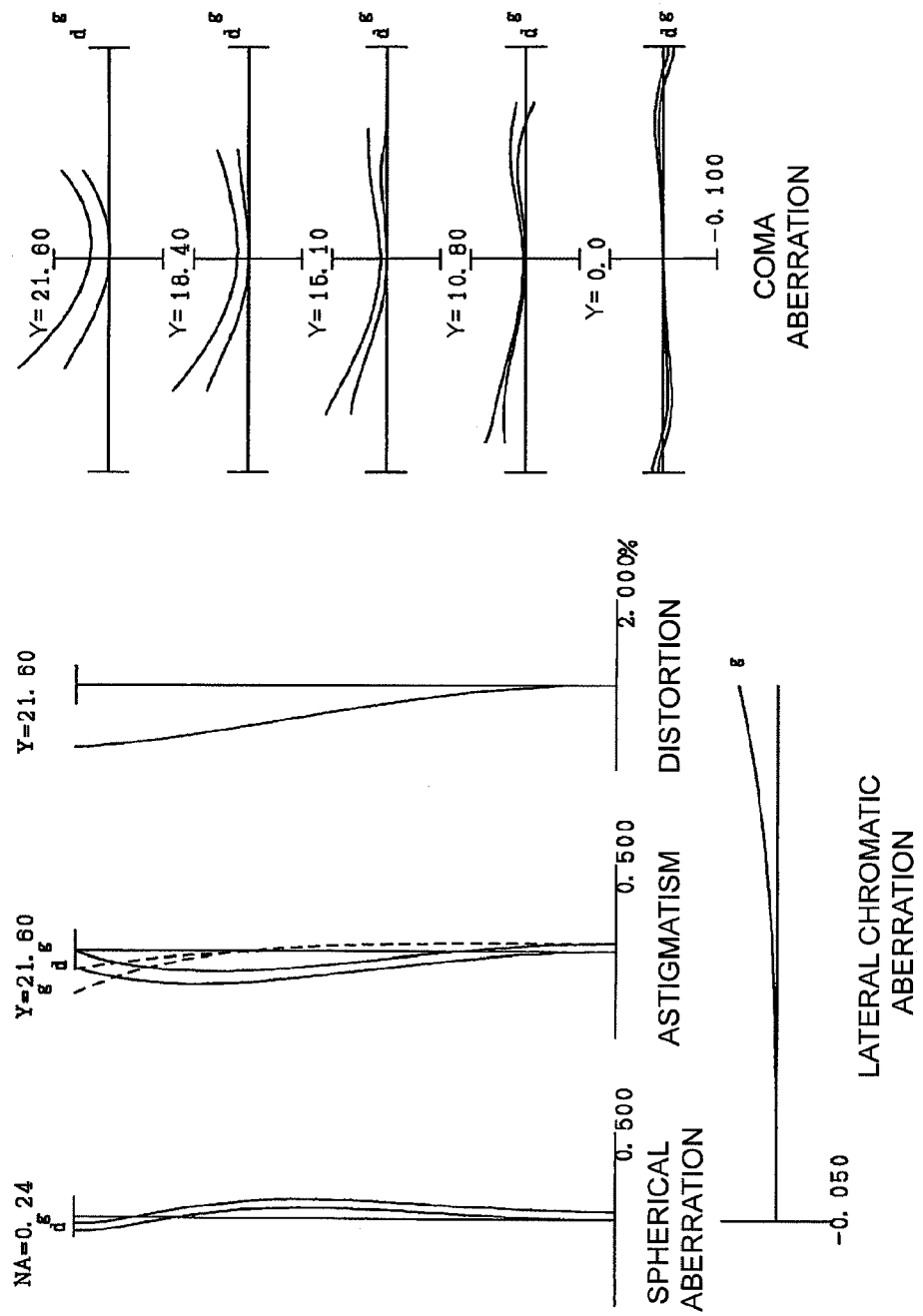

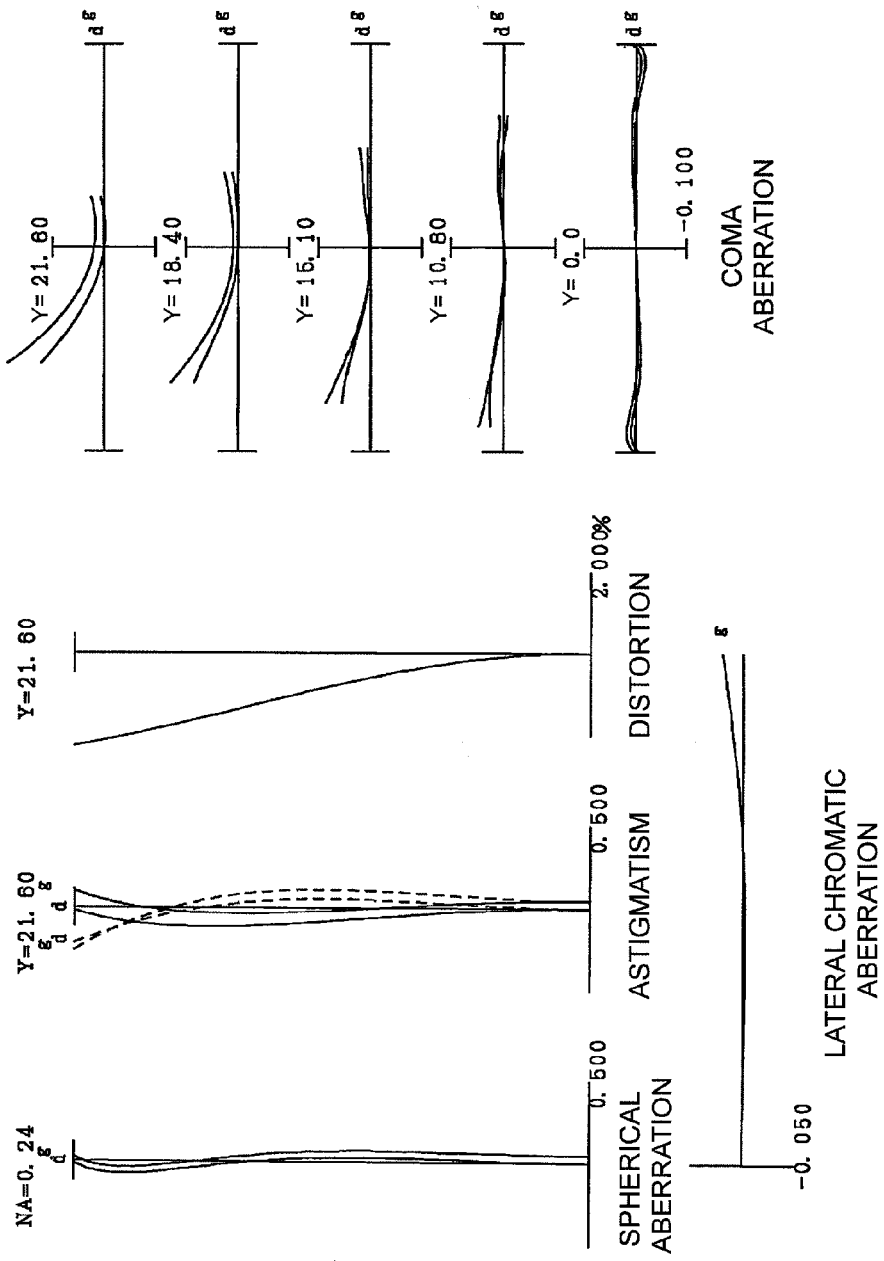

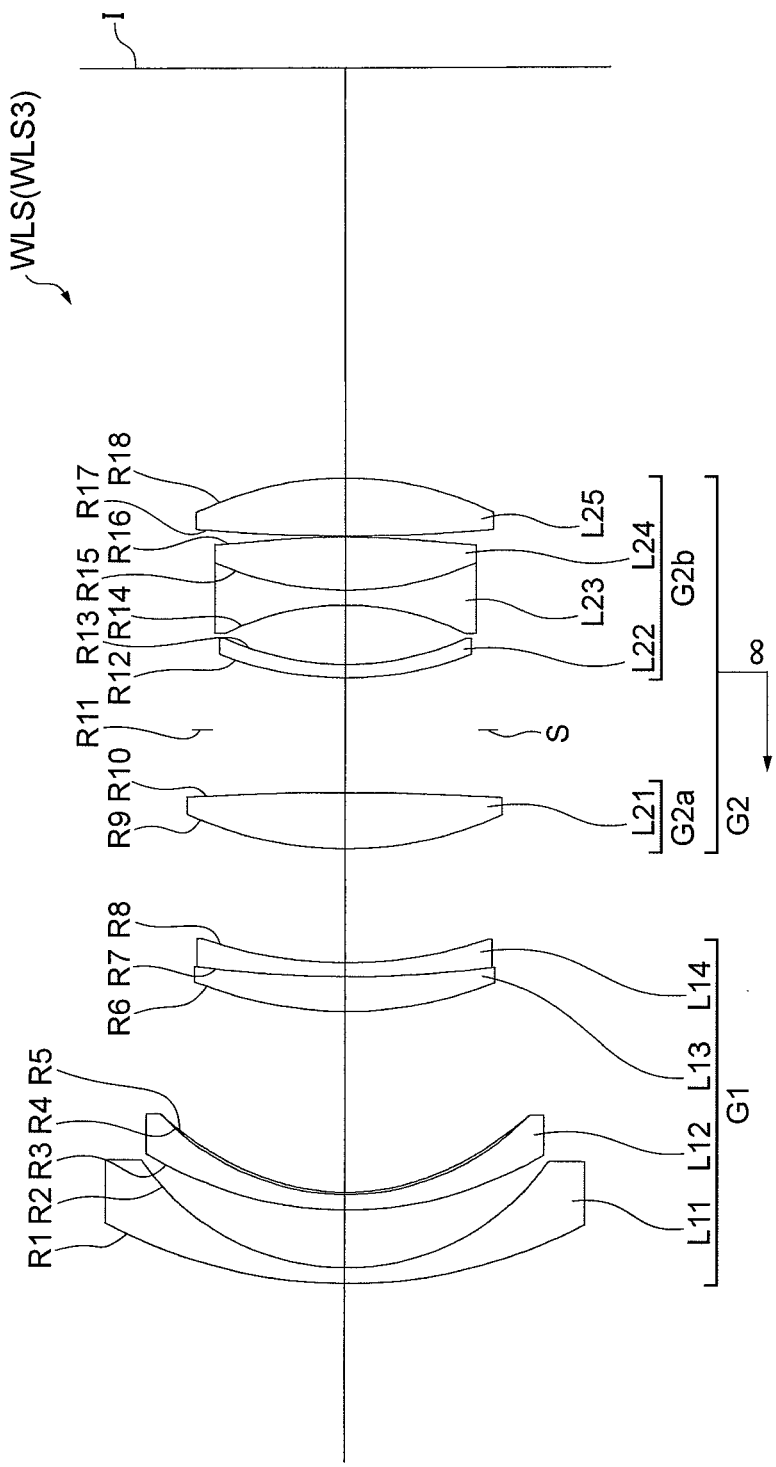

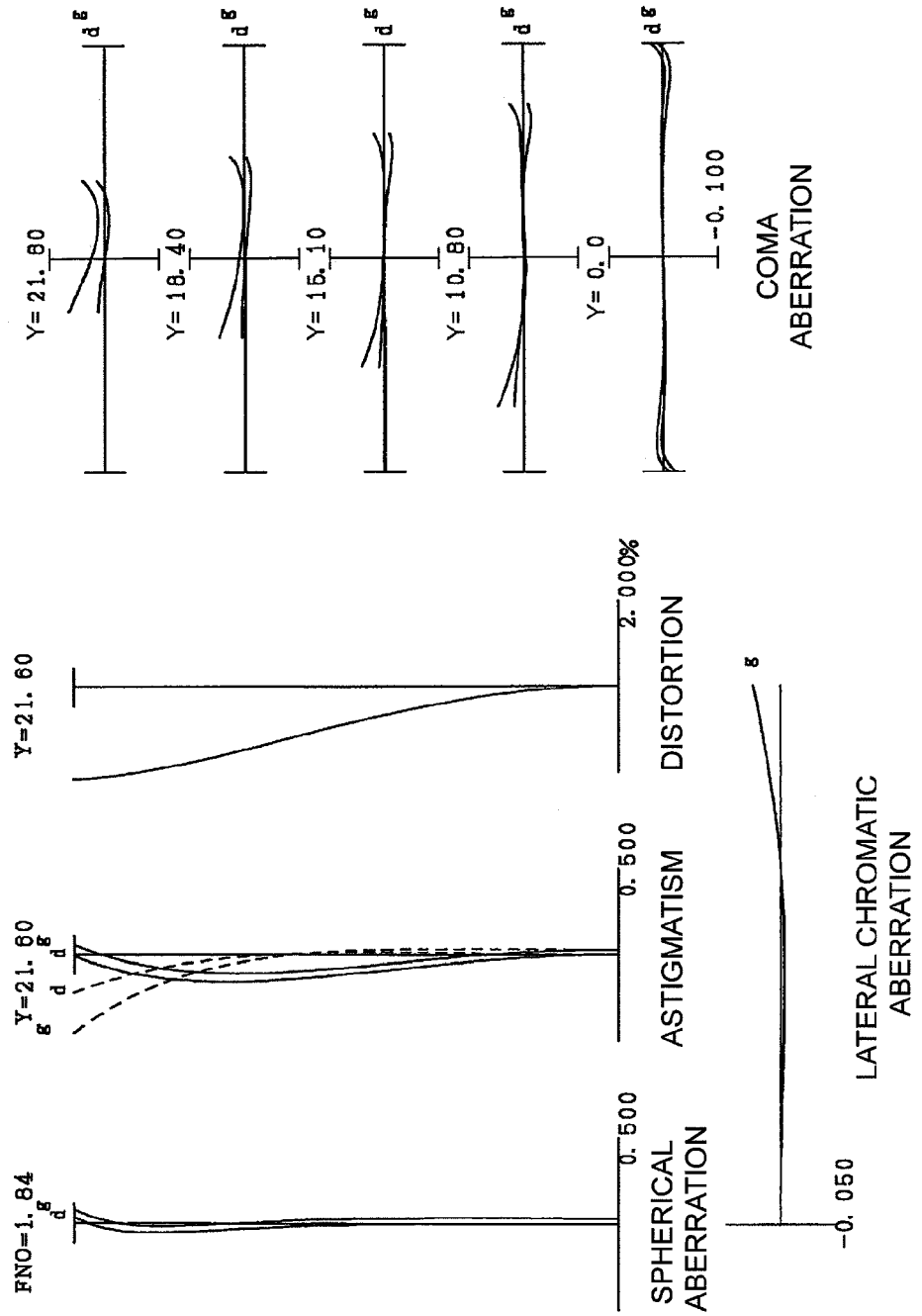

OPTICAL SYSTEM, OPTICAL APPARATUS AND OPTICAL SYSTEM MANUFACTURING METHOD

RELATED APPLICATIONS

This invention claims the benefit of Japanese Patent Application Nos. 2010-259967, 2010-259968, 2010-259969, 2011-223412, 2011-223413 and 2011-223414 which are hereby incorporated by reference.

TECHNICAL FIELD

The present invention relates to an optical system, an optical apparatus and an optical system manufacturing method.

TECHNICAL BACKGROUND

Various wide angle lenses suitable for a photographic camera, an electronic still camera and a video camera have been proposed (e.g. Japanese Laid-Open Patent Publication No. H11-211978(A)). For these wide angle lenses, demand not only for aberration correction performance but also for removing ghosts and flares, which are some of the factors to diminish optical performance, is intensifying. Hence higher performance is demanded for an antireflection coating which is performed on a lens surface, and in order to meet this demand, multilayer film design technology and multilayer film forming technology are continuously progressing (e.g. Japanese Laid-Open Patent Publication No. 2000-356704 (A)).

SUMMARY OF THE INVENTION

A problem of a conventional wide angle lens however is that good optical performance has not yet been implemented. Another problem is that reflected light, causing ghosts and flares, is easily generated on the optical surface of a wide angle lens.

With the foregoing in view, it is an object of the present invention to provide an optical system and an optical apparatus having good optical performance, and a method for manufacturing the optical system. It is another object of the present invention to provide an optical system and an optical apparatus having good optical performance with fewer ghosts and flares, and a method for manufacturing the optical system.

To achieve the above objects, a first optical system according to the present invention is an optical system comprising: in order from an object, a first lens group having negative refractive power; and a second lens group having positive refractive power, wherein the first lens group is fixed and the second lens group moves upon focusing from an object at infinity to an object at a finite distance, the second lens group is formed of a front group located closer to the object than a aperture stop disposed in the second lens group, and a rear group located closer to an image than the aperture stop, and the following conditional expression is satisfied: $0.10 < f2a/f2b < 1.00$, where $f2a$ denotes a focal length of the front group of the second lens group, and $f2b$ denotes a focal length of the rear group of the second lens group.

In the above optical system, it is preferable that the following conditional expression is satisfied: $0.10 < (-f1)/f2 < 2.50$, where $f1$ denotes a focal length of the first lens group, and $f2$ denotes a focal length of the second lens group.

In the above optical system, it is preferable that the following conditional expression is satisfied $0.10 < f2a/f < 1.70$, where $f$ denotes a focal length of the optical system upon focusing on infinity.

In the above optical system, it is preferable that the following conditional expression is satisfied: $0.20 < f2/f < 1.55$, where $f2$ denotes a focal length of the second lens group, and $f$ denotes a focal length of the optical system upon focusing on infinity.

A second optical system according to the present invention is an optical system comprising, in order from an object: a first lens group having negative refractive power; and a second lens group having positive refractive power, wherein the first lens group is fixed and the second lens group moves upon focusing from an object at infinity to an object at a finite distance, and the following conditional expressions being satisfied respectively: $0.10 < (-f1)/f2 < 2.50$ and $0.20 < f2/f < 1.55$, where $f1$ denotes a focal length of the first lens group, $f2$ denotes a focal length of the second lens group, and $f$ denotes a focal length of the optical system upon focusing on infinity.

In the above optical system, it is preferable that the second lens group further comprises a front group located closer to the object than a aperture stop disposed in the second lens group, and a rear group located closer to an image than the aperture stop, and the following conditional expression is satisfied: $0.10 < f2a/f2b < 1.00$, where $f2a$ denotes a focal length of the front group of the second lens group, and $f2b$ denotes a focal length of the rear group of the second lens group.

In the above optical system, it is preferable that the second lens group further comprises a front group located closer to the object than a aperture stop disposed in the second lens group, and a rear group located closer to an image than the aperture stop, and the following conditional expression is satisfied: $0.10 < f2a/f < 1.70$, where $f2a$ denotes a focal length of the front group of the second lens group.

A third optical system according to the present invention is an optical system comprising: in order from an object, a first lens group having negative refractive power; and a second lens group having positive refractive power, wherein the first lens group is fixed and the second lens group moves upon focusing from an object at infinity to an object at a finite distance, the second lens group is formed of a front group located closer to the object than a aperture stop disposed in the second lens group, and a rear group located closer to an image than the aperture stop, and the following conditional expression is satisfied: $0.10 < f2a/f < 1.70$, where $f2a$ denotes a focal length of the front group of the second lens group, and $f$ denotes a focal length of the optical system upon focusing on infinity.

In the above optical system, it is preferable that the following conditional expression is satisfied: $0.10 < f2a/f2b < 1.00$, where $f2b$ denotes a focal length of the rear group of the second lens group.

In the above optical system, it is preferable that the following conditional expression is satisfied: $0.10 < (-f1)/f2 < 2.50$, where $f1$ denotes a focal length of the first lens group, and $f2$ denotes a focal length of the second lens group.

In the above optical system, it is preferable that the following conditional expression is satisfied: $0.20 < f2/f < 1.55$, where $f2$ denotes a focal length of the second lens group.

In each of the above optical systems, it is preferable that the rear group of the second lens group has at least one aspherical lens.

In each of the above optical systems, it is preferable that the rear group of the second lens group has two positive lenses disposed in order from the image.

In each of the above optical systems, it is preferable that the following conditional expression is satisfied: $(-f1)/f < 5.0$.

In each of the above optical systems, it is preferable that the first lens group has two negative lenses disposed in order from the object.

In each of the above optical systems, it is preferable that the first lens group has at least one aspherical lens.

In each of the above optical systems, it is preferable that the first lens group has a positive lens, and the following conditional expressions are satisfied respectively: $n1p>1.800$ and $v1p>28.00$, where $n1p$ denotes a mean value of refractive indexes of the positive lenses, and $v1p$ denotes a mean value of Abbe numbers of the positive lenses.

In each of the above optical systems, it is preferable that the front group and the rear group of the second lens group move in tandem along the optical axis upon focusing from an object at infinity to an object at a finite distance.

In each of the above optical systems, it is preferable that an antireflection coating is formed at least on one surface of the optical surfaces of the first lens group and the second lens group, and the antireflection coating is structured to include at least one layer formed using a wet process.

In each of the above optical systems, it is preferable that the antireflection coating is a multilayer film, and the layer formed using the wet process is a layer on the outermost surface of the layers constituting the multilayer film.

In each of the above optical systems, it is preferable that the refractive index of the layer formed using the wet process is 1.30 or less.

In each of the above optical systems, it is preferable that the antireflection coating is formed on the optical surface having a concave form when viewed from the aperture stop.

In each of the above optical systems, it is preferable that the optical surface having a concave form when viewed from the aperture stop is a lens surface closest to the object in the lenses of the first lens group and the second lens group.

In each of the above optical systems, it is preferable that the optical surface having a concave form when viewed from the aperture stop is a lens surface closest to the image in the lenses of the first lens group and that in the second lens group.

In each of the above optical systems, it is preferable that the antireflection coating is formed on the optical surface having a concave form when viewed from the image plane.

In each of the above optical systems, it is preferable that the optical surface having a concave form when viewed from the image plane is a lens surface closest to the object in the lenses of the second lens group.

In each of the above optical systems, it is preferable that the optical surface having a concave form when viewed from the image plane is a lens surface closest to the image plane in the lenses of the second lens group.

An optical apparatus according to the present invention is an optical apparatus having an optical system which forms an image of an object on a predetermined surface, wherein one of the optical systems according to the present invention is used as the optical system.

A first optical system manufacturing method according to the present invention is a method for manufacturing an optical system having, in order from an object, a first lens group having negative refractive power; and a second lens group having positive refractive power, wherein the method is implemented by fixing the first lens group and moving the second lens group upon focusing from an object at infinity to an object at a finite distance, and wherein the second lens group is formed of a front group located closer to the object than a aperture stop disposed in the second lens group, and a rear group located closer to an image than the aperture stop, with the following conditional expression being satisfied: $0.10<f2a/f2b<1.00$, where $f2a$ denotes a focal length of the front group of the second lens group, and $f2b$ denotes a focal length of the rear group of the second lens group.

A second optical system manufacturing method according to the present invention is a method for manufacturing an optical system having, in object from an object, a first lens group having negative refractive power; and a second lens group having positive refractive power, wherein the method is implemented by fixing the first lens group and moving the second lens group upon focusing from an object at infinity to an object at a finite distance, with the following conditional expressions being satisfied respectively: $0.10<(-f1)/f2<2.50$ and $0.20<f2/f<1.55$, where f1 denotes a focal length of the first lens group, f2 denotes a focal length of the second lens group, and f denotes a focal length of the optical system upon focusing on infinity.

A third optical system manufacturing method according to the present invention is a method for manufacturing an optical system having, in order from an object, a first lens group having negative refractive power; and a second lens group having positive refractive power, wherein the method is implemented by fixing the first lens group and moving the second lens group upon focusing from an object at infinity to an object at a finite distance, and wherein the second lens group is formed of a front group located closer to the object than a aperture stop disposed in the second lens group, and a rear group located closer to an image than the aperture stop, with the following conditional expression being satisfied: $0.10<f2a/f<1.70$, where $f2a$ denotes a focal length of the front group of the second lens group, and f denotes a focal length of the optical system upon focusing on infinity.

In each of the above manufacturing methods, it is preferable that an antireflection coating is formed at least on one surface of the optical surfaces of the first lens group and the second lens group, and the antireflection coating is structured to include at least one layer formed using a wet process.

According to the present invention, a good optical performance can be implemented. Furthermore according to the present invention, an optical system and an optical apparatus having good optical performance, with less ghosts and flares and a method for manufacturing the optical system, can be implemented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 5 is a diagram depicting a lens configuration of an optical system according to Example 3;

FIG. 7 is a diagram depicting a lens configuration of an optical system according to Example 4;

FIG. 8A are graphs showing various aberrations upon focusing on infinity according to Example 4, and FIG. 8B are graphs showing various aberrations upon focusing on a close distance (D0=200 mm);

FIG. 16 is a cross-sectional view depicting a lens configuration of an optical system according to Example 7;

DESCRIPTION OF THE EMBODIMENTS

Figure 9:
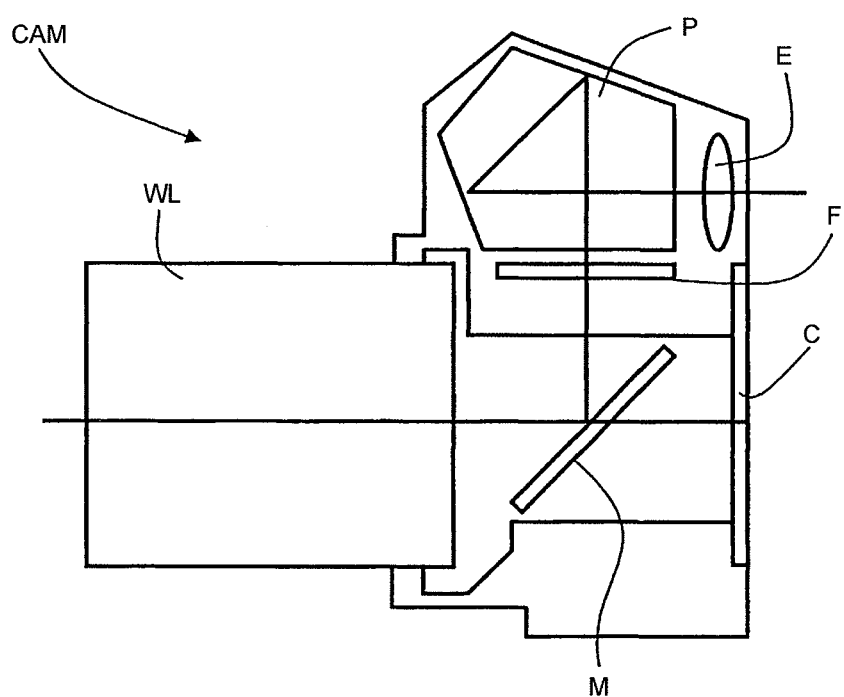
FIG. 9 is a cross-sectional view of a digital single lens reflex camera.

Embodiments of the present invention will now be described with reference to the drawings. FIG. 9 shows a digital single lens reflex camera CAM having a wide angle lens WL, which is an example of an optical system according to the present invention. In the digital single lens reflex camera CAM shown in FIG. 9, lights from an object, which is not illustrated, are collected by an imaging lens (that is, a wide angel lens (optical system) WL), and form an image on a focal plane plate F via a quick return mirror M. The lights which formed an image on the focal plane plate F are reflected in a penta prism P for a plurality of times and guided to an eye piece E. Thereby the user can observe the image of the object as an erected image via the eye piece E.

If a user presses a release button, which is not illustrated, a quick return mirror M is retracted outside the optical path, and the lights from the object collected by the wide angle lens (optical system) WL form an image of the object on a picture element C. Thereby the image of the lights from the object formed on the picture element C is captured by the picture element C, and is recorded in a memory, which is not illustrated, as an image of the object. Thus the user can photograph an object using the digital single lens reflex camera CAM. The same effect as this camera CAM can be obtained even if a camera, which has no quick return mirror M, is used. The digital single lens reflex camera CAM shown in FIG. 9 may have a removable wide angle lens (optical system) WL, or may be integrated with the wide angle lens (optical system) WL.

Figure 1:
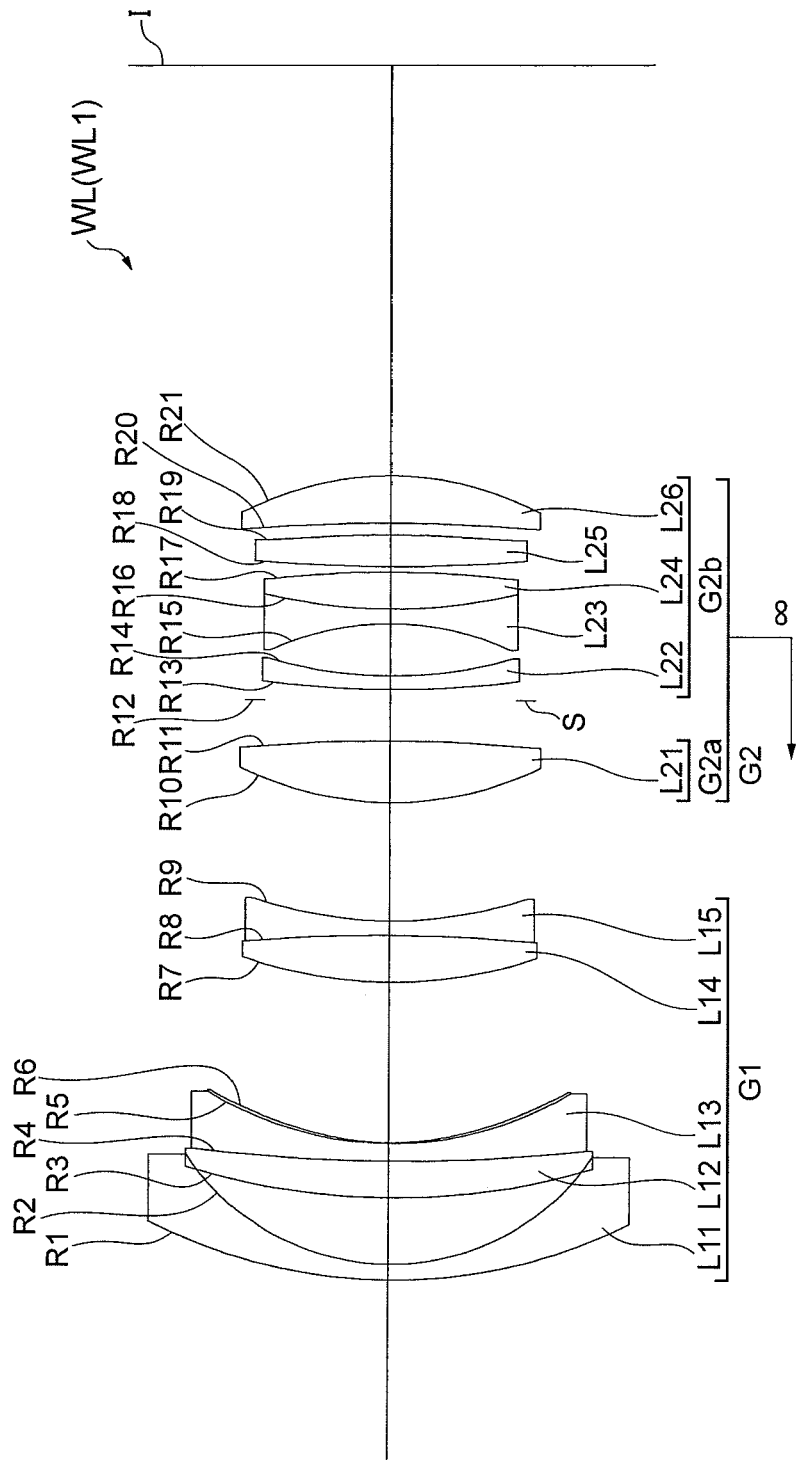
FIG. 1 is a diagram depicting a lens configuration of an optical system according to Example 1.

A wide angle lens WL as an optical system according to the first embodiment comprises, in order from an object: a first lens group G1 having negative refractive power; and a second lens group G2 having positive refractive power, for example, as shown in FIG. 1. Because of this configuration, a smaller lens barrel can be used, and various aberrations can be corrected well. The second lens group G2 further comprises a front group G2a located closer to the object than a aperture stop S disposed in the second lens group G2, and a rear group G2b located closer to an image than the aperture stop S. Upon focusing from an object at infinity to an object at a short distance (finite distance), the first lens group G1 is fixed and the second lens group G2 moves. Because of this configuration, a smaller lens barrel can be used, and a change of aberrations due to focusing can be corrected well.

In the wide angle lens WL having this configuration, it is preferable that the following conditional expression (1) is satisfied, where f2a denotes a focal length of the front group G2a of the second lens group G2, and f2b denotes a focal length of the rear group G2b of the second lens group G2.

$$0.10 < f2a/f2b < 1.00 \quad (1)$$

The conditional expression (1) specifies a ratio between the focal length f2a of the front group G2a and the focal length f2b of the rear group G2b in the second lens group G2. If the conditional expression (1) is satisfied, the sagittal coma flare of the wide angle lens WL of the present embodiment can be corrected well. If the upper limit value of the conditional expression (1) is exceeded, the refractive power of the front group G2a decreases, and it becomes difficult to correct sagittal coma aberration. At the same time, the refractive power of the rear group G2b increases, and it becomes difficult to correct spherical aberration and coma aberration. If the lower limit value of the conditional expression (1) is not reached, the refractive power of the front group G2a increases, and it becomes difficult to correct spherical aberration and to secure back focus.

It is preferable that the upper limit value of the conditional expression (1) is 0.95. To ensure the effect, it is preferable that the upper limit value of the conditional expression (1) is 0.90. It is preferable that the lower limit value of the conditional expression (1) is 0.20. To ensure the effect, it is preferable that the lower limit value of the conditional expression (1) is 0.30.

Moreover, in the wide angle lens WL, it is preferable that the following conditional expression (2) is satisfied, where f1 denotes a focal length of the first lens group G1, and f2 denotes a focal length of the second lens group G2.

$$0.10 < (-f1)/f2 < 2.50 \quad (2)$$

The conditional expression (2) specifies the ratio between the focal length f1 of the first lens group G1 and the focal length f2 of the second lens group G2. The wide angle lens WL of the present embodiment can implement a good optical performance by satisfying the conditional expression (2). If the upper limit value of the conditional expression (2) is exceeded, the refractive power of the second lens group G2 increases, and it becomes difficult to correct spherical aberration and coma aberration. If the lower limit value of the conditional expression (2) is not reached, the refractive power of the first lens group G1 increases, and it becomes difficult to correct curvature of field and distortion.

It is preferable that the upper limit value of the conditional expression (2) is 2.30. To ensure the effect, it is preferable that the upper limit value of the conditional expression (2) is 2.10. It is preferable that the lower limit value of the conditional expression (2) is 0.70. To ensure the effect, it is preferable that the lower limit value of the conditional expression (2) is 1.20.

In the wide angle lens WL, it is preferable that the following conditional expression (3) is satisfied, where f denotes a focal length of the wide angle lens WL upon focusing on infinity.

$$0.10 < f2a/f < 1.70 \quad (3)$$

The conditional expression (3) specifies the ratio between the focal length f2a of the front group G2a of the second lens group G2 and the focal length f of the entire system of the wide angel lens WL upon focusing on infinity. The wide angle lens WL of the present embodiment can implement a good optical performance by satisfying the conditional expression (3). If the lower limit value of the conditional expression (3) is not reached, the refractive power of the front group G2a of the second lens group G2 increases, and it becomes difficult to correct spherical aberration and to secure back focus. If the upper limit value of the conditional expression (3) is exceeded, the refractive power of the front group G2a decreases, and it becomes difficult to correct sagittal coma aberration. At the same time, the refractive power of the rear group G2b of the second lens group G2 increases, and it becomes difficult to correct spherical aberration and coma aberration.

It is preferable that the upper limit value of the conditional expression (3) is 1.65. To ensure the effect, it is preferable that the upper limit value of the conditional expression (3) is 1.60. It is preferable that the lower limit value of the conditional expression (3) is 0.50. To ensure the effect, it is preferable that the lower limit value of the conditional expression (3) is 1.00.

In the wide angle lens WL, it is preferable that the following conditional expression (4) is satisfied, where f2 denotes a focal length of the second lens group G2, and f denotes a focal length of the wide angle lens WL upon focusing on infinity.

$$0.20 < f2/f < 1.55 \quad (4)$$

The conditional expression (4) specifies the ratio between the focal length f2 of the second lens group G2 and the focal length f of the entire system of the wide angle lens WL upon focusing on infinity. The wide angle lens WL of the present embodiment can implement good optical performance by satisfying the conditional expression (4). If the lower limit value of the conditional expression (4) is not reached, the refractive power of the second lens group G2 increases, and it becomes difficult to secure back focus and to correct spherical aberration and coma aberration. If the upper limit value of the conditional expression (4) is exceeded, the refractive power of the second lens group G2 decreases, and the total length of the wide angle lens WL increases. Furthermore it becomes difficult to correct spherical aberration and coma aberration.

It is preferable that the upper limit value of the conditional expression (4) is 1.45. To ensure the effect, it is preferable that the upper limit value of the conditional expression (4) is 1.35. It is preferable that the lower limit value of the conditional expression (4) is 0.35. To ensure the effect, it is preferable that the lower limit value of the conditional expression (4) is 0.65. To further ensure the effect of the present embodiment, it is preferable that the lower limit value of the conditional expression (4) is 1.00.

In the wide angle lens WL, it is preferable that the rear group G2b of the second lens group G2 has at least one aspherical lens. Because of this configuration, spherical aberration and sagittal coma aberration can be corrected well.

In the wide angle lens WL, it is preferable that the rear group G2b of the second lens group G2 has two positive lenses disposed in order from the image. Because of this configuration, spherical aberration and coma aberration can be corrected well.

In the wide angle lens WL, it is preferable that the following conditional expression (5) is satisfied, where f1 denotes a focal length of the first lens group G1, and f denotes a focal length of the wide angle lens WL upon focusing on infinity.

$$(-f1)/f < 5.0 \quad (5)$$

The conditional expression (5) specifies the ratio between the focal length f1 of the first lens group G1 and the focal length f of the entire system of the wide angle lens WL upon focusing on infinity. The wide angle lens WL of the present embodiment can implement a good optical performance by satisfying the conditional expression (5). If the upper limit value of the conditional expression (5) is exceeded, the refractive power of the first lens group G1 decreases, and the refractive power of the second lens group G2 increases to obtain a predetermined angle of view, and it becomes difficult to correct spherical aberration and coma aberration.

To ensure the effect of the present embodiment, it is preferable that the upper limit value of the conditional expression (5) is 4.0. To further ensure the effect of the present embodiment, it is preferable that the upper limit value of the conditional expression (5) is 3.0.

In the wide angle lens WL, it is preferable that the first lens group G1 has two negative lenses disposed in order from the object. Because of this configuration, coma aberration, curvature of field and distortion can be corrected well.

In the wide angle lens WL, it is preferable that the first lens group G1 has at least one aspherical lens. Because of this configuration, curvature of field and distortion can be corrected well.

In the wide angle lens WL, it is preferable that the first lens group G1 has a positive lens, and the following conditional expression (6) and conditional expression (7) are satisfied respectively, where $n1p$ denotes a mean value of the refractive indexes of the positive lenses, and $v1p$ denotes a mean value of the Abbe numbers of the positive lenses.

$$n1p > 1.800 \quad (6)$$

$$v1p > 28.00 \quad (7)$$

The conditional expression (6) and conditional expression (7) specify the characteristics of glass material of the positive lens of the first lens group G1. If these conditions are satisfied in the wide angle lens WL of the present embodiment, lateral chromatic aberration, distortion, and curvature of field generated in the negative lens of the first lens group G1 can be corrected well. If the lower limit value of the conditional expression (6) is not reached, it becomes difficult to correct distortion, curvature of field and coma aberration generated in the negative lens. If the lower limit value of the conditional expression (7) is not reached, secondary dispersion increases, hence it becomes difficult to correct lateral chromatic aberration sufficiently.

It is preferable that the lower limit value of the conditional expression (6) is 1.840. It is preferable that the lower limit value of the conditional expression (7) is 30.00.

In the wide angle lens WL, it is preferable that the front group G2a and the rear group G2b of the second lens group G2 move in tandem along the optical axis upon focusing from an object at infinity to an object at a short distance (finite distance). Because of this configuration, change of aberrations due to focusing caused by a manufacturing error can be decreased. Thus according to the first embodiment, an optical system (wide angle lens WL) having a good optical performance and an optical apparatus (digital single lens reflex camera CAM) having this optical system can be implemented.

Figure 10:
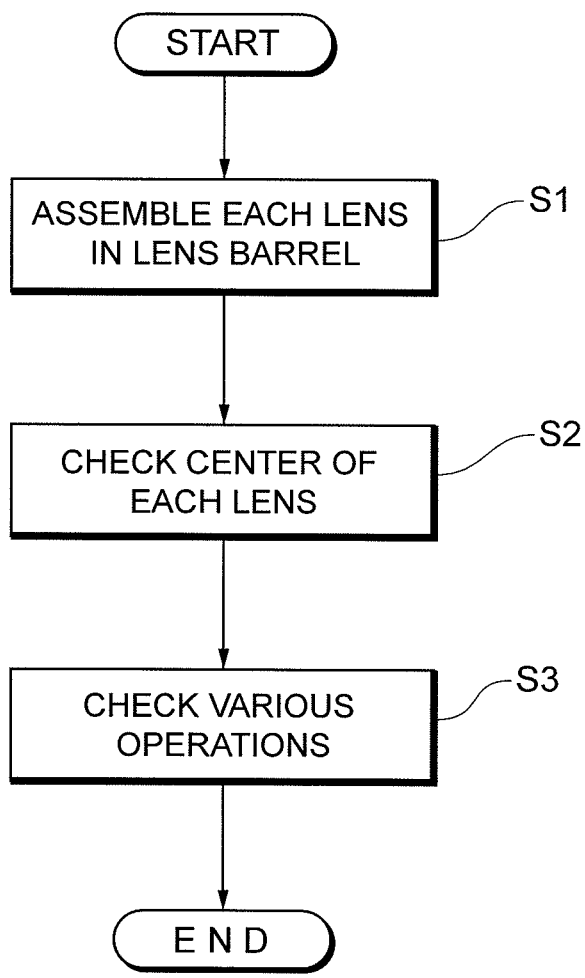
FIG. 10 is a flow chart depicting a method for manufacturing the optical system.

A method for manufacturing the wide angle lens WL having the above mentioned configuration will be described with reference to FIG. 10. First the first lens group G1 and the second lens group G2 are assembled in a cylindrical lens barrel (step S1). Here each lens of the first and second lens groups G1 and G2 is disposed so that the conditional expressions (1), (2), (3) and (4) are satisfied respectively. When each lens is assembled in the lens barrel, each lens may be assembled in the lens barrel one at a time, in order along the optical axis, or a part or all of the lenses may be integrated and held on a holding member, and then assembled in the lens barrel. After assembling each lens group in the lens barrel, it is checked whether the object image is formed in a state where each lens group is assembled in the lens barrel, that is, whether the center of each lens group is aligned (step S2). After checking that the image is formed, various operations of the wide angle lens WL are Checked (step S3).

Examples of the various operations are: a focusing operation in which lens groups which performing focusing from an object at a long distance to an object at a short distance move along the optical axis; and a hand motion blur correction operation in which at least a part of the lenses move, so as to have components orthogonal to the optical axis. In the present embodiment, the first lens group G1 is fixed and the second lens group G2 moves upon focusing from an object at a long distance (object at infinity) to an object at a short distance (object at a finite distance). The sequence of checking the various operations is arbitrary. According to this manufacturing method, an optical system (wide angle lens WL) having a good optical performance can be obtained.

Examples of First Embodiment

Example 1

Each example of the first embodiment will now be described with reference to the drawings. Example 1 will be described first with reference to FIG. 1, FIG. 2 and Table 1. FIG. 1 is a diagram depicting a lens configuration of a wide angle lens WL (WL1) according to Example 1. The wide angle lens WL1 according to Example 1 comprises, in order from an object, a first lens group G1 having negative refractive power, and a second lens group G2 having positive refractive power, and the second lens group G2 further comprises, in order from the object, a front group G2a having positive refractive power, an aperture stop S and a rear group G2b having positive refractive power.

The first lens group G1 includes, in order from an object, a first negative meniscus lens L11 having a convex surface facing the object, a cemented negative lens where a first positive meniscus lens L12 having a convex surface facing the object and a second negative meniscus lens L13 having a convex surface facing the object are cemented, and a cemented positive lens where a first positive lens L14 having a biconvex form and a first negative lens L15 having a biconcave form are cemented, and a lens surface closest to the image plane I in the second negative meniscus lens L13 is aspherical. The front group G2a of the second lens group G2 includes, in order from the object, a second positive lens L21 having a biconvex form. The rear group G2b of the second lens group G2 includes, a third negative meniscus lens L22 having a convex surface facing the object, a cemented negative lens where a second negative lens L23 having a biconcave form and a third positive lens L24 having a biconvex form are cemented, a fourth positive lens L25 having a biconvex form, and a second positive meniscus lens L26 having a convex surface facing the image plane I, and the lens surface of the fourth positive lens L25 facing the image plane I is aspherical.

Upon focusing from an object at infinity to an object at a short distance (finite distance), the first lens group G1 is fixed and the second lens group G2 moves. During this time, the front group G1a, the aperture stop S and the rear group G2b of the second lens group G2 move in tandem.

Table 1 to Table 4 shown below list each data on wide angle lenses according to Example 1 to Example 4. In [General Data] in each table, f is a focal length, FNO is an F number, ω is a half angle of view (maximum incident angle: unit is "°"), Y is an image height, TL is a total lens length (length converted to air), and Bf is a back focus (length converted to air). In [Lens Data], the first column N is the number of the lens surface counted from the object side, and second column R is a radius of curvature of the lens surface, the third column D is a distance to the next lens surface, the fourth column nd is a refractive index at d-line (wavelength λ=587.6 nm), and the fifth column νd is an Abbe number at d-line (wavelength=587.6 nm). "*" attached at to the right of the surface number indicates that this lens surface is aspherical. The radius of curvature "0.0000" indicates a plane, and the refractive index of air nd=1.00000 is omitted.

In [Aspherical Data], an aspherical coefficient is given by the following expression (8), where x denotes a displacement in the optical axis direction in a position at height h from the optical axis at a vertex of the surface, as a reference, κ is a conical coefficient, An is an aspherical coefficient in degree n (n=4, 6, 8, 10), and r is a paraxial radius of curvature shown in [Lens Data]. In each example, the aspherical coefficient in degree 2, that is A2, is 0, which is omitted. In [Aspherical Data], "E-n" indicates "×10$^{-n}$".

$$x=(h^2/r)/[1+\{1-\kappa\times(h/r)^2\}^{1/2}]+A4\times h^4+A6\times h^6+A8\times h^8+A10\times h^{10} \quad (8)$$

In [Variable Distance Data], a value of each variable distance upon focusing on infinity (D0=∞) and upon focusing on a short distance (D0=200 mm), where D0 is a distance from an object to a lens surface closest to the object, is shown. In all the data values, "mm" is normally used for the unit of focal length f, radius of curvature R, surface distance D and other lengths, but the unit is not limited to "mm", since an equivalent optical performance is obtained even if an optical system is proportionally expanded or proportionally reduced. For the later mentioned Example 2 to Example 4 as well, symbols the same as this example are used.

Table 1 shows each data value of Example 1. R in the surface 1 to surface 21 in Table 1 correspond to the reference symbols R1 to R21 assigned to surface 1 to surface 21 in FIG. 1. In Example 1, the lens surfaces of surface 6 and surface 19 are formed to be aspherical respectively.

TABLE 1

[General Data]

f = 28.70
FNO = 1.85
ω = 37.65
Y = 21.60
TL = 115.14
Bf = 38.90

[Lens Data]

| N | R | D | nd | vd |
|---|---|---|---|---|
| 1 | 49.1524 | 1.5000 | 1.77250 | 49.61 |
| 2 | 22.6487 | 6.3000 | | |
| 3 | 64.7809 | 3.5000 | 1.83481 | 42.73 |
| 4 | 150.0000 | 1.7000 | 1.51680 | 63.88 |
| 5 | 32.5000 | 0.1000 | 1.55389 | 38.23 |
| 6* | 28.4668 | 15.0000 | | |
| 7 | 41.4076 | 4.5000 | 1.83481 | 42.73 |
| 8 | −157.2545 | 1.4000 | 1.51742 | 52.32 |
| 9 | 39.7009 | (d1) | | |
| 10 | 31.9258 | 5.8146 | 1.69680 | 55.52 |
| 11 | −152.5356 | 3.9000 | | |
| 12 | 0.0000 | 0.9989 | | (Aperture stop) |
| 13 | 89.3478 | 1.3000 | 1.51742 | 52.20 |
| 14 | 39.6652 | 5.0000 | | |
| 15 | −26.3069 | 1.4000 | 1.78472 | 25.64 |
| 16 | 50.5684 | 3.5000 | 1.59319 | 67.87 |
| 17 | −98.4501 | 0.5000 | | |
| 18 | 151.4501 | 3.0000 | 1.77250 | 49.62 |
| 19* | −89.8749 | 1.1000 | | |
| 20 | −169.6497 | 4.5000 | 1.80400 | 46.60 |
| 21 | −29.4540 | (Bf) | | |

[Aspherical Data]

surface 6

κ = 1.0000, A4 = −4.67675E−06, A6 = −7.54681E−09,
A8 = −1.54602E−11, A10 = −1.83890E−14 surface 19

κ = 1.0000, A4 = 1.47607E−05, A6 = −2.02245E−10,
A8 = 0.00000E+00, A10 = 0.00000E+00

[Variable Distance Data]

| | infinity | short distance |
|---|---|---|
| D0 = | ∞ | 200.0000 |
| d1 = | 11.2300 | 6.3103 |

Figure 2B:
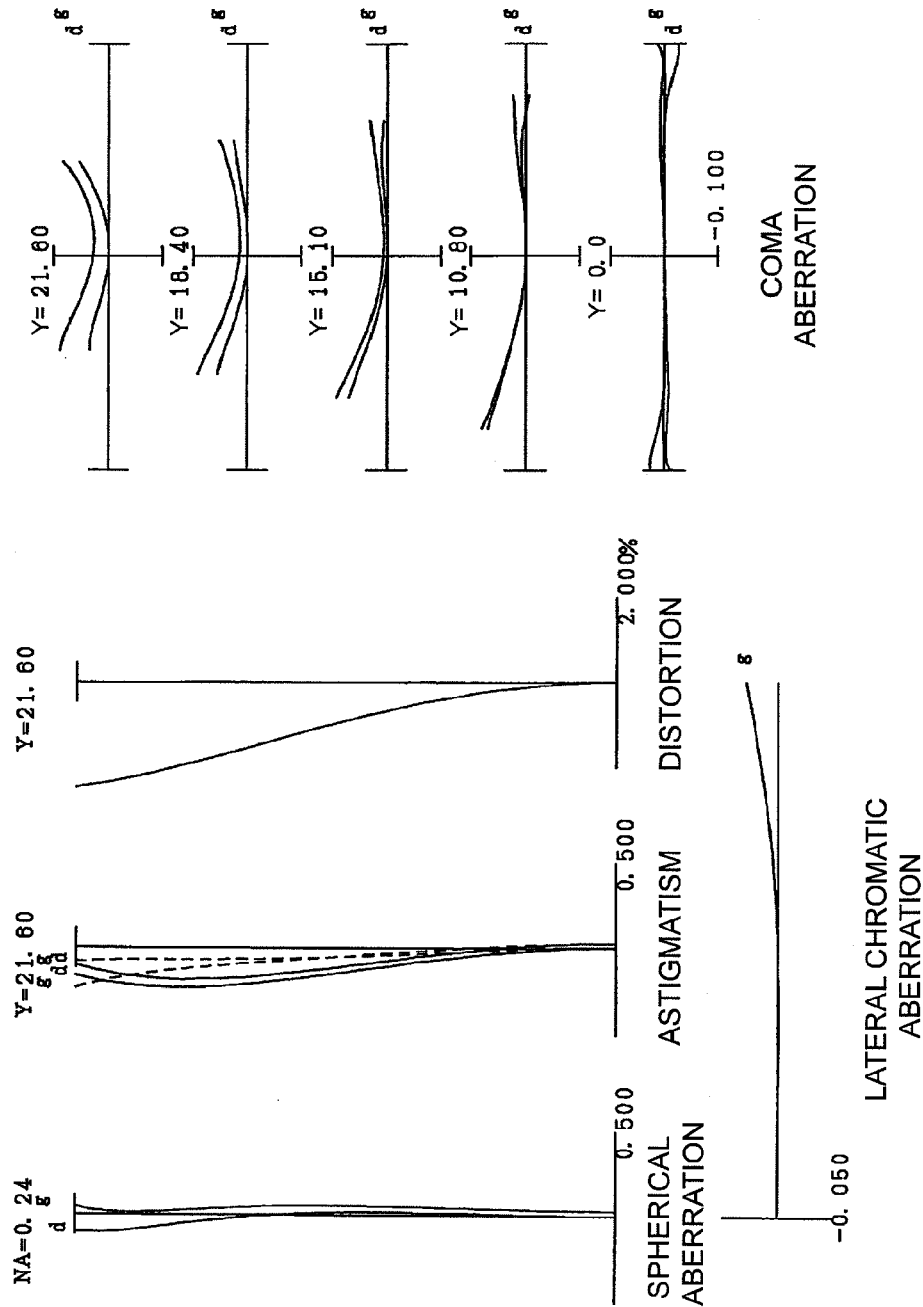
FIG. 2A are graphs showing various aberrations upon focusing on infinity according to Example 1, and FIG. 2B are graphs showing various aberrations upon focusing on a close distance (D0=200 mm)

FIG. 2A and FIG. 2B are graphs showing various aberrations of the wide angle lens WL1 according to Example 1. Here FIG. 2A are graphs showing various aberrations upon focusing on infinity, and FIG. 2B are graphs showing various aberrations upon focusing on a short distance (D0=200 mm). In each graph showing aberrations, FNO denotes an F number, and Y denotes an image height. In the graph showing each aberration, d denotes d-line (λ=587.6 nm) and g denotes g-lines (λ=435.8 nm) respectively. In the graph showing astigmatism, the solid line indicates the sagittal image surface, and the broken line indicates the meridional image surface. The description on the graphs showing aberration is the same as the other examples.

In Example 1, as each graph on aberration shows, various aberrations are corrected well, and excellent image forming performance is exhibited. As a result, excellent image forming performance can be ensured for a digital single lens reflex camera CAM as well, by installing the wide angle lens WL1 of Example 1.

Example 2

Figure 3:
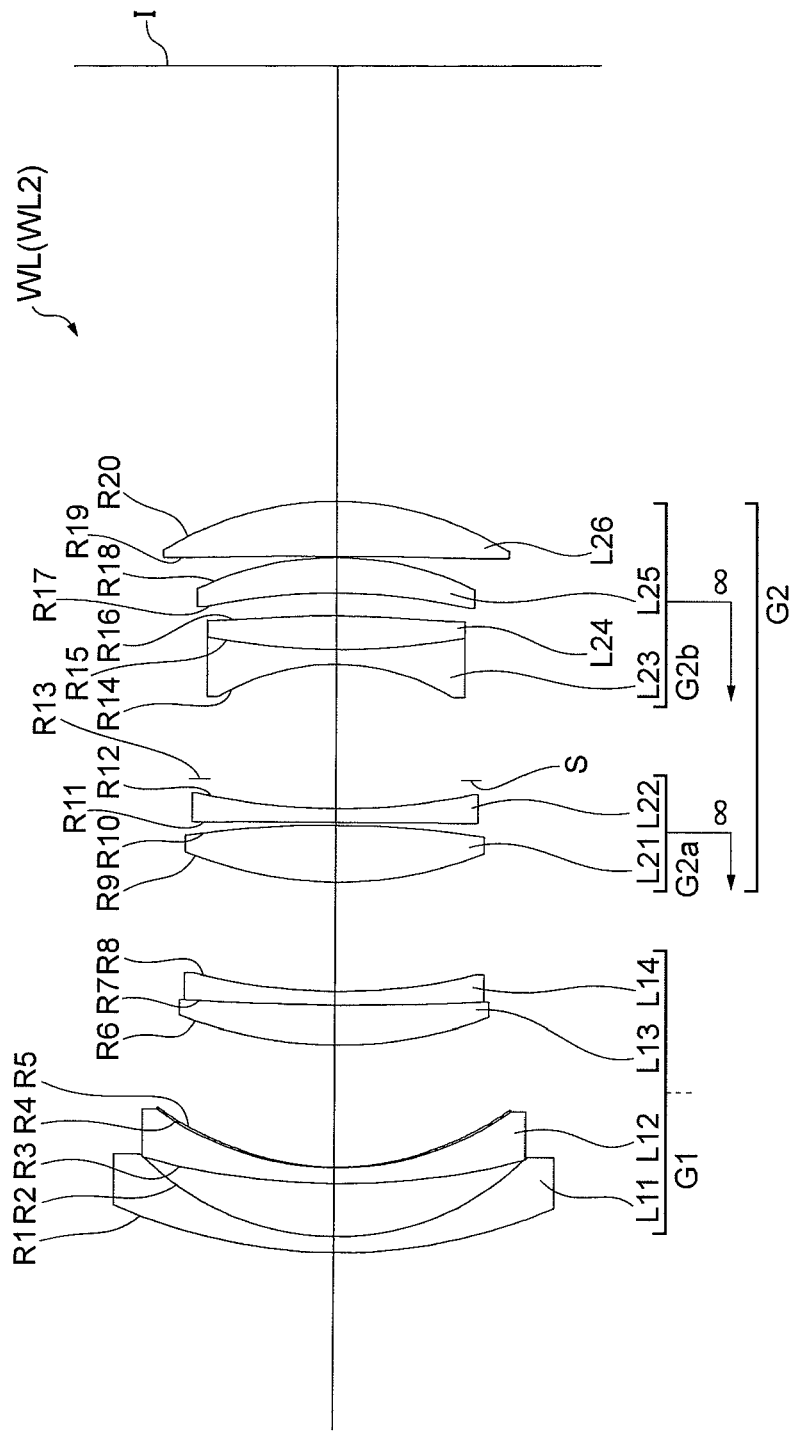
FIG. 3 is a diagram depicting a lens configuration of an optical system according to Example 2.

Example 2 will now be described with reference to FIG. 3, FIG. 4 and Table 2. FIG. 3 is a diagram depicting a lens configuration of a wide angle lens WL (WL2) according to Example 2. The wide angle lens WL2 according to Example 2 comprises, in order from an object, a first lens group G1 having negative refractive power, and the second lens group G2 having positive refractive power, and the second lens group G2 further comprises, in order from the object, a front group G2a having positive refractive power, a aperture stop S and a rear group G2b having positive refractive power.

The first lens group G1 includes, in order from an object, a first negative meniscus lens L11 having a convex surface facing the object, a second negative meniscus lens L12 having a convex surface facing the object, and a cemented positive lens where a first positive meniscus lens L13 having a convex surface facing the object and a third negative meniscus lens L14 having a convex surface facing the object are cemented, and a lens surface facing the image plane I in the second negative meniscus lens L12 is aspherical. The front group G2a of the second lens group G2 includes, in order from the object, a first positive lens L21 having a biconvex form, and a first negative lens L22 having a biconcave form. The rear group G2b of the second lens group G2 includes, in order from the object, a cemented negative lens where a second negative lens L23 having a biconcave form and a second positive lens L24 having a biconvex form are cemented, a second positive meniscus lens L25 having a convex surface facing the image plane I and a third positive meniscus lens L26 having a convex surface facing the image plane I, and the lens surface of the second positive lens L24 facing the image plane I is aspherical.

Upon focusing from an object at infinity to an object at a short distance (finite distance), the first lens group G1 is fixed and the second lens group G2 moves. During this time, in the second lens group G2, the front group G2a and the aperture stop S move in tandem, and the rear group G2b moves for a moving distance different from that of the front group G2a and the aperture stop S, so that the distance between the front group G2a and the rear group G2b decreases.

Table 2 shows each data value of Example 2. The radius of curvature R in surface 1 to surface 20 in Table 2 correspond to the reference symbols R1 to R20 assigned to surface 1 to surface 20 in FIG. 3. In Example 2, the lens surfaces of surface 5 and surface 16 are formed to be aspherical respectively.

TABLE 2

[General Data]

f = 31.02
FNO = 1.85
ω = 35.53
Y = 21.60
TL = 112.35
Bf = 41.12

TABLE 2-continued

[Lens Data]

| N | R | D | nd | vd |
|---|---|---|---|---|
| 1 | 51.3500 | 1.5000 | 1.69679 | 55.52 |
| 2 | 25.2423 | 4.9661 | | |
| 3 | 68.6565 | 1.5000 | 1.51680 | 64.11 |
| 4 | 28.1354 | 0.1000 | 1.52050 | 50.97 |
| 5* | 26.2816 | 11.5436 | | |
| 6 | 40.1060 | 3.7730 | 1.83480 | 42.72 |
| 7 | 245.2122 | 1.3000 | 1.51822 | 58.94 |
| 8 | 55.0388 | (d1) | | |
| 9 | 35.8474 | 5.4498 | 1.75499 | 52.31 |
| 10 | −90.5185 | 0.2911 | | |
| 11 | −1293.1200 | 1.3203 | 1.51742 | 52.31 |
| 12 | 59.5863 | 2.7402 | | |
| 13 | 0.0000 | (d2) | | (Aperture stop) |
| 14 | −21.2472 | 1.4020 | 1.78472 | 25.68 |
| 15 | 62.9942 | 3.1710 | 1.72915 | 54.66 |
| 16* | −81.0024 | 2.1794 | | |
| 17 | −55.3719 | 3.3993 | 1.59319 | 67.90 |
| 18 | −29.4567 | 0.1000 | | |
| 19 | −608.4131 | 5.2751 | 1.80400 | 46.58 |
| 20 | −29.8770 | (Bf) | | |

[Aspherical Data]

surface 5

$\kappa = 1.0000$, $A4 = -3.12860E-06$, $A6 = -6.82480E-09$,
$A8 = 9.01370E-12$, $A10 = -1.54600E-14$ surface 16

$\kappa = 1.0000$, $A4 = 1.80620E-05$, $A6 = -5.80110E-09$,
$A8 = 0.00000E+00$, $A10 = 0.00000E+00$

[Variable Distance Data]

| | infinity | short distance |
|---|---|---|
| D0 = | ∞ | 200.0000 |
| d1 = | 10.2521 | 4.3259 |
| d2 = | 10.9700 | 10.7329 |

Figure 4A:
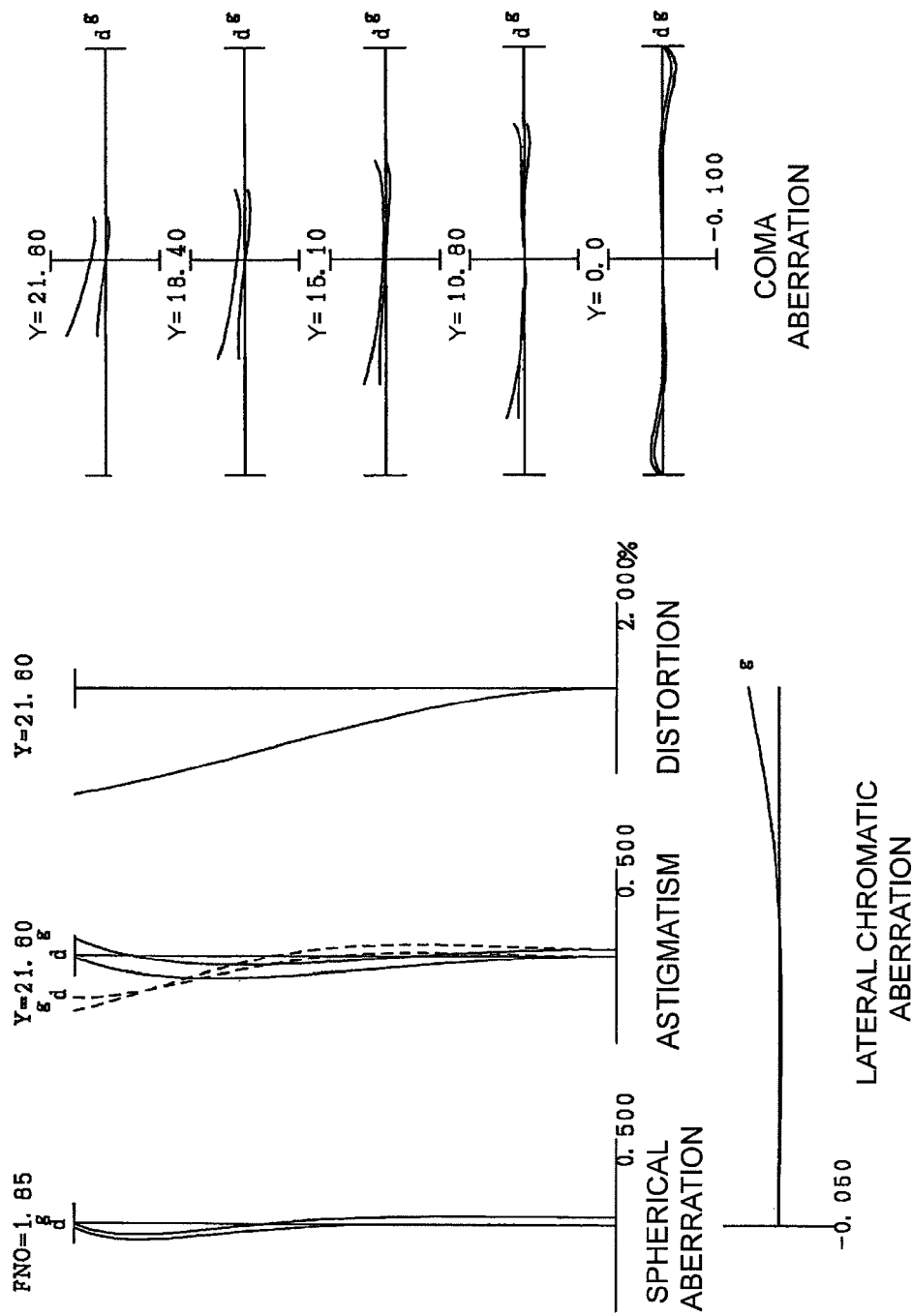
FIG. 4A are graphs showing various aberrations upon focusing on infinity according to Example 2, and FIG. 4B are graphs showing various aberrations upon focusing on a close distance (D0=200 mm)
Figure 4B:
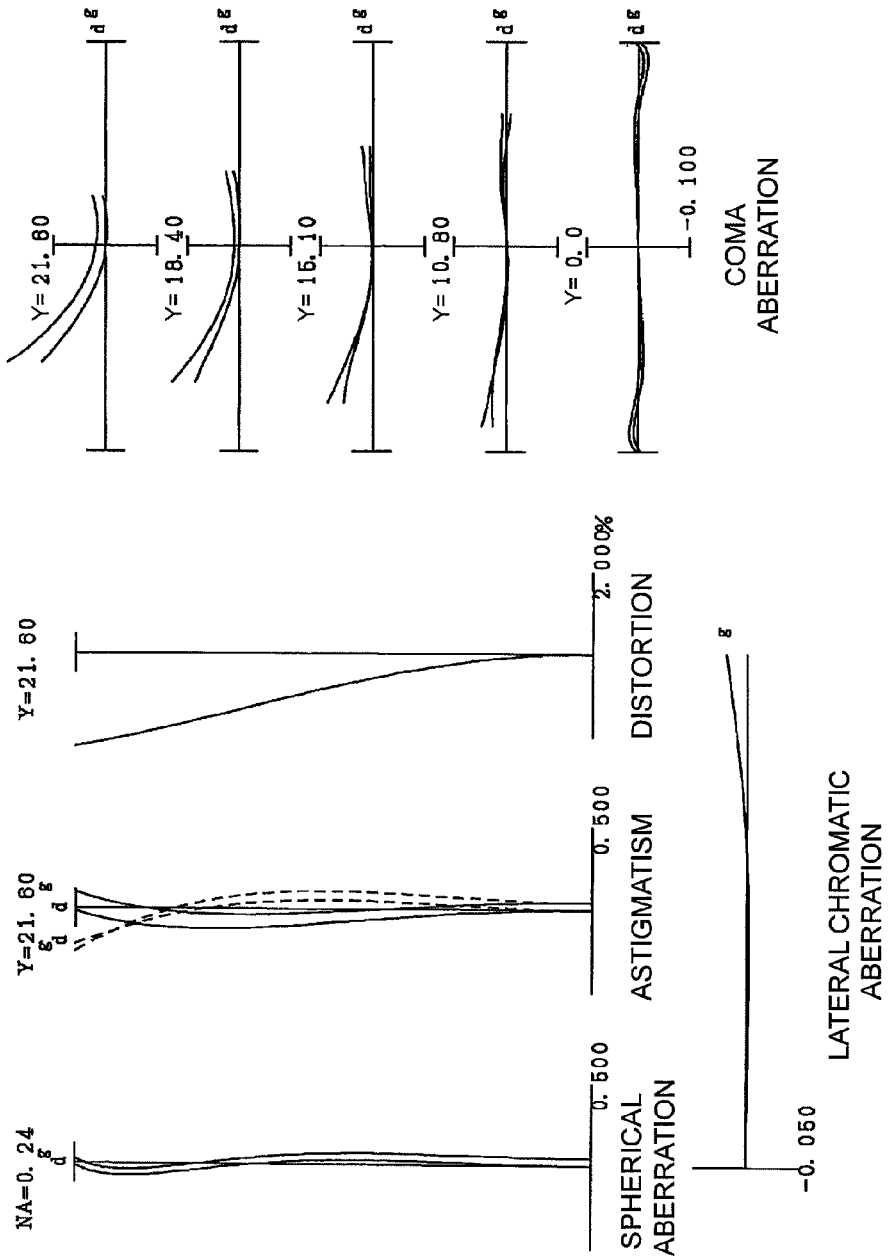

FIG. 4A and FIG. 4B are graphs showing various aberrations of the wide angle lens WL2 according to Example 2. Here FIG. 4A are graphs showing various aberrations upon focusing on infinity, and FIG. 4B are graphs showing various aberrations upon focusing on a short distance (D0=200 mm). In Example 2, as each graph on aberration shows, various aberrations are corrected well, and excellent image forming performance is exhibited. As a result, excellent image forming performance can be ensured for a digital single lens reflex camera CAM as well, by installing the wide angle lens WL2 of Example 2.

Example 3

Example 3 will now be described with reference to FIG. 5, FIG. 6 and Table 3. FIG. 5 is a diagram depicting a lens configuration of a wide angle lens WL (WL3) according to Example 3. The wide angle lens WL3 according to Example 3 comprises, in order from an object, a first lens group G1 having negative refractive power, and the second lens group G2 having positive refractive power, and the second lens group G2 further comprises, in order from the object, a front group G2a having positive refractive power, a aperture stop S and a rear group G2b having positive refractive power.

The first lens group G1 includes, in order from an object, a first negative meniscus lens L11 having a convex surface facing the object, a second negative meniscus lens L12 having a convex surface facing the object, and a cemented positive lens where a positive meniscus lens L13 having a convex surface facing the object and a third negative meniscus lens L14 having a convex surface facing the object are cemented, and the lens surface of the second negative meniscus lens L12 facing the image plane I is aspherical. The front group G2a of the second lens group G2 includes a first positive lens L21 having a biconvex form. The rear group G2b of the second lens group G2 includes, in order from the object, a fourth negative meniscus lens L22 having a convex surface facing the object, a cemented negative lens where a negative lens L23 having a biconcave form and a second positive lens L24 having a biconvex form are cemented, and a third positive lens L25 having a biconvex form, and the lens surface of the second positive lens L24 facing the image plane I is aspherical.

Upon focusing from an object at infinity to an object at a short distance (finite distance), the first lens group G1 is fixed and the second lens group G2 moves. During this time, the front group G2a, the aperture stop S and the rear group G2b of the second lens group G2 move in tandem.

Table 3 shows each data value of Example 3. The radius of curvature R in the surface 1 to surface 18 in Table 3 correspond to the reference symbols R1 to R18 assigned to surface 1 to surface 18 in FIG. 5. In Example 3, the lens surfaces of surface 5 and surface 16 are formed to be aspherical respectively.

TABLE 3

[General Data]

f = 28.70
FNO = 1.85
ω = 37.68
Y = 21.60
TL = 115.35
Bf = 38.90

[Lens Data]

| N | R | D | nd | vd |
|---|---|---|---|---|
| 1 | 47.3292 | 1.5000 | 1.72915 | 54.66 |
| 2 | 22.8109 | 5.5771 | | |
| 3 | 35.4413 | 1.5000 | 1.51680 | 64.11 |
| 4 | 23.4810 | 0.2000 | 1.52050 | 50.97 |
| 5* | 21.5311 | 17.0000 | | |
| 6 | 37.4414 | 3.3161 | 1.81600 | 46.62 |
| 7 | 104.2195 | 1.3000 | 1.51822 | 58.94 |
| 8 | 40.6864 | (d1) | | |
| 9 | 35.8877 | 5.2516 | 1.69679 | 55.52 |
| 10 | −232.6661 | 5.9928 | | |
| 11 | 0.0000 | 5.0287 | | (Aperture stop) |
| 12 | 31.9060 | 1.3000 | 1.75519 | 27.51 |
| 13 | 27.2893 | 5.6256 | | |
| 14 | −25.1103 | 1.4000 | 1.78472 | 25.68 |
| 15 | 30.2467 | 5.0249 | 1.80332 | 41.71 |
| 16* | −69.5995 | 0.1000 | | |
| 17 | 160.9651 | 5.4531 | 1.80610 | 40.94 |
| 18 | −31.3476 | (Bf) | | |

[Aspherical Data]

surface 5

$\kappa = 1.0000$, $A4 = -5.69480E-06$, $A6 = -3.25880E-08$,
$A8 = 6.98270E-11$, $A10 = -2.50300E-13$ surface 16

$\kappa = 1.0000$, $A4 = 1.27800E-05$, $A6 = 8.55920E-09$,
$A8 = 0.00000E+00$, $A10 = 0.00000E+00$ TABLE 3-continued

[Variable Distance Data]

|  | infinity | short distance |
|---|---|---|
| D0 = | ∞ | 200.0000 |
| d1 = | 10.8827 | 4.8932 |

Figure 6A:
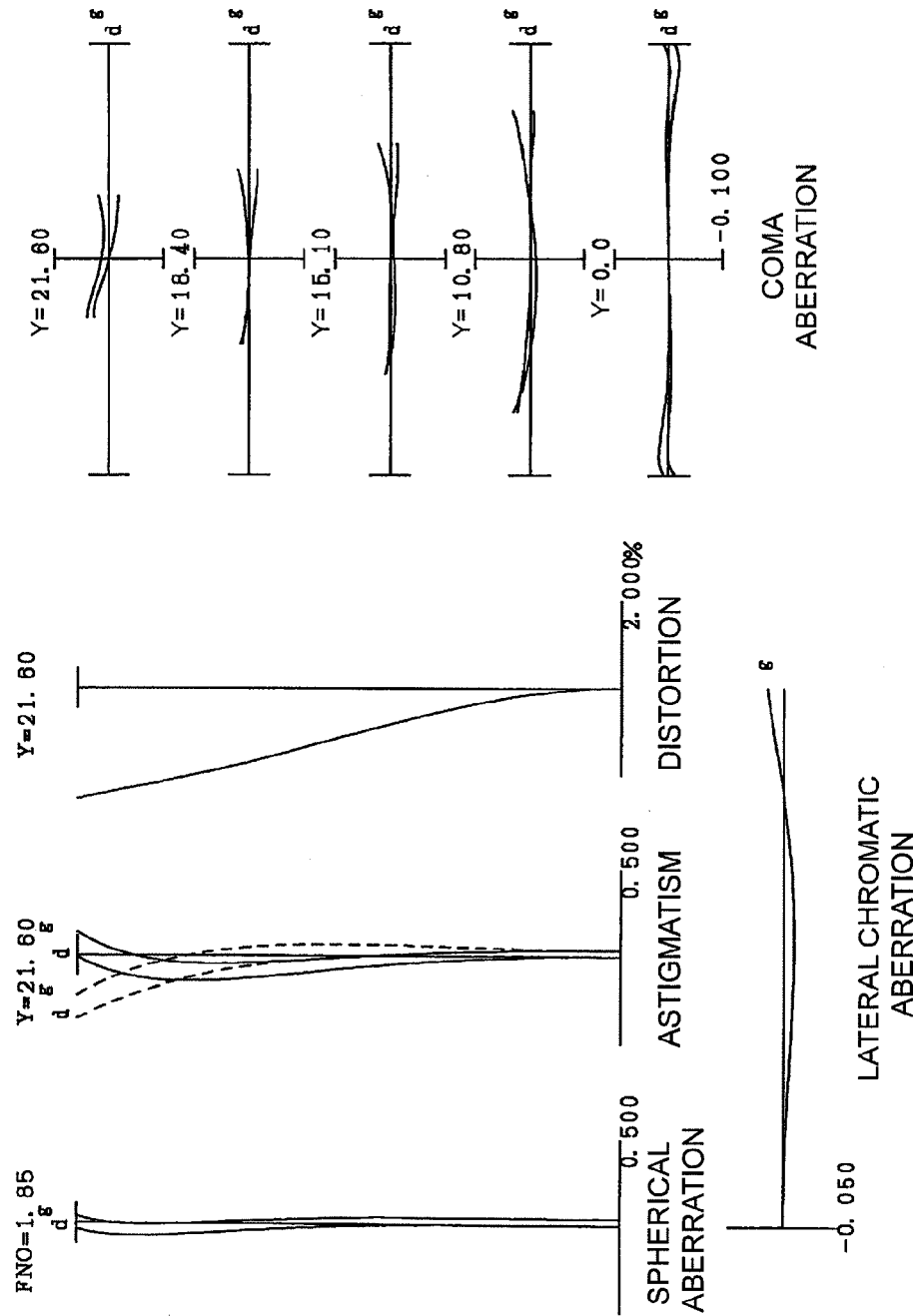
FIG. 6A are graphs showing various aberrations upon focusing on infinity according to Example 3, and FIG. 6B are graphs showing various aberrations upon focusing on a close distance (D0=200 mm)
Figure 6B:
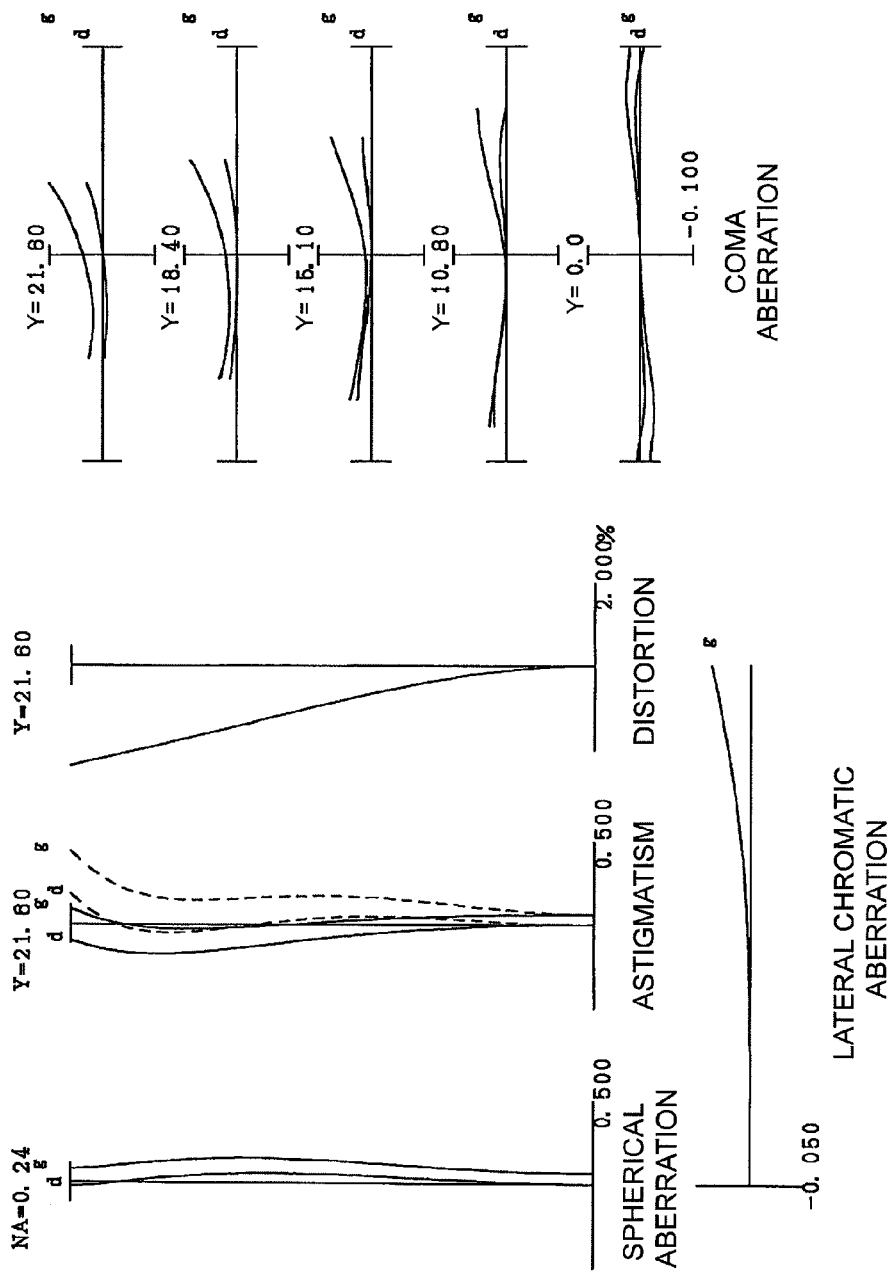

FIG. 6A and FIG. 6B are graphs showing various aberrations of the wide angle lens WL3 according to Example 3. Here FIG. 6A are graphs showing various aberrations upon focusing on infinity, and FIG. 6B are graphs showing various aberrations upon focusing on a short distance (D0=200 mm). In Example 3, as each graph on aberration shows, various aberrations are corrected well, and excellent image forming performance is exhibited. As a result, excellent image forming performance can be ensured for a digital single lens reflex camera CAM as well, by installing the wide angle lens WL3 of Example 3.

Example 4

Example 4 will now be described with reference to FIG. 7, FIG. 8 and Table 4. FIG. 7 is a diagram depicting a lens configuration of a wide angle lens WL (WL4) according to Example 4. The wide angle lens WL4 according to Example 4 comprises, in order from an object, a first lens group G1 having negative refractive power, and the second lens group G2 having positive refractive power, and the second lens group G2 further comprises, in order from the object, a front group G2a having positive refractive power, a aperture stop S and a rear group G2b having positive refractive power.

The first lens group G1 includes, in order from an object, a first negative meniscus lens L11 having a convex surface facing the object, a second negative meniscus lens L12 having a convex surface facing the object, and a cemented positive lens where a first positive meniscus lens L13 having a convex surface facing the object and a third meniscus lens L14 having a convex surface facing the object are cemented, and the lens surface of the second negative meniscus lens L12 facing the image plane I is aspherical. The front group G2a of the second lens group G2 includes a first positive lens L21 having a biconvex form. The rear group G2b of the second lens group G2 includes, in order from the object, a fourth negative meniscus lens L22 having a convex surface facing the object, a cemented negative lens where a negative lens L23 having a biconcave form and a second positive lens L24 having a biconvex form are cemented, a third positive lens L25 having a biconvex form, and second positive meniscus lens L26 having a convex surface facing the Image plane I, and the lens surface of the third positive lens L25 facing the image plane I is aspherical.

Upon focusing from an object at infinity to an object at a short distance (finite distance), the first lens group G1 is fixed and the second lens group G2 moves. During this time, the front group G2a, the aperture stop S and the rear group G2b of the second lens group G2 move in tandem.

Table 4 shows each data value of Example 4. The radius of curvature R in the surface 1 to surface 20 in Table 4 correspond to the reference symbols R1 to R20 assigned to surface 1 to surface 20 in FIG. 7. In Example 4, the lens surfaces of surface 5 and surface 18 are formed to be aspherical respectively.

TABLE 4

[General Data]

f = 31.00
FNO = 1.84
ω = 35.45
Y = 21.60
TL = 111.05
Bf = 40.08

[Lens Data]

| N | R | D | nd | νd | |
|---|---|---|---|---|---|
| 1 | 54.8755 | 1.5000 | 1.77250 | 49.61 | |
| 2 | 24.3470 | 6.4422 | | | |
| 3 | 46.8800 | 1.5000 | 1.77250 | 49.61 | |
| 4 | 30.0000 | 0.1000 | 1.52050 | 50.97 | |
| 5* | 28.1565 | 10.0000 | | | |
| 6 | 39.4043 | 6.0000 | 1.83481 | 42.76 | |
| 7 | 799.7751 | 1.3000 | 1.51823 | 58.82 | |
| 8 | 50.6325 | (d1) | | | |
| 9 | 34.7711 | 5.7076 | 1.80400 | 46.58 | |
| 10 | −127.3217 | 4.2607 | | | |
| 11 | 0.0000 | 1.8217 | | | (Aperture stop) |
| 12 | 311.4924 | 1.2000 | 1.58144 | 40.98 | |
| 13 | 50.7052 | 5.0000 | | | |
| 14 | −23.2205 | 1.4000 | 1.78472 | 25.64 | |
| 15 | 45.6877 | 4.0000 | 1.59319 | 67.90 | |
| 16 | −102.0531 | 0.5000 | | | |
| 17 | 224.5463 | 3.3243 | 1.77250 | 49.62 | |
| 18* | −72.9478 | 1.1000 | | | |
| 19 | −271.1411 | 4.5000 | 1.80400 | 46.60 | |
| 20 | −28.5408 | (Bf) | | | |

[Aspherical Data]

surface 5

κ = 1.0000, A4 = −3.78292E−06, A6 = −3.64587E−09,
A8 = −1.01198E−11, A10 = 3.37967E−15 surface 18

κ = 1.0000, A4 = 1.43983E−05, A6 = 6.14666E−11,
A8 = 0.00000E+00, A10 = 0.00000E+00

[Variable Distance Data]

|  | infinity | short distance |
|---|---|---|
| D0 = | ∞ | 200.0000 |
| d1 = | 11.3148 | 4.5052 |

FIG. 8A and FIG. 8B are graphs showing various aberrations of the wide angle lens WL4 according to Example 4. Here FIG. 8A are graphs showing various aberrations upon focusing on infinity, and FIG. 8B are graphs showing various aberrations upon focusing on a short distance (D0=200 mm). In Example 4, as each graph on aberration shows, various aberrations are corrected well, and excellent image forming performance is exhibited. As a result, excellent image forming performance can be ensured for a digital single lens reflex camera CAM as well, by installing the wide angle lens WL4 of Example 4.

Table 5 shows values corresponding to the conditional expressions according to each example.

TABLE 5

|  | Example 1 | Example 2 | Example 3 | Example 4 |
|---|---|---|---|---|
| Conditional expression (1) | 0.43 | 0.87 | 0.66 | 0.38 |
| Conditional expression (2) | 2.03 | 1.90 | 1.52 | 1.79 |

TABLE 5-continued

|  | Example 1 | Example 2 | Example 3 | Example 4 |
|---|---|---|---|---|
| Conditional expression (3) | 1.33 | 1.56 | 1.57 | 1.11 |
| Conditional expression (4) | 1.37 | 1.33 | 1.38 | 1.28 |
| Conditional expression (5) | 2.78 | 2.53 | 2.10 | 2.29 |
| Conditional expression (6) | 1.83481 | 1.83481 | 1.81600 | 1.83481 |
| Conditional expression (7) | 42.76 | 42.76 | 46.62 | 42.76 |

Thus in each example, each of the conditional expressions is satisfied respectively. As a result, according to Example 1 to Example 4, an optical system (wide angle lens WL) and an optical apparatus (digital single lens reflex camera CAM) having a good optical performance can be implemented.

Figure 11:
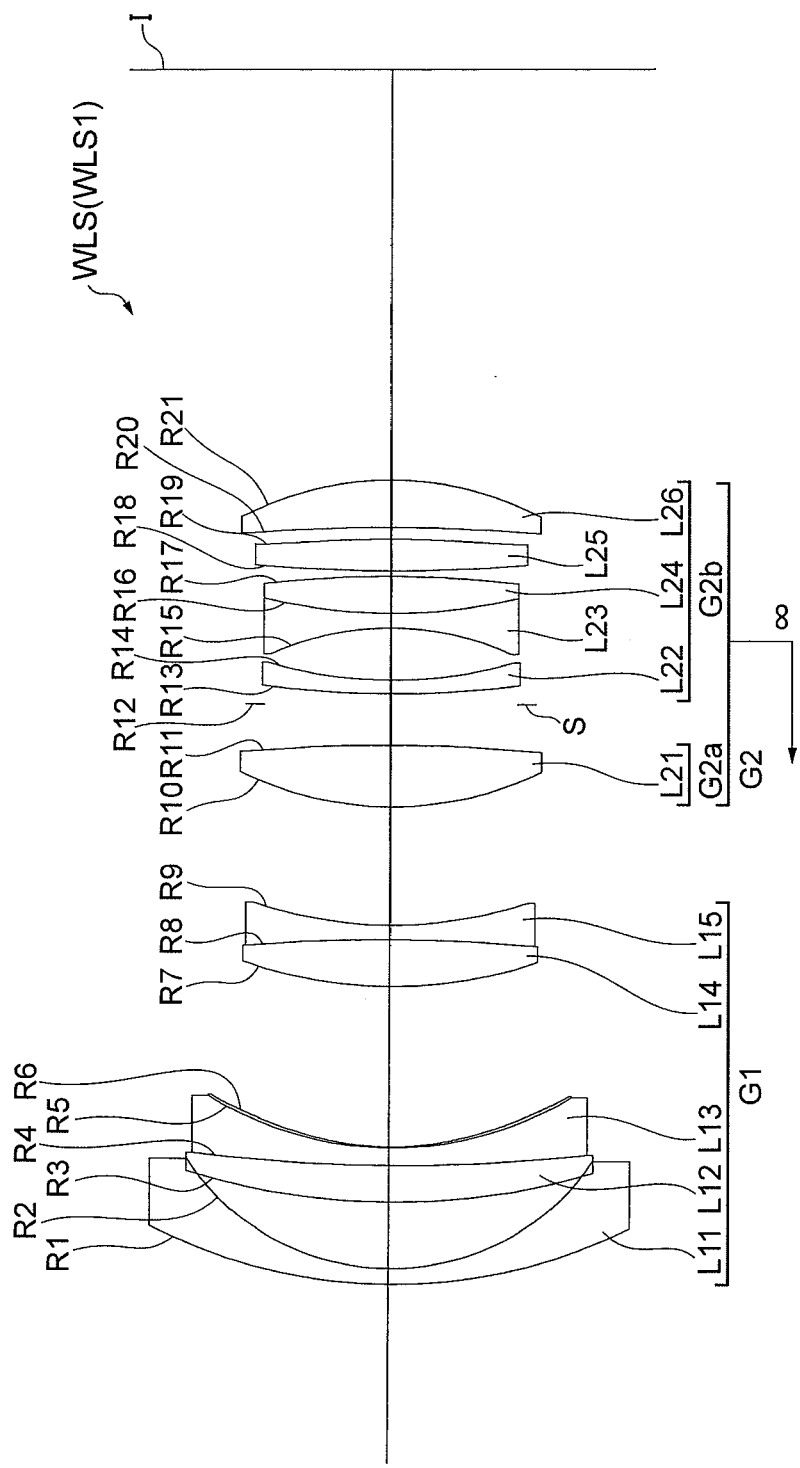
FIG. 11 is a cross-sectional view depicting a lens configuration an optical system according to Example 5.

Now the second embodiment of the present invention will be described. An optical system WLS according to the second embodiment comprises, in order from an object, a first lens group G1 having negative refractive power and a second lens group G2 having positive refractive power, as shown in FIG. 11 for example. Because of this configuration, a smaller lens barrel can be used and each aberration can be corrected well. The second lens group G2 further comprises a front group G2a located closer to the object than a aperture stop S disposed in the second lens group G2, and a rear group G2b located closer to an image than the aperture stop S. Upon focusing from an object at infinity to an object at a short distance (finite distance), the first lens group G1 is fixed and the second lens group G2 moves. Because of this configuration, a smaller lens barrel can be used, and Change of aberrations due to focusing can be corrected well.

In the optical system WLS having this configuration, it is preferable that the following conditional expression (9) is satisfied, where f2a denotes a focal length of the front group G2a of the second lens group G2, and f2b denotes a focal length of the rear group G2b of the second lens group G2.

$$0.10 < f2a/f2b < 1.00 \quad (9)$$

The conditional expression (9) specifies a ratio between the focal length f2a of the front group G2a and the focal length f2b of the rear group G2b in the second lens group G2. If the conditional expression (9) is satisfied, a sagittal coma flare of the optical system WLS of the present embodiment can be corrected well. If the upper limit value of the conditional expression (9) is exceeded, the refractive power of the front group G2a decreases, and it becomes difficult to correct sagittal coma aberration. At the same time, the refractive power of the rear group G2b increases, and it becomes difficult to correct spherical aberration and coma aberration. If the lower limit value of the conditional expression (9) is not reached, the refractive power of the front group G2a increases, and it becomes difficult to correct spherical aberration and to secure back focus.

To ensure the effect of the present embodiment, it is preferable that the upper limit value of the conditional expression (9) is 0.95. To further ensure the effect of the present embodiment, it is preferable that the upper limit value of the conditional expression (9) is 0.90. To ensure the effect of the present embodiment, it is preferable that the lower limit value of the conditional expression (9) is 0.20. To further ensure the effect of the present embodiment, it is preferable that the lower limit value of the conditional expression (9) is 0.30.

In the optical system WLS according to the present embodiment, an antireflection coating is formed at least on one surface of the optical surfaces of the first lens group G1 and the second lens group G2, and the antireflection coating includes at least one layer formed using a wet process. Because of this configuration, ghosts and flares generated by the light from the object being reflected on the optical surface can be further decreased, and high image forming performance can be implemented.

In this optical system WLS, it is preferable that the antireflection coating is a multilayer film, and the layer formed using the wet process is a layer on the outermost surface of the layers constituting the multilayer film. Then the refractive index difference from air can be decreased, hence reflection of light can be decreased, and ghosts and flares can be further decreased.

In this optical system WLS, it is preferable that the refractive index nd (with respect to d-line) of the layer formed using the wet process is 1.30 or less. Then the refractive index difference from air can be decreased, hence reflection of light can be decreased, and ghosts and flares can be further decreased.

In this optical system WLS, it is preferable that the antireflection coating is formed on the optical surface having a concave form when viewed from the aperture stop S. The reflected light is more easily generated on the concave-formed optical surface when viewed from the aperture stop S, out of the optical surfaces of the first lens group G1 and the second lens group G2, therefore by forming the antireflection coating on such an optical surface, ghosts and flares can be effectively decreased.

In this optical system WLS, it is preferable that the optical surface having a concave form when viewed from the aperture stop S is a lens surface closest to the object in the lenses of the first lens group G1 and the second lens group G2. The reflected light is more easily generated on the concave-formed lens surface when viewed from the aperture stop S, out of the optical surfaces of the first lens group G1 and the second lens group G2, therefore by forming the antireflection coating on such a lens surface, ghosts and flares can be effectively decreased.

In this optical system WLS, it is preferable that the optical surface having a concave form when viewed from the aperture stop S is a lens surface closest to the image plane in the lenses of the first lens group G1 and the second lens group G2. The reflected light is more easily generated on the concave-formed lens surface when viewed from the aperture stop S, out of the optical surfaces of the first lens group G1 and the second lens group G2, therefore by forming the antireflection coating on such a lens surface, ghosts and flares can be effectively decreased.

In this optical system WLS, it is preferable that the antireflection coating is formed on the optical surface having a concave form when viewed from the image plane. The reflected light is more easily generated on the concave-formed optical surface when viewed from the image plane, out of the optical surfaces of the second lens group G2, therefore by forming the antireflection coating on such an optical surface, ghosts and flares can be effectively decreased.

In this optical system WLS, it is preferable that the optical surface having a concave form when viewed from the image plane is a lens surface closest to the object in the lenses of the second lens group G2. The reflected light is more easily generated on the concave-formed lens surface when viewed from the image plane out of the optical surfaces of the second lens group G2, therefore by forming the antireflection coating on such a lens surface, ghosts and flares can be effectively decreased.

In this optical system WLS, it is preferable that the optical surface having a concave form when viewed from the image plane is a lens surface closest to the image plane in the lenses of the second lens group G2. The reflected light is more easily generated on the concave-formed lens surface when viewed from the image plane out of the optical surfaces of the second lens group G2, therefore by forming the antireflection coating on such a lens surface, ghosts and flares can be effectively decreased.

The antireflection coating may be formed using a dry process, instead of a wet process. In this case, it is preferable that the antireflection coating includes at least one layer of which refractive index is 1.30 or less. If at least one layer of which refractive index is 1.30 or less is included, a same effect as using the wet process can be obtained even if the antireflection coating is formed using the dry process. In this case, it is preferable that the layer of which refractive index is 1.30 or less is a layer of the outermost surface of the layers constituting the multilayer film.

In this optical system WLS, it is preferable that the following conditional expression (10) is satisfied, where f1 denotes a focal length of the first lens group G1, and f2 denotes a focal length of the second lens group G2.

$$0.10 < (-f1)/f2 < 2.50 \qquad (10)$$

The conditional expression (10) specifies the ratio between the focal length f1 of the first lens group G1 and the focal length f2 of the second lens group G2. The optical system WLS of the present embodiment can implement a good performance by satisfying the conditional expression (10). If the upper limit value of the conditional expression (10) is exceeded, the refractive power of the second lens group G2 increases, and it becomes difficult to correct spherical aberration and coma aberration. If the lower limit value of the conditional expression (10) is not reached, the refractive power of the first lens group G1 increases, and it becomes difficult to correct curvature of field and distortion.

To ensure the effect of the present embodiment, it is preferable that the upper limit value of the conditional expression (10) is 2.30. To further ensure the effect of the present embodiment, it is preferable that the upper limit value of the conditional expression (10) is 2.10. To ensure the effect of the present embodiment, it is preferable that the lower limit value of the conditional expression (10) is 0.70. To further ensure the effect of the present embodiment, it is preferable that the lower limit value of the conditional expression (10) is 1.20.

In this optical system WLS, it is preferable that the following conditional expression (11) is satisfied, where f denotes a focal length of the optical system WLS upon focusing on infinity.

$$0.10 < f2a/f < 1.70 \qquad (11)$$

The conditional expression (11) specifies a ratio between the focal length f2a of the front group G2a of the second lens group G2 and the focal length f of the entire optical system WLS upon focusing on infinity. The optical system WLS of the present embodiment can implement a good optical performance by satisfying the conditional expression (11). If the lower limit value of the conditional expression (11) is not reached, the refractive power of the front group G2a of the second lens group G2 increases, and it becomes difficult to correct spherical aberration and to secure back focus. If the upper limit value of the conditional expression (11) is exceeded, the refractive power of the front group G2a decreases, and it becomes difficult to correct sagittal coma aberration. At the same time, the refractive power of the rear group G2b of the second lens group G2 increases, and it becomes difficult to correct spherical aberration and coma aberration.

To ensure the effect of the present embodiment, it is preferable that the upper limit value of the conditional expression (11) is 1.65. To further ensure the effect of the present embodiment, it is preferable that the upper limit value of the conditional expression (11) is 1.60. To ensure the effect of the present embodiment, it is preferable that the lower limit value of the conditional expression (11) is 0.50. To further ensure the effect of the present embodiment, it is preferable that the lower limit value of the conditional expression (11) is 1.00.

In this optical system WLS, it is preferable that the following conditional expression (12) is satisfied, where f2 denotes a focal length of the second lens group G2, and f denotes a focal length of the optical system WLS upon focusing on infinity.

$$0.20 < f2/f < 1.55 \qquad (12)$$

The conditional expression (12) specifies the ratio between the focal length f2 of the second lens group G2 and the focal length f of the entire optical system WLS upon focusing on infinity. The optical system WLS of the present embodiment can implement good optical performance by satisfying the conditional expression (12). If the lower limit of the conditional expression (12) is not reached, the refractive power of the second lens group G2 increases, and it becomes difficult to secure back focus and to correct spherical aberration and coma aberration. If the upper limit value of the conditional expression (12) is exceeded, the refractive power of the second lens group G2 decreases, and the total length of the optical system WLS increases. Furthermore it becomes difficult to correct spherical aberration and coma aberration.

To ensure the effect of the present embodiment, it is preferable that the upper limit value of the conditional expression (12) is 1.45. To further ensure the effect of the present embodiment, it is preferable that the upper limit value of the conditional expression (12) is 1.35. To ensure the effect of the present embodiment, it is preferable that the lower limit value of the conditional expression (12) is 0.35. To further ensure the effect of the present embodiment, it is preferable that the lower limit value of the conditional expression (12) is 0.65. To even further ensure the effect of the present embodiment, it is preferable that the lower limit value of the conditional expression (12) is 1.00.

In this optical system WLS, it is preferable that the rear group G2b of the second lens group G2 has at least one aspherical lens. Because of this configuration, spherical aberration and sagittal coma aberration can be corrected well.

In this optical system WLS, it is preferable that the rear group G2b of the second lens group G2 has two positive lenses disposed in order from the image. Because of this configuration, spherical aberration and coma aberration can be corrected well.

In this optical system WLS, it is preferable that the following conditional expression (13) is satisfied, where f1 denotes a focal length of the first lens group G1, and f denotes a focal length of the optical system WLS upon focusing on infinity.

$$(-f2)/f < 5.0 \qquad (13)$$

The conditional expression (13) specifies the ratio between the focal length f1 of the first lens group G1 and the focal length f of the entire optical system WLS upon focusing on infinity. The optical system WLS of the present embodiment can implement a good optical performance by satisfying the conditional expression (13). If the upper limit value of the conditional expression (13) is exceeded, the refractive power of the first lens group G1 decreases, and the refractive power of the second lens group G2 increases to obtain a predetermined angle of view, and it becomes difficult to correct spherical aberration and coma aberration.

To ensure the effect of the present embodiment, it is preferable that the upper limit value of the conditional expression (13) is 4.0. To further ensure the effect of the present embodiment, it is preferable that the upper limit value of the conditional expression (13) is 3.0.

In this optical system WLS, it is preferable that the first lens group G1 has two negative lenses disposed in order from the object. Because of this configuration, coma aberration, curvature of field and distortion can be corrected well.

In this optical system WLS, it is preferable that the first lens group G1 has at least one spherical lens. Because of this configuration, curvature of field and distortion can be corrected well.

In this optical system WLS, it is preferable that the first lens group G1 has a positive lens, and the following conditional expression (14) and conditional expression (15) are satisfied respectively, where $n1p$ denotes a mean value of the refractive indexes of the positive lenses, and $v1p$ denotes a mean value of the Abbe numbers of the positive lenses.

$$n1p > 1.800 \quad (14)$$

$$v1p > 28.00 \quad (15)$$

The conditional expression (14) and conditional expression (15) specify the characteristics of glass material of the positive lens of the first lens group G1. If these conditions are satisfied in the optical system WLS of the present embodiment, lateral chromatic aberration, distortion and curvature of field generated in the negative lens of the first lens group G1 can be corrected well. If the lower limit value of the conditional expression (14) is not reached, it becomes difficult to correct distortion, curvature of field and coma aberration generated in the negative lens. If the lower limit value of the conditional expression (15) is not reached, secondary dispersion increases, hence it becomes difficult to correct lateral chromatic aberration sufficiently.

To ensure the effect of the present embodiment, it is preferable that the lower limit value of the conditional expression (14) is 1.840. To further ensure the effect of the present embodiment, it is preferable that the lower limit value of the conditional expression (15) is 30.00.

In this optical system WLS, it is preferable that the front group G2a and the rear group G2b of the second lens group G2 move in tandem along the optical axis upon focusing from an object at infinity to an object at a short distance (finite distance). Because of this configuration, change of aberrations caused by manufacturing error can be decreased. Thus according to the second embodiment, an optical system WLS having a good optical performance with less ghosts and flares, and an optical apparatus (digital single lens reflex camera CAM) having this optical system WLS can be implemented.

A method for manufacturing the optical system WLS having the above mentioned configuration will be described with reference to FIG. 10. First the first lens group G1 and the second lens group G2 are assembled in a cylindrical lens barrel (step S1). Here each lens of the first and second lens groups G1 and G2 is disposed so that the conditional expressions (9), (10), (11) and (12) are satisfied respectively. When each lens is assembled in the lens barrel, each lens may be assembled in the lens barrel one at a time, in order along the optical axis, or a part or all of the lenses may be integrated and held on a holding member, and then assembled in the lens barrel.

After assembling each lens group in the lens barrel, it is checked whether the object image is formed in a state where each lens group is assembled in the lens barrel, that is, whether the center of each lens group is aligned (step S2). According to the present embodiment, the antireflection coating is formed on at least one surface of the optical surfaces of the first lens group G1 and the second lens group G2, and this antireflection coating is structured including at least one layer formed using a wet processing, so as to decrease ghosts and flares.

After checking that the image is formed, various operations of the optical system WL are checked (step S3). Examples of the various operations are: a focusing operation in which lens groups, which perform focusing from an object at a long distance to an object at a short distance, move along the optical axis; and a hand motion blur correction operation in which at least a part of the lenses move, so as to have components orthogonal to the optical axis. According to the present embodiment, the first lens group G1 is fixed and the second lens group G2 moves upon focusing from an object at a long distance (object at infinity) to an object at a short distance (object at finite distance). The sequence of checking the various operations is arbitrary. According to this manufacturing method, change of aberrations is suppressed, and an optical system WL having a good optical performance with fewer ghosts and flares can be obtained.

Examples of Second Embodiment

Example 5

Each example of the second embodiment will now be described with reference to the drawings. Example 5 will be described first with reference to FIG. 11 to FIG. 13 and Table 6. FIG. 11 is a diagram depicting a lens configuration of an optical system WLS(WLS1) according to Example 1. The optical system WLS(WLS1) according to Example 5 comprises, in order from an object, a first lens group G1 having negative refractive power, and a second lens group G2 having positive refractive power, and the second lens group G2 further comprises, in order from the object, a front group G2a having positive refractive power, a aperture stop S and a rear group G2b having positive refractive power.

The first lens group G1 includes, in order from an object, a first negative meniscus lens L11 having a convex surface facing the object, a cemented negative lens where a first positive meniscus lens L12 having a convex surface facing the object and a second negative meniscus lens L13 having a convex surface facing the object are cemented, and a cemented positive lens where a first positive lens L14 having a biconvex form and a first negative lens L15 having a biconcave form are cemented, and in the first lens group G1a lens surface closest to the image plane I in the second negative meniscus lens L13 is aspherical.

The front group G2a of the second lens group G2 includes, in order from the object, a second positive lens L21 having a biconvex form. The rear group G2b of the second lens group G2 includes, a third negative meniscus lens L22 having a convex surface facing the object, a cemented negative lens where a second negative lens L23 having a biconcave form and a third positive lens L24 having a biconvex form are cemented, a fourth positive lens L25 having a biconvex form, and a second positive meniscus lens L26 having a convex surface facing the image plane I. In the rear group G2b of the second lens group G2, the lens surface of the fourth positive lens L25 facing the image plane I is aspherical. A later mentioned antireflection coating is formed on a lens surface of the third negative meniscus lens L22 facing the image plane I (surface number 14) and a lens surface of the fourth positive lens L25 facing the image plane I (surface number 19).

Upon focusing from an object at infinity to an object at a short distance (finite distance), the first lens group G1 is fixed and the second lens group G2 moves. During this time, the front group G2a, the aperture stop S and the rear group G2b of the second lens group G2 move in tandem.

Table 6 to Table 9 shown below list each data on optical systems according to Example 5 to Example 8. In [General Data] in each table, f is a focal length, FNO is an F number, ω is a half angle of view (maximum incident angle: unit is "°"), Y is an image height, TL is a total lens length (length converted to air), and Bf is a back focus (length converted to air). In [Lens Data], the first column N is the number of the lens surface counted from the object side, and second column R is a radius of curvature of the lens surface, the third column D is a distance to the next lens surface, the fourth column nd is a refractive index at d-line (wavelength λ=587.6 nm), and the fifth column νd is an Abbe number at d-line (wavelength=587.6 nm). "*" attached at to the right of the surface number indicates that this lens surface is aspherical. The radius of curvature "0.0000" indicates a plane, and the refractive index of air nd=1.00000 is omitted.

In [Aspherical Data], an aspherical coefficient is given by the following expression (16), where x denotes a displacement in the optical axis direction in a position at height h from the optical axis at a vertex of the surface, as a reference, κ is a conical coefficient, An is an aspherical coefficient in degree n (n=4, 6, 8, 10), and r is a paraxial radius of curvature shown in [Lens Data]. In each example, the aspherical coefficient in degree 2, that is A2, is 0, which is omitted. In [Aspherical Data], "E-n" indicates "×10$^{-n}$".

$$x=(h^2/r)/[1+\{1-\kappa\times(h/r)^2\}^{1/2}]+A4\times h^4+A6\times h^6+A8\times h^8+A10\times h^{10} \quad (16)$$

In [Variable Distance Data], a value of each variable distance upon focusing on infinity (D0=∞) and upon focusing on a short distance (D0=200 mm), where D0 is a distance from an object to a lens surface closest to the object, is shown. In all the data values, "mm" is normally used for the unit of focal length f, radius of curvature R, surface distance D and other lengths, but the unit is not limited to "mm", since an equivalent optical performance is obtained even if an optical system is proportionally expanded or proportionally reduced. For the later mentioned Example 6 to Example 8 as well, symbols the same as this example are used.

Table 6 shows each data value of Example 5. R in the surface 1 to surface 21 in Table 6 correspond to the reference symbols R1 to R21 assigned to surface 1 to surface 21 in FIG. 11. In Example 5, the lens surfaces of surface 6 and surface 19 are formed to be aspherical respectively.

TABLE 6

[General Data]

f = 28.70
FNO = 1.85
ω = 37.65
Y = 21.60
TL = 115.14
Bf = 38.90

TABLE 6-continued

[Lens Data]

| N | R | D | nd | νd | |
|---|---|---|----|----|---|
| object surface | ∞ | ∞ | | | |
| 1 | 49.1524 | 1.5000 | 1.77250 | 49.61 | |
| 2 | 22.6487 | 6.3000 | | | |
| 3 | 64.7809 | 3.5000 | 1.83481 | 42.73 | |
| 4 | 150.0000 | 1.7000 | 1.51680 | 63.88 | |
| 5 | 32.5000 | 0.1000 | 1.55389 | 38.23 | |
| 6* | 28.4668 | 15.0000 | | | |
| 7 | 41.4076 | 4.5000 | 1.83481 | 42.73 | |
| 8 | −157.2545 | 1.4000 | 1.51742 | 52.32 | |
| 9 | 39.7009 | (d1) | | | |
| 10 | 31.9258 | 5.8146 | 1.69680 | 55.52 | |
| 11 | −152.5356 | 3.9000 | | | |
| 12 | 0.0000 | 0.9989 | | | (Aperture stop) |
| 13 | 89.3478 | 1.3000 | 1.51742 | 52.20 | |
| 14 | 39.6652 | 5.0000 | | | |
| 15 | −26.3069 | 1.4000 | 1.78472 | 25.64 | |
| 16 | 50.5684 | 3.5000 | 1.59319 | 67.87 | |
| 17 | −98.4501 | 0.5000 | | | |
| 18 | 151.4501 | 3.0000 | 1.77250 | 49.62 | |
| 19* | −89.8749 | 1.1000 | | | |
| 20 | −169.6497 | 4.5000 | 1.80400 | 46.60 | |
| 21 | −29.4540 | (Bf) | | | |
| image plane | ∞ | | | | |

[Aspherical Data]

surface 6

κ = 1.0000, A4 = −4.67675E−06, A6 = −7.54681E−09,
A8 = −1.54602E−11, A10 = −1.83890E−14 surface 19

κ = 1.0000, A4 = 1.47607E−05, A6 = −2.02245E−10,
A8 = 0.00000E+00, A10 = 0.00000E+00

[Variable Distance Data]

| | infinity | short distance |
|---|---|---|
| D0 = | ∞ | 200.0000 |
| d1 = | 11.2300 | 6.3103 |

Figure 12A:
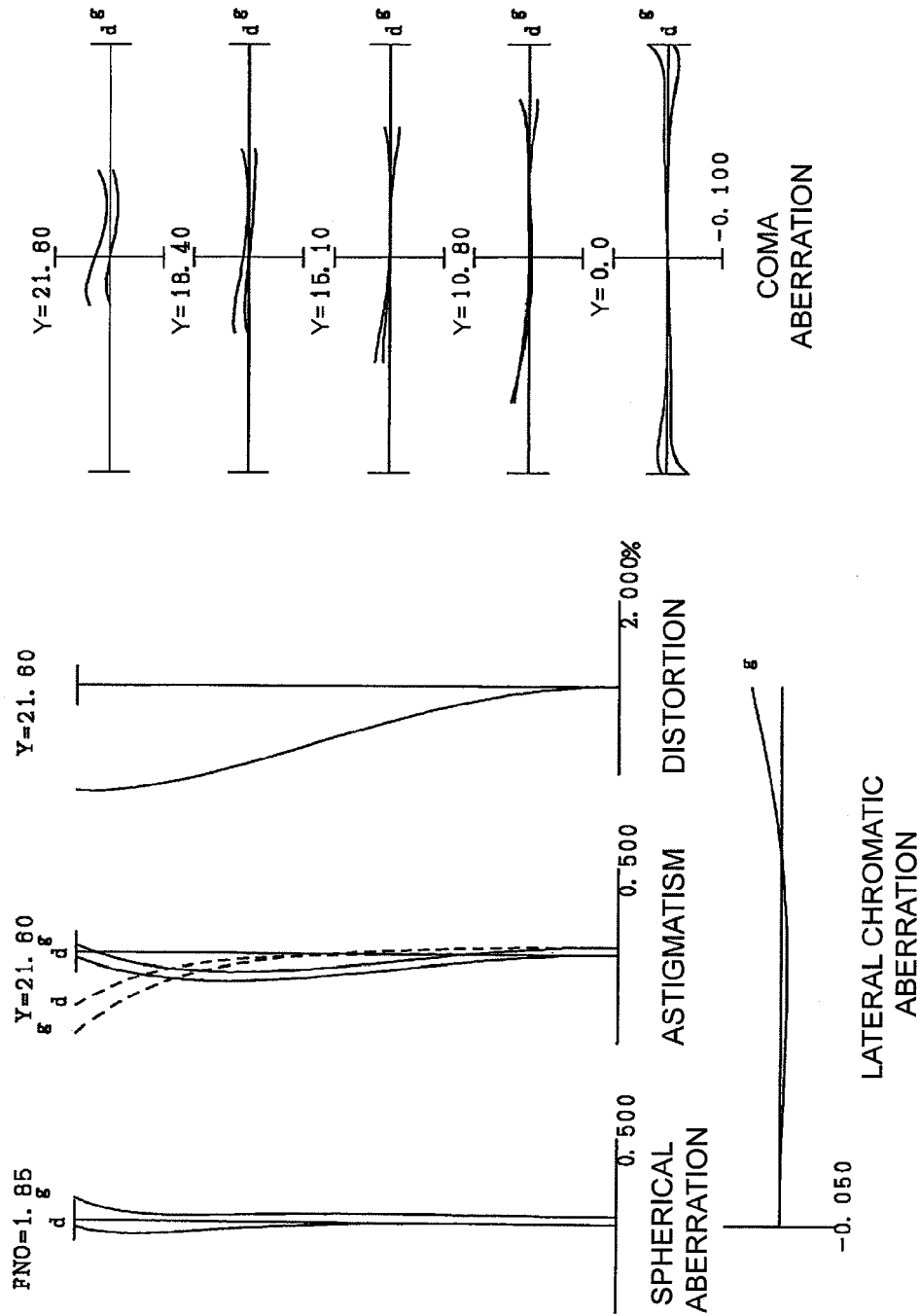
FIG. 12A are graphs showing various aberrations of the optical system upon focusing on infinity according to Example 5, and FIG. 12B are graphs showing various aberrations upon focusing on a close distance (D0=200 mm)
Figure 12B:
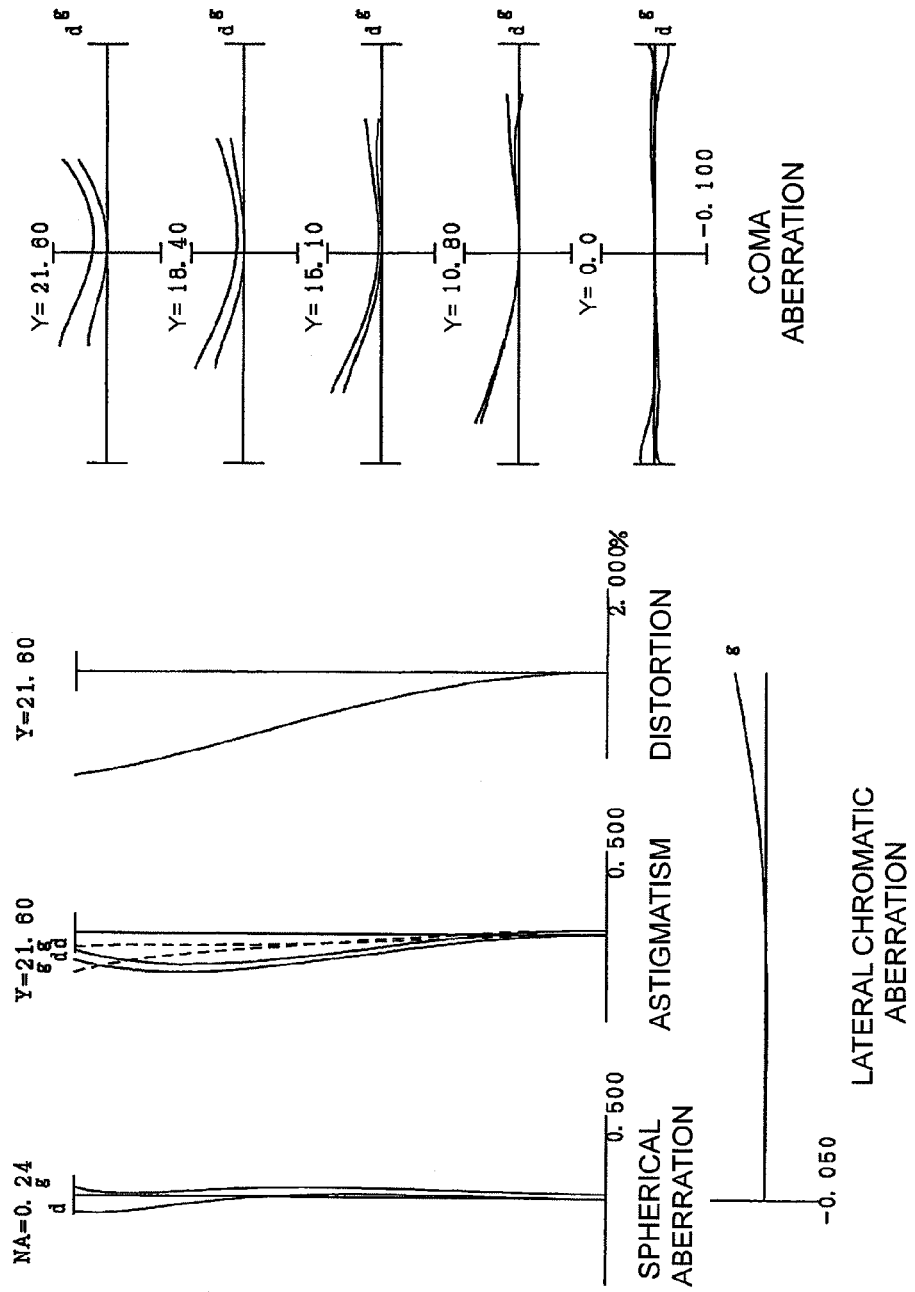

FIG. 12A and FIG. 12B are graphs showing various aberrations of the optical system WLS1 according to Example 5. Here FIG. 12A are graphs showing various aberrations upon focusing on infinity, and FIG. 12B are graphs showing various aberrations upon focusing on a short distance (D0=200 mm). In each graph showing aberrations, FNO denotes an F number, and Y denotes an image height. In the graph showing each aberration, d denotes d-line (λ=587.6 nm) and g denotes g-lines (λ=435.8 nm) respectively. In the graph showing astigmatism, the solid line indicates the sagittal image surface, and the broken line indicates the meridional image surface. The description on the graphs showing aberration is the same as the other examples.

In Example 5, as each graph on aberration shows, various aberrations are corrected well, and excellent image forming performance is exhibited. As a result, excellent image forming performance can be ensured for a digital single lens reflex camera CAM as well, by installing the optical system WLS1 of Example 5.

Figure 13:
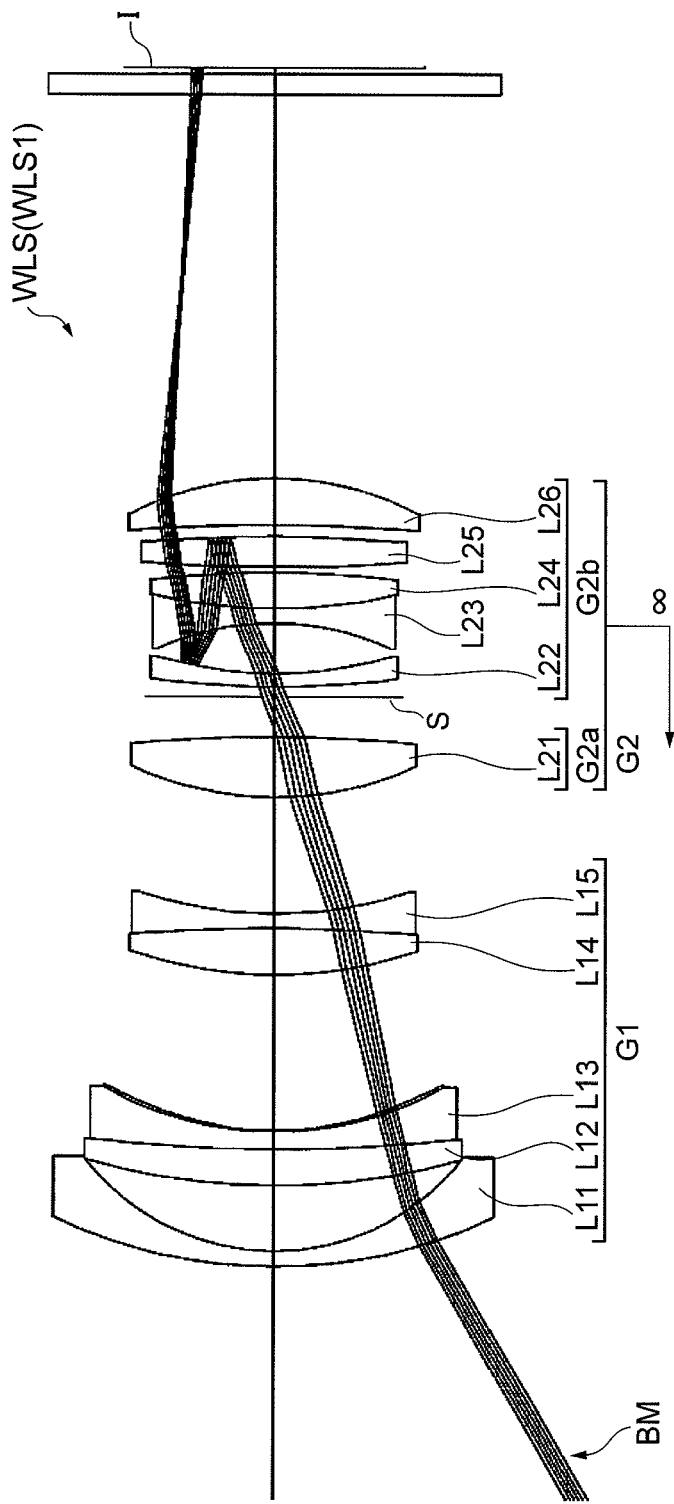
FIG. 13 is a cross-sectional view of the lens configuration of the optical system according to Example 5, depicting an example of a state of the incident ray being reflected on a first reflected light generation surface and a second reflected light generation surface.

FIG. 13 is a diagram of an optical system WLS1 having the same configuration as Example 5, depicting an example of a state of the entered-beam being reflected on a first reflection surface and a second reflection surface, and forming ghosts and flares on the image plane I. As FIG. 13 shows, if a beam BM from the object side enters the optical system WLS1, the beam reflects on the lens surface of the fourth positive lens L25 facing the image plane I (surface number 19, where the first reflected light is generated), and this reflected light is reflected again on a lens surface of the third negative meniscus lens L22 facing the image plane I (surface number 14, where the second reflected light is generated), reaches the image plane I, and generates ghosts and flares. Surface 19, which is the surface where the first reflected light is generated, is a lens surface having a concave form when viewed from the aperture stop S, and surface 14, which is the surface where the second reflected light is generated, is a lens surface having a concave form when viewed from the image plane I. By forming an antireflection coating corresponding to the wide incident angle in a wide wavelength range, ghosts and flares can be effectively decreased.

Example 6

Figure 14:
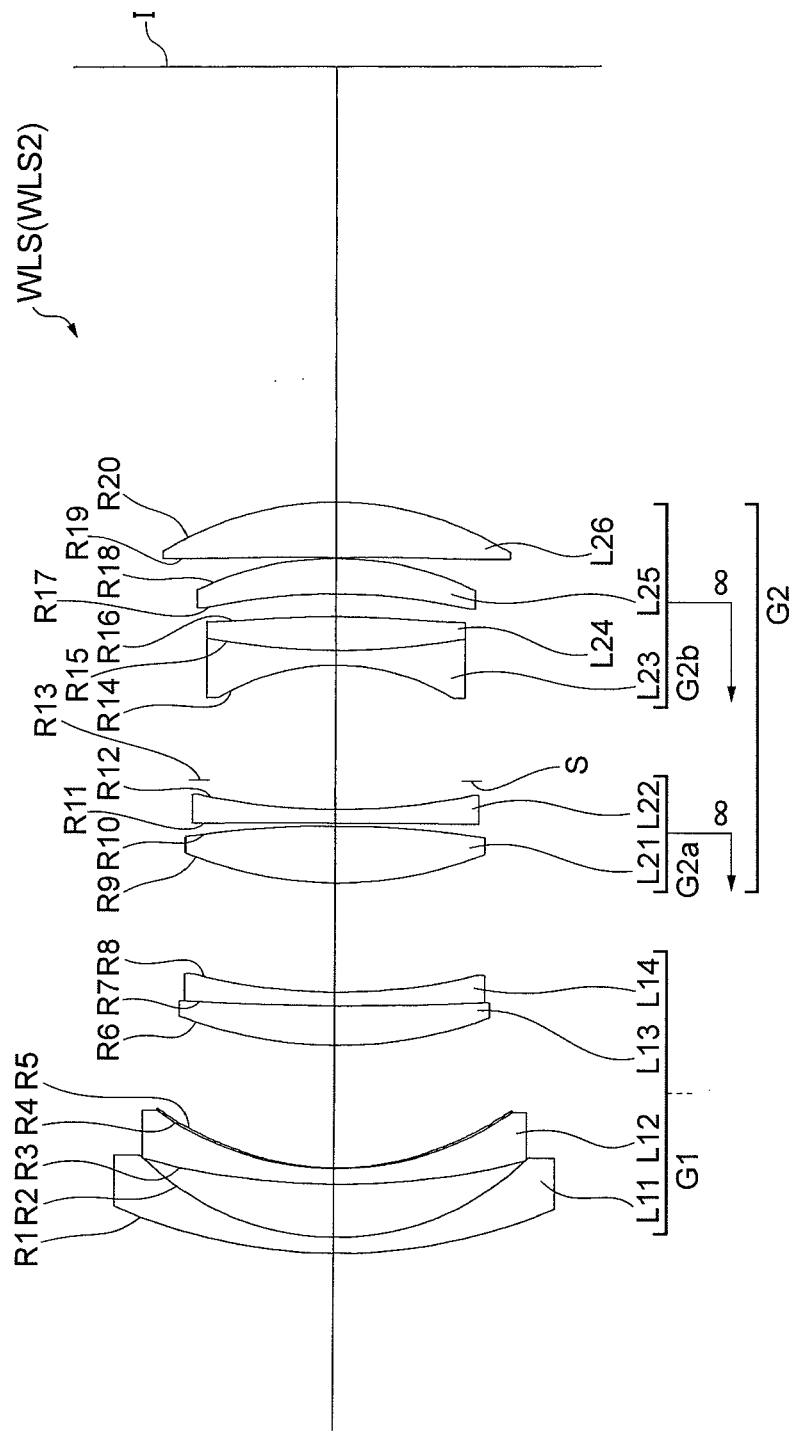
FIG. 14 is a cross-sectional view depicting a lens configuration an optical system according to Example 6.

Example 6 will now be described with reference to FIG. 14, FIG. 15 and Table 7. FIG. 14 is a sectional view depicting a lens configuration of an optical system WLS (WSL2) according to Example 6. The optical system WSL 2 according to Example 6 comprises, in order from an object, a first lens group G1 having negative refractive power, and the second lens group G2 having positive refractive power, and the second lens group G2 further comprises, in order from the object, a front group G2a having positive refractive power, a aperture stop S and a rear group G2b having positive refractive power.

The first lens group G1 includes, in order from an object, a first negative meniscus lens L11 having a convex surface facing the object, a second negative meniscus lens L12 having a convex surface facing the object, and a cemented positive lens where a first positive meniscus lens L13 having a convex surface facing the object and a third negative meniscus lens L14 having a convex surface facing the object, are cemented. In the first lens group G1, the lens surface of the second negative meniscus lens L12 facing the image plane I is aspherical. A later mentioned antireflection coating is formed on the lens surface of the first negative meniscus lens L11 facing the image plane I (surface number 2), and the lens surface of the second negative meniscus lens L12 facing the object (surface number 3).

The front group G2a of the second lens group G2 includes, in order from the object, a first positive lens L21 having a biconvex form and a first negative lens L22 having a biconcave form. The rear group G2b of the second lens group G2 includes, in order from the object, a cemented negative lens where a second negative lens L23 having a biconcave form and a second positive lens L24 having a biconvex form are cemented, a second positive meniscus lens L25 having a convex surface facing the image plane I, and a third positive meniscus lens L26 having a convex surface facing the image plane I. In the rear group G2b of the second lens group G2, the lens surface of the second positive lens L24 facing the image plane I is aspherical.

Upon focusing from an object at infinity to an object at a short distance (finite distance), the first lens group G1 is fixed and the second lens group G2 moves. During this time, in the second lens group G2, the front group G2a and the aperture stop S move in tandem, and the rear group G2b moves for a moving distance different from that of the front group G2a and the aperture stop S, so that the distance between the front group G2a and the rear group G2b decreases.

Table 7 shows each data value of Example 6. The radius of curvature R in surface 1 to surface 20 in Table 7 correspond to the reference symbols R1 to R20 assigned to surface 1 to surface 20 in FIG. 14. In Example 6, the lens surfaces of surface 5 and surface 16 are formed to be aspherical respectively.

TABLE 7

[General Data]

f = 31.02
FNO = 1.85
ω = 35.53
Y = 21.60
TL = 112.35
Bf = 41.12

[Lens Data]

| N | R | D | nd | vd |
|---|---|---|---|---|
| object surface | ∞ | ∞ | | |
| 1 | 51.3500 | 1.5000 | 1.69679 | 55.52 |
| 2 | 25.2423 | 4.9661 | | |
| 3 | 68.6565 | 1.5000 | 1.51680 | 64.11 |
| 4 | 28.1354 | 0.1000 | 1.52050 | 50.97 |
| 5* | 26.2816 | 11.5436 | | |
| 6 | 40.1060 | 3.7730 | 1.83480 | 42.72 |
| 7 | 245.2122 | 1.3000 | 1.51822 | 58.94 |
| 8 | 55.0388 | (d1) | | |
| 9 | 35.8474 | 5.4498 | 1.75499 | 52.31 |
| 10 | −90.5185 | 0.2911 | | |
| 11 | −1293.1200 | 1.3203 | 1.51742 | 52.31 |
| 12 | 59.5863 | 2.7402 | | |
| 13 | 0.0000 | (d2) | | (Aperture stop) |
| 14 | −21.2472 | 1.4020 | 1.78472 | 25.68 |
| 15 | 62.9942 | 3.1710 | 1.72915 | 54.66 |
| 16* | −81.0024 | 2.1794 | | |
| 17 | −55.3719 | 3.3993 | 1.59319 | 67.90 |
| 18 | −29.4567 | 0.1000 | | |
| 19 | −608.4131 | 5.2751 | 1.80400 | 46.58 |
| 20 | −29.8770 | (Bf) | | |
| image plane | ∞ | | | |

[Aspherical Data]

surface 5

κ = 1.0000, A4 = −3.12860E−06, A6 = −6.82480E−09,
A8 = 9.01370E−12, A10 = −1.54600E−14 surface 16

κ = 1.0000, A4 = 1.80620E−05, A6 = −5.80110E−09,
A8 = 0.00000E+00, A10 = 0.00000E+00

[Variable Distance Data]

| | infinity | short distance |
|---|---|---|
| D0 = | ∞ | 200.0000 |
| d1 = | 10.2521 | 4.3259 |
| d2 = | 10.9700 | 10.7329 |

Figure 15A:
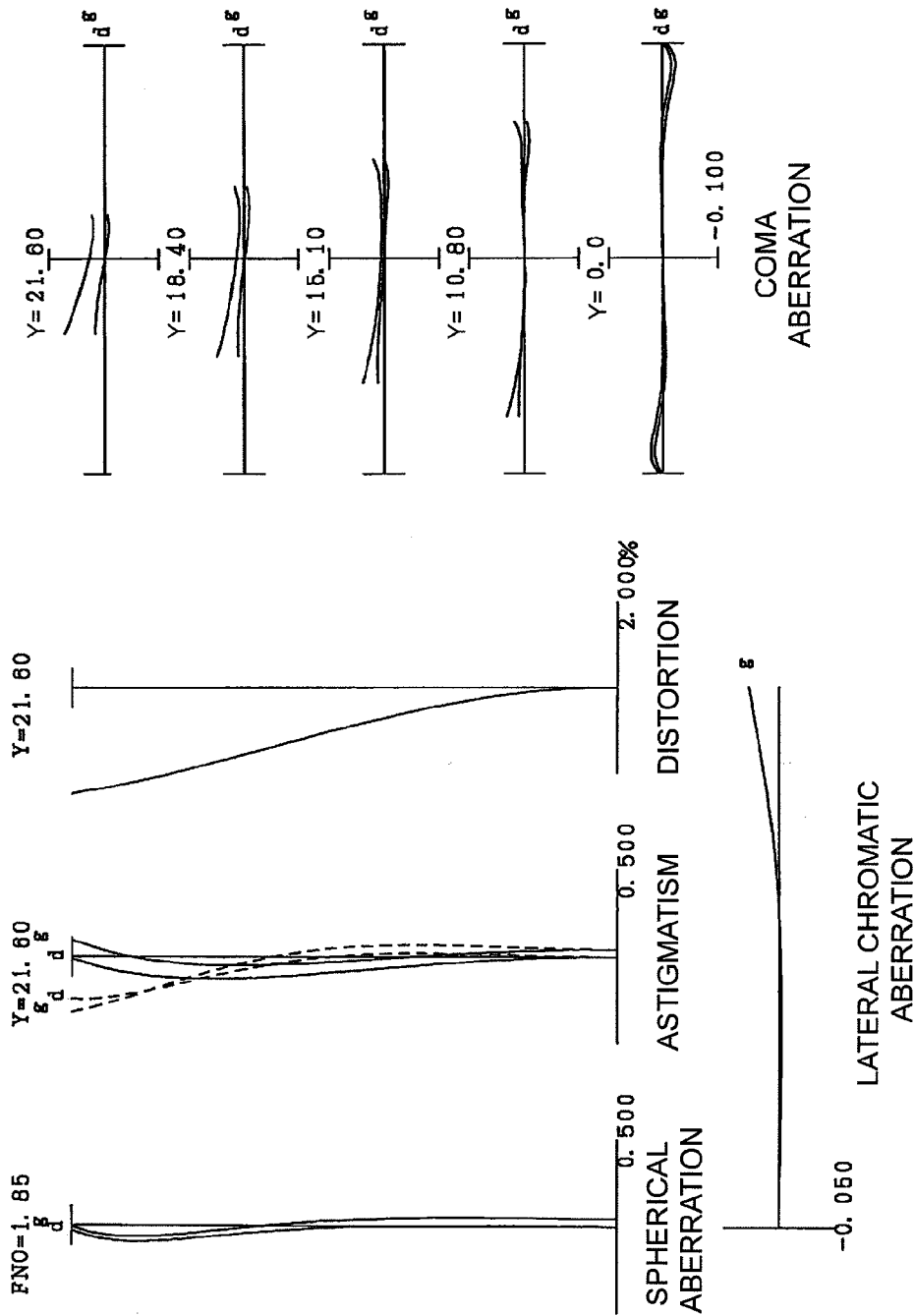
FIG. 15A are graphs showing various aberrations of the optical system upon focusing on infinity according to Example 6, and FIG. 15B are graphs showing various aberrations upon focusing on a close distance (D0=200 mm)

FIG. 15A and FIG. 15B are graphs showing various Aberrations of the optical system WLS2 according to Example 6. Here FIG. 15A are graphs showing various aberrations upon focusing on infinity, and FIG. 15B are graphs showing various aberrations upon focusing on a short distance (D0=200 mm). In Example 6, as each graph on aberration shows, various aberrations are corrected well, and excellent image forming performance is exhibited. As a result, excellent image forming performance can be ensured for a digital single lens reflex camera CAM as well, by installing the optical system WLS2 of Example 6.

Example 7

Example 7 will now be described with reference to FIG. 16, FIG. 17 and Table 8. FIG. 16 is a diagram depicting a lens configuration of an optical system WLS (WLS3) according to Example 7. The optical system WLS 3 according to Example 7 comprises, in order from an object, a first lens group G1 having negative refractive power, and the second lens group G2 having positive refractive power, and the second lens group G2 further comprises, in order from the object, a front group G2a having positive refractive power, a aperture stop S and a rear group G2b having positive refractive power.

The first lens group G1 includes, in order from an object, a first negative meniscus lens L11 having a convex surface facing the object, a second negative meniscus lens L12 having a convex surface facing the object, and a cemented positive lens where a positive meniscus lens L13 having a convex surface facing the object and a third meniscus lens L14 having a convex surface facing the object are cemented. In the first lens group G1 the lens surface of the second negative meniscus lens L12 facing the image plane I is aspherical.

The front group G2a of the second lens group G2 includes a first positive lens L21 having a biconvex form. The rear group G2b of the second lens group G2 includes, in order from the object, a fourth negative meniscus lens L22 having a convex surface facing the object, a cemented negative lens where a negative lens L23 having a biconcave form and a second positive lens L24 having a biconvex form are cemented, and a third positive lens L25 having a biconvex form, and the lens surface of the second positive lens L24 facing the image plane I is aspherical. A later mentioned antireflection coating is formed on the lens surface of the fourth negative meniscus lens L22 facing the object (surface number 12).

Upon focusing from an object at infinity to an object at a short distance (finite distance), the first lens group G1 is fixed and the second lens group G2 moves. During this time, the front group G1a, the aperture stop S and the rear group G2b of the second lens group G2 move in tandem.

Table 8 shows each data value of Example 7. The radius of curvature R in the surface 1 to surface 18 in Table 8 correspond to the reference symbols R1 to R21 assigned to surface 1 to surface 18 in FIG. 16. In Example 7, the lens surfaces of surface 5 and surface 16 are formed to be aspherical respectively.

TABLE 8

[General Data]

f = 28.70
FNO = 1.85
ω = 37.68
Y = 21.60
TL = 115.35
Bf = 38.90

[Lens Data]

| N | R | D | nd | vd | |
|---|---|---|---|---|---|
| object surface | ∞ | ∞ | | | |
| 1 | 47.3292 | 1.5000 | 1.72915 | 54.66 | |
| 2 | 22.8109 | 5.5771 | | | |
| 3 | 35.4413 | 1.5000 | 1.51680 | 64.11 | |
| 4 | 23.4810 | 0.2000 | 1.52050 | 50.97 | |
| 5* | 21.5311 | 17.0000 | | | |
| 6 | 37.4414 | 3.3161 | 1.81600 | 46.62 | |
| 7 | 104.2195 | 1.3000 | 1.51822 | 58.94 | |
| 8 | 40.6864 | (d1) | | | |
| 9 | 35.8877 | 5.2516 | 1.69679 | 55.52 | |
| 10 | −232.6661 | 5.9928 | | | |
| 11 | 0.0000 | 5.0287 | | | (Aperture stop) |
| 12 | 31.9060 | 1.3000 | 1.75519 | 27.51 | |
| 13 | 27.2893 | 5.6256 | | | |
| 14 | −25.1103 | 1.4000 | 1.78472 | 25.68 | |
| 15 | 30.2467 | 5.0249 | 1.80332 | 41.71 | |
| 16* | −69.5995 | 0.1000 | | | |
| 17 | 160.9651 | 5.4531 | 1.80610 | 40.94 | |
| 18 | −31.3476 | (Bf) | | | |
| image plane | ∞ | | | | |

[Aspherical Data]

surface 5

κ = 1.0000, A4 = −5.69480E−06, A6 = −3.25880E−08,
A8 = 6.98270E−11, A10 = −2.50300E−13 surface 16

κ = 1.0000, A4 = 1.27800E−05, A6 = 8.55920E−09,
A8 = 0.00000E+00, A10 = 0.00000E+00

[Variable Distance Data]

| | infinity | short distance |
|---|---|---|
| D0 = | ∞ | 200.0000 |
| d1 = | 10.8827 | 4.8932 |

Figure 17A:
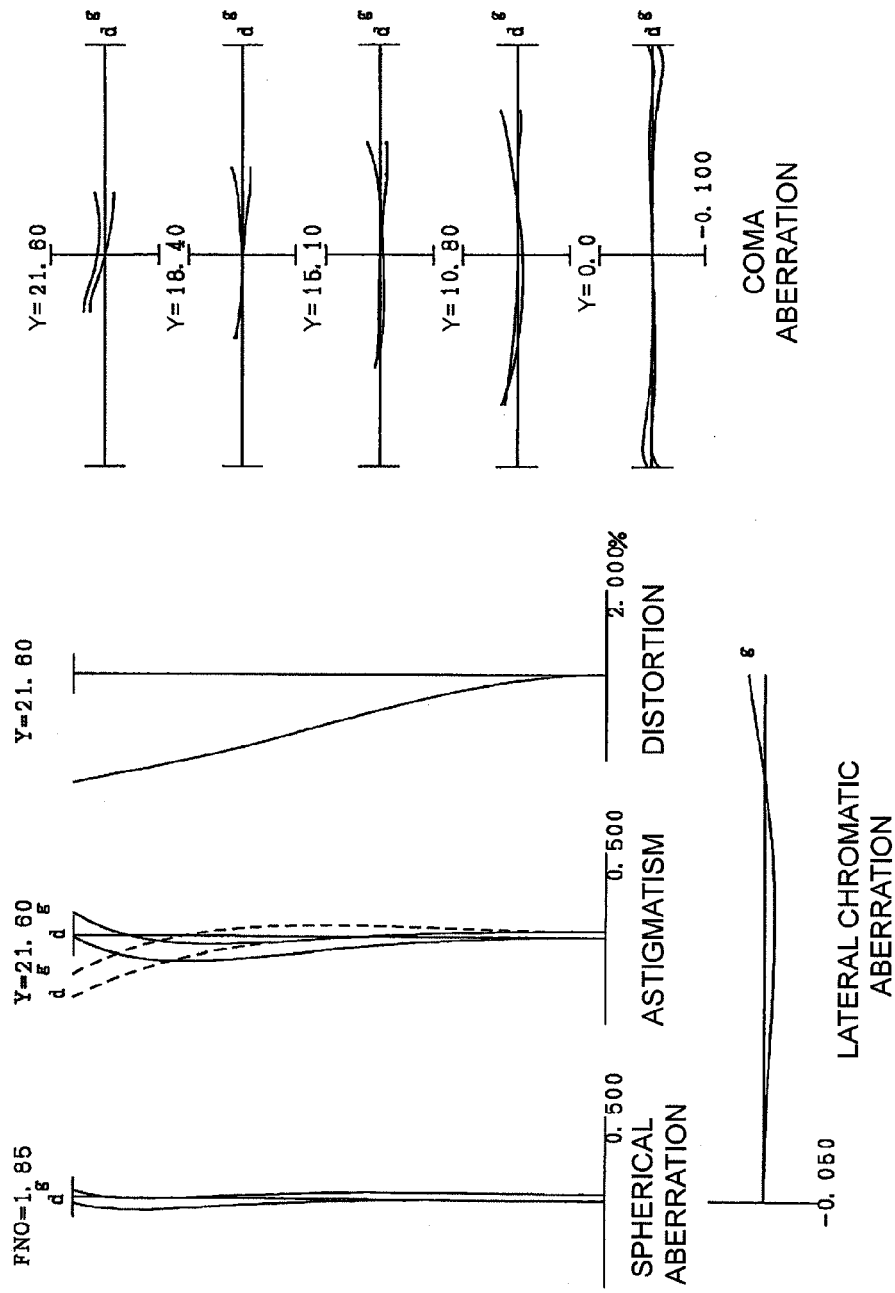
FIG. 17A are graphs showing various aberrations of the optical system upon focusing on infinity according to Example 7, and FIG. 17B are graphs showing various aberrations upon focusing on a close distance (D0=200 mm)
Figure 17B:
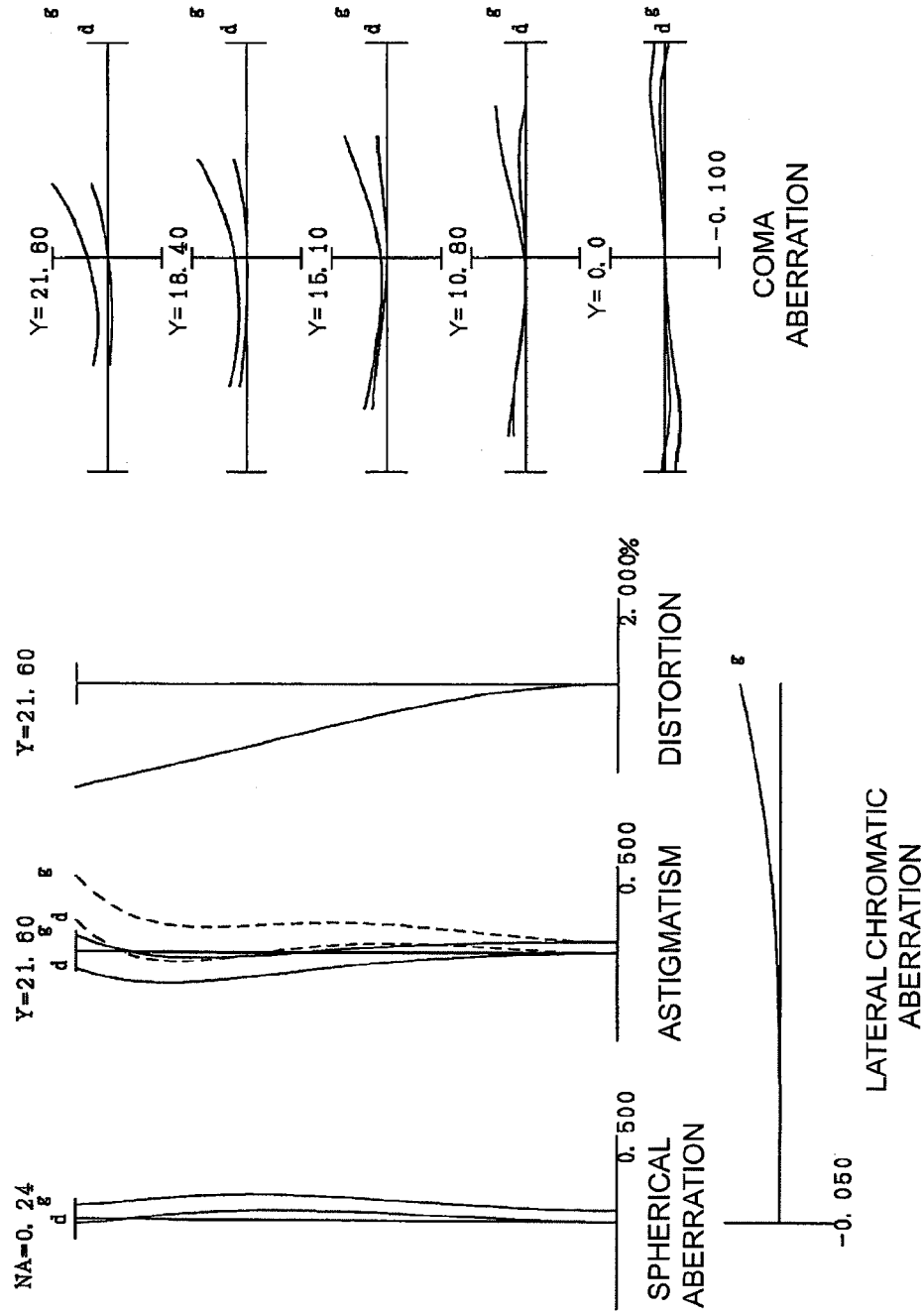

FIG. 17A and FIG. 17B are graphs showing various Aberrations of the optical system WLS 3 according to Example 7. Here FIG. 17A are graphs showing various aberrations upon focusing on infinity, and FIG. 17B are graphs showing various aberrations upon focusing on a short distance (D0=200 mm). In Example 7, as each graph on aberration shows, various aberrations are corrected well, and excellent image forming performance is exhibited. As a result, excellent image forming performance can be ensured for a digital single lens reflex camera CAM as well, by installing the optical system WLS 3 of Example 7.

Example 8

Figure 18:
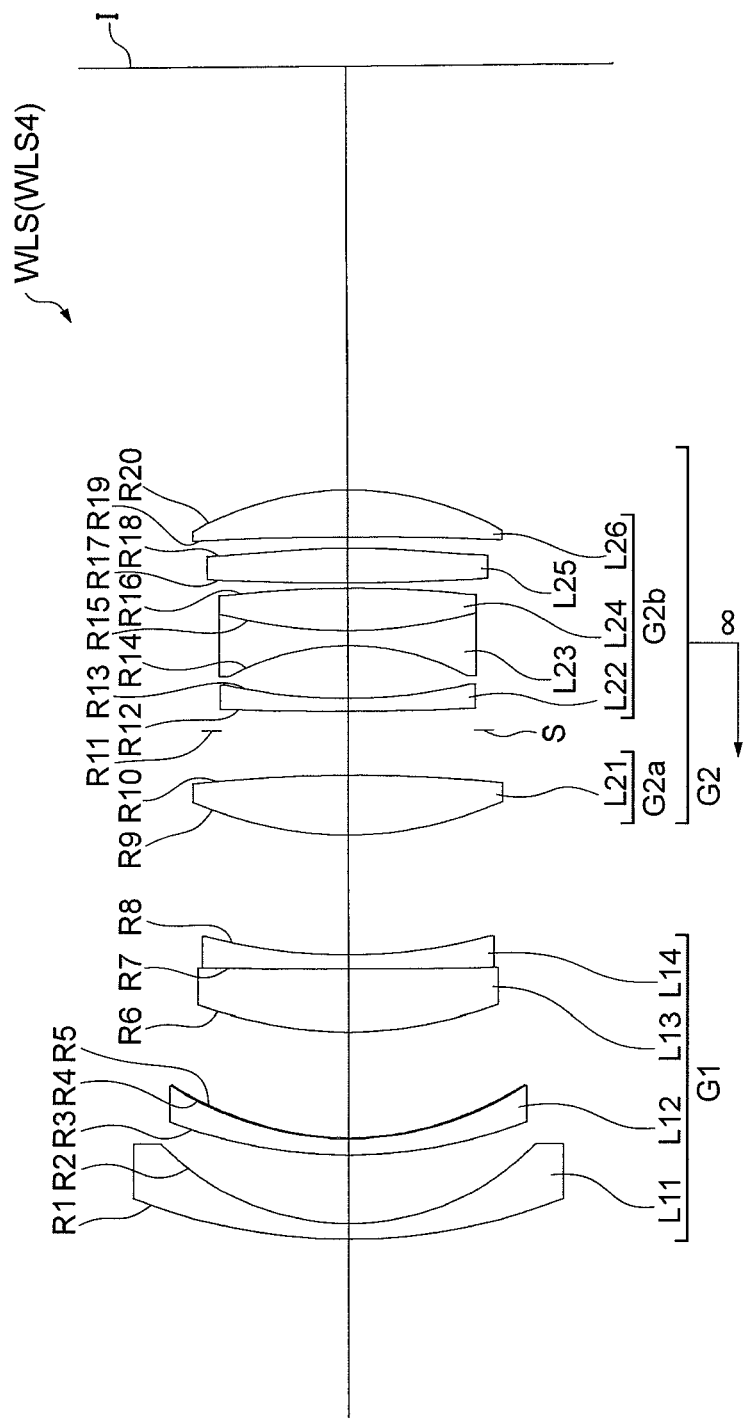
FIG. 18 is a cross-sectional view depicting a lens configuration of an optical system according to Example 8.

Example 8 will now be described with reference to FIG. 18, FIG. 19 and Table 9. FIG. 18 is a sectional view depicting a lens configuration of an optical system WLS (WLS4) according to Example 8. The optical system WSL4 according to Example 8 comprises, in order from an object, a first lens group G1 having negative refractive power, and the second lens group G2 having positive refractive power, and the second lens group G2 further comprises, in order from the object, a front group G2a having positive refractive power, a aperture stop S and a rear group G2b having positive refractive power.

The first lens group G1 includes, in order from an object, a first negative meniscus lens L11 having a convex surface facing the object, a second negative meniscus lens L12 having a convex surface facing the object, and a cemented positive lens where a first positive meniscus lens L13 having a convex surface facing the object and a third meniscus lens L14 having a convex surface facing the object are cemented. In the first lens group G1, the lens surface of the second negative meniscus lens L12 facing the image plane I is aspherical.

The front group G2a of the second lens group G2 includes a first positive lens L21 having a biconvex form. The rear group G2b of the second lens group G2 includes, in order from the object, a fourth negative meniscus lens L22 having a convex surface facing the object, a cemented negative lens where a negative lens L23 having a biconcave form and a second positive lens L24 having a biconvex form are cemented, a third positive lens L25 having a biconvex form, and a second positive meniscus lens L26 having a convex surface facing the image plane I. In the rear group G2b of the second lens group G2, the lens surface of the third positive lens L25 facing the image plane I is aspherical. A later mentioned antireflection coating is formed on a lens surface of the fourth negative meniscus lens L22 facing the image plane I (surface number 13) and a lens surface of the second positive meniscus lens L26 facing the object (surface number 19).

Upon focusing from an object at infinity to an object at a short distance (finite distance), the first lens group G1 is fixed and the second lens group G2 moves. During this time, the front group G2a, the aperture stop S and the rear group G2b of the second lens group G2 move in tandem.

Table 9 shows each data value of Example 8. The radius of curvature R in the surface 1 to surface 20 in Table 9 correspond to the reference symbols R1 to R20 assigned to surface 1 to surface 20 in FIG. 18. In Example 8, the lens surfaces of surface 5 and surface 18 are formed to be aspherical respectively.

TABLE 9

[General Data]

f = 31.00
FNO = 1.84
ω = 35.45
Y = 21.60
TL = 111.05
Bf = 40.08

[Lens Data]

| N | R | D | nd | νd |
|---|---|---|---|---|
| object surface | ∞ | ∞ | | |
| 1 | 54.8755 | 1.5000 | 1.77250 | 49.61 |
| 2 | 24.3470 | 6.4422 | | |
| 3 | 46.8800 | 1.5000 | 1.77250 | 49.61 |
| 4 | 30.0000 | 0.1000 | 1.52050 | 50.97 |
| 5* | 28.1565 | 10.0000 | | |
| 6 | 39.4043 | 6.0000 | 1.83481 | 42.76 |
| 7 | 799.7751 | 1.3000 | 1.51823 | 58.82 |
| 8 | 50.6325 | (d1) | | |
| 9 | 34.7711 | 5.7076 | 1.80400 | 46.58 |
| 10 | −127.3217 | 4.2607 | | |
| 11 | 0.0000 | 1.8217 | | (Aperture stop) |
| 12 | 311.4924 | 1.2000 | 1.58144 | 40.98 |
| 13 | 50.7052 | 5.0000 | | |
| 14 | −23.2205 | 1.4000 | 1.78472 | 25.64 |
| 15 | 45.6877 | 4.0000 | 1.59319 | 67.90 |
| 16 | −102.0531 | 0.5000 | | |
| 17 | 224.5463 | 3.3243 | 1.77250 | 49.62 |
| 18* | −72.9478 | 1.1000 | | |
| 19 | −271.1411 | 4.5000 | 1.80400 | 46.60 |
| 20 | −28.5408 | (Bf) | | |
| image plane | ∞ | | | |

[Aspherical Data]

surface 5

κ = 1.0000, A4 = −3.78292E−06, A6 = −3.64587E−09,
A8 = −1.01198E−11, A10 = 3.37967E−15 surface 18

κ = 1.0000, A4 = 1.43983E−05, A6 = 6.14666E−11,
A8 = 0.00000E+00, A10 = 0.00000E+00

[Variable Distance Data]

| | infinity | short distance |
|---|---|---|
| D0 = | ∞ | 200.0000 |
| d1 = | 11.3148 | 4.5052 |

Figure 19B:
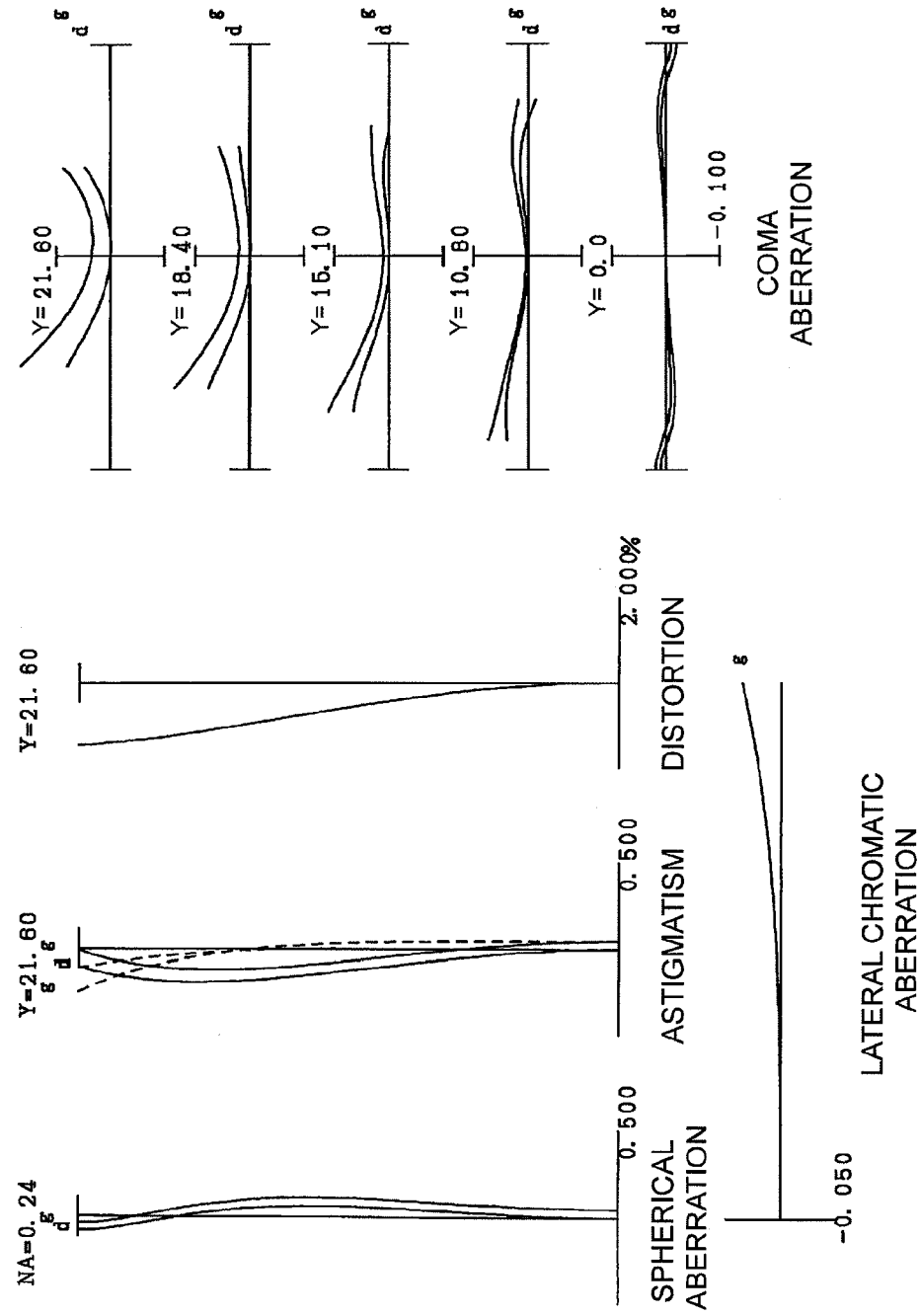
FIG. 19A are graphs showing various aberrations of the optical system upon focusing on infinity according to Example 8, and FIG. 19B are graphs showing various aberrations upon focusing on a close distance (D0=200 mm)

FIG. 19A and FIG. 19B are graphs showing various aberrations of the optical system WLS 4 according to Example 8. Here FIG. 19A are graphs showing various aberrations upon focusing on infinity, and FIG. 19B are graphs showing various aberrations upon focusing on a short distance (D0=200 mm). In Example 8, as each graph on aberration shows, various aberrations are corrected well, and excellent image forming performance is exhibited. As a result, excellent image forming performance can be ensured for a digital single lens reflex camera CAM as well, by installing the optical system WLS 4 of Example 8.

Table 10 shows values corresponding to the conditional expressions according to each example.

TABLE 10

| | Example 5 | Example 6 | Example 7 | Example 8 |
|---|---|---|---|---|
| Conditional expression (9) | 0.43 | 0.87 | 0.66 | 0.38 |
| Conditional expression (10) | 2.03 | 1.90 | 1.52 | 1.79 |
| Conditional expression (11) | 1.33 | 1.56 | 1.57 | 1.11 |
| Conditional expression (12) | 1.37 | 1.33 | 1.38 | 1.28 |
| Conditional expression (13) | 2.78 | 2.53 | 2.10 | 2.29 |
| Conditional expression (14) | 1.83481 | 1.83481 | 1.81600 | 1.83481 |
| Conditional expression (15) | 42.76 | 42.76 | 46.62 | 42.76 |

Thus in each example, each of the conditional expressions is satisfied respectively. As a result, according to Example 5 to Example 8, an optical system (WLS) exhibiting suitable optical performance and an optical apparatus (digital single lens reflex camera CAM) having a good optical performance can be implemented.

Figure 20:
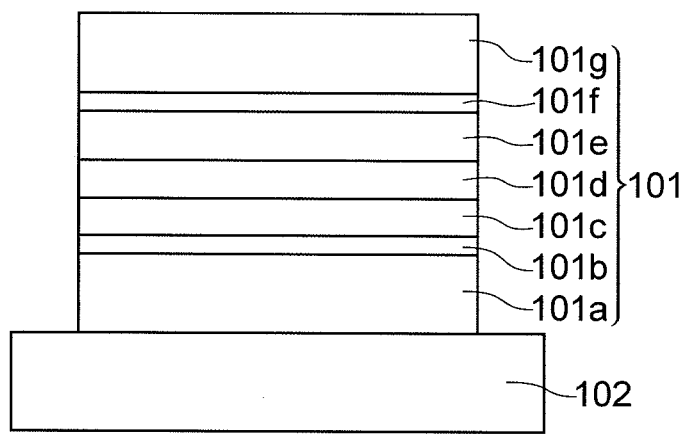
FIG. 20 is a diagram depicting an example of a layer structure of an antireflection coating.

Now the antireflection coating (also called "multilayer broadband antireflection coating") used for the optical system WLS according to the second embodiment will be described. FIG. 20 is a diagram depicting an example of the film configuration of the antireflection coating. The antireflection coating 101 is comprised of seven layers, which are formed on the optical surface of such an optical element 102 as a lens. The first layer 101a, constituted by aluminum oxide, is deposited by a vacuum deposition method. On the first layer 101a, the second layer 101b, constituted by a mixture of titanium oxide and zirconium oxide, is deposited by a vacuum deposition method. Then on the second layer 101b, the third layer 101c, constituted by aluminum oxide, is deposited by a vacuum deposition method, and on the third layer 101c, the fourth layer 101d, formed of a mixture of titanium oxide and zirconium oxide, is deposited by a vacuum deposition method. On the fourth layer 101d, the fifth layer 101e, constituted by aluminum oxide, is deposited by a vacuum deposition method, and on the fifth layer 101e, the sixth layer 101f, constituted by a mixture of titanium oxide and zirconium oxide, is deposited by a vacuum deposition method.

Then on the sixth layer 101f formed like this, the seventh layer 101g, constituted by a mixture of magnesium fluoride and silica, is formed by a wet process, whereby the antireflection coating 101 of the present embodiment is completed. A sol-gel method, which is a type of wet process, is used to form the seventh layer 101g. According to the sol-gel method, sol obtained by mixing materials is transformed into a gel, which does not have fluidity, by hydrolysis, condensation polymerization or the like, and product material is obtained by heating and decomposing the gel. To generate an optical thin film, the optical thin film material sol is coated on an optical surface of the optical element, and is solidified by drying so as to generate a gel film. This wet process is not limited to a sol-gel method, but may be a method for obtaining a solid film that circumvents the gel state.

Thus the first layer 101a to the sixth layer 101f of the antireflection coating 101 are formed by an electron beam deposition, which is a dry process, and the seventh layer 101g, which is the top layer, is formed by a wet process using a sol solution prepared by a hydrofluoric acid/magnesium acetate method, according to the following procedure. First the aluminum oxide layer to be the first layer 101a, the titanium oxide-zirconium oxide-mixed layer to be the second layer 101b, the aluminum oxide layer to be the third layer 101c, the titanium oxide-zirconium oxide-mixed layer to be the fourth layer 101d, the aluminum oxide layer to be the fifth layer 101e, and the titanium oxide-zirconium oxide-mixed layer to be the sixth layer 101f are formed sequentially on the film forming surface (an optical surface of the abovementioned optical element 102) of the lens using a vacuum deposition apparatus. After taking the optical element 102 out of a deposition apparatus, the sol solution, prepared by a hydrofluoric acid/magnesium acetate method to which silicon alkoxide is added, is coated by a spin coat method to form a layer constituted by the mixture of magnesium fluoride and silica to be the seventh layer 101g. The following formula (a) is the reaction formula when the sol solution is prepared by a hydrofluoric acid/magnesium acetate method.

$$2HF + Mg(CH_3COO)_2 \rightarrow MgF_2 + 2CH_3COOH \quad (a)$$

The sol solution used here is used for forming the film after the materials are mixed, and high temperature heating and maturing processing are performed at 140° C. in an autoclave for 24 hours. After the seventh layer 101g is formed, this optical element 102 is air-heated at 160° C. for one hour to completion. By using this sol-gel method, the seventh layer 101g is formed by several nm to several tens nm sized particles that are deposited with voids.

The optical performance of the optical element having the antireflection coating 101 formed like this will be described using the spectral characteristics shown in FIG. 21.

The optical element (lens) having the antireflection coating according to the present embodiment is formed under the conditions shown in Table 11. In Table 11, optical film thickness is determined for each layer 101a (first layer) to 101g (seventh layer) of the antireflection coating 101 when the reference wavelength is λ and the refractive index of this substrate (optical element) is 1.62, 1.74 and 1.85 respectively. In Table 11, $Al_2O_3$ is alumina oxide, $ZrO_2+TiO_2$ is a mixture of titanium oxide and zirconium oxide, and $MgF_2+SiO_2$ is a mixture of magnesium fluoride and silica.

TABLE 11

| | material | refractive index | optical film thickness | optical film thickness | optical film thickness |
|---|---|---|---|---|---|
| medium | air | 1 | | | |
| seventh layer | $MgF_2 + SiO_2$ | 1.26 | 0.268λ | 0.271λ | 0.269λ |
| sixth layer | $ZrO_2 + TiO_2$ | 2.12 | 0.057λ | 0.054λ | 0.059λ |
| fifth layer | $Al_2O_3$ | 1.65 | 0.171λ | 0.178λ | 0.162λ |
| fourth layer | $ZrO_2 + TiO_2$ | 2.12 | 0.127λ | 0.13λ | 0.158λ |
| third layer | $Al_2O_3$ | 1.65 | 0.122λ | 0.107λ | 0.08λ |
| second layer | $ZrO_2 + TiO_2$ | 2.12 | 0.059λ | 0.075λ | 0.105λ |

TABLE 11-continued

| | material | refractive index | optical film thickness | optical film thickness | optical film thickness |
|---|---|---|---|---|---|
| first layer | $Al_2O_3$ | 1.65 | 0.257λ | 0.03λ | 0.03λ |
| substrate refractive index | | | 1.62 | 1.74 | 1.85 |

Figure 21:
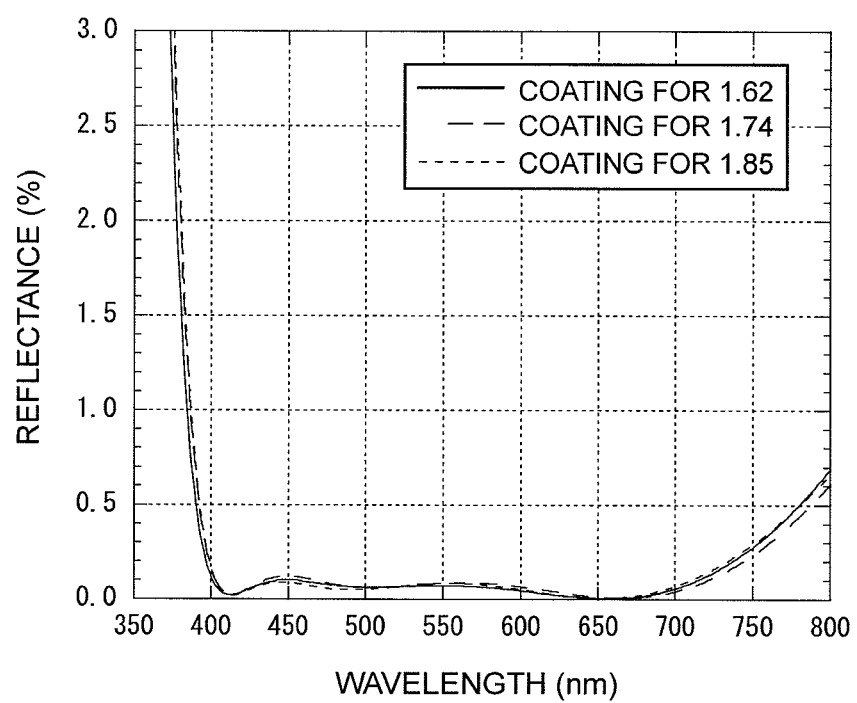
FIG. 21 is a graph depicting a spectral characteristic of each antireflection coating.

FIG. 21 shows the spectral characteristics when a beam vertically enters the optical element having the antireflection coating 101 for which the optical film thickness of each layer is designed according to Table 11, setting the reference wavelength λ to 550 nm.

As FIG. 21 shows, in the optical element having the antireflection coating 101 designed with the reference wavelength λ that is 550 nm, the reflectance can be controlled to be 0.2% or less in the entire wavelength area of the beam, 420 nm to 720 nm. Even if an optical element has the antireflection coating 101 for which each optical film thickness is designed, setting the reference wavelength λ to that of d-line (wavelength: 587.6 nm) in Table 11, the spectral Characteristics are hardly influenced, and are approximately the same as the case of the reference wavelength λ that is 550 nm shown in FIG. 21.

Now a variant form of the antireflection coating will be described. The antireflection coating of the variant form is constituted by five layers, and similarly to the Table 11 the optical film thickness of each layer, with respect to the reference wavelength λ, is designed under the conditions shown in Table 12. According to the variant form, the above mentioned sol-gel method is used for forming the fifth layer.

TABLE 12

| | material | refractive index | optical film thickness | optical film thickness |
|---|---|---|---|---|
| medium | air | 1 | | |
| fifth layer | $MgF_2 + SiO_2$ | 1.26 | 0.275λ | 0.269λ |
| fourth layer | $ZrO_2 + TiO_2$ | 2.12 | 0.045λ | 0.043λ |
| third layer | $Al_2O_3$ | 1.65 | 0.212λ | 0.217λ |
| second layer | $ZrO_2 + TiO_2$ | 2.12 | 0.077λ | 0.066λ |
| first layer | $Al_2O_3$ | 1.65 | 0.288λ | 0.290λ |
| substrate refractive index | | | 1.46 | 1.52 |

Figure 22:
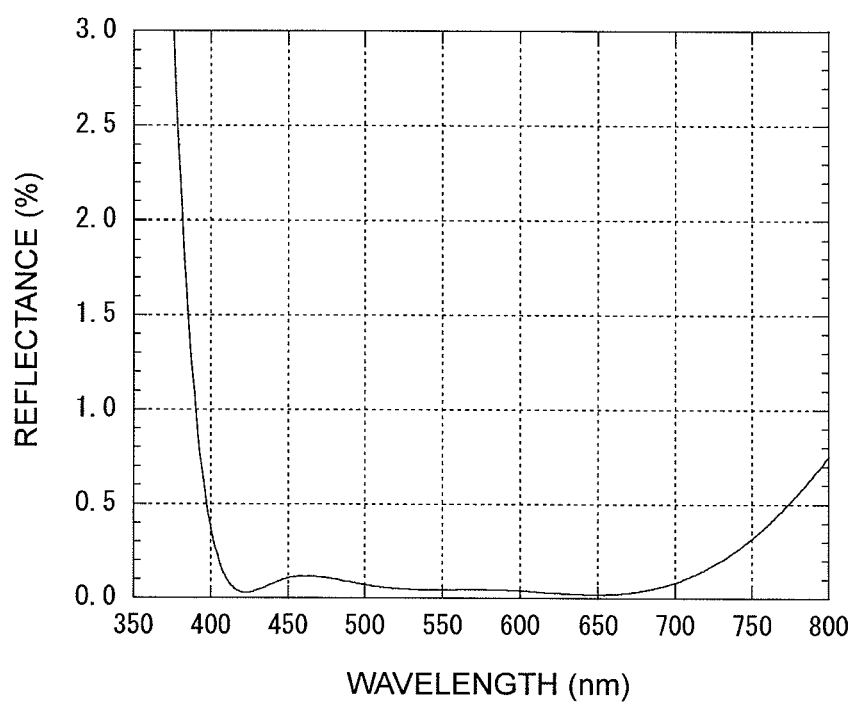
FIG. 22 is a graph depicting a spectral characteristic of an antireflection coating according to a variant form.

FIG. 22 shows the spectral characteristics when a beam vertically enters the optical element having the antireflection coating for which the optical film thickness of each layer is designed according to Table 12, setting the refractive index of the substrate to 1.52 and the reference wavelength λ to 550 nm. As FIG. 22 shows, in the antireflection coating of the variant form, the reflectance can be controlled to be 0.2% or less in the entire wavelength area of the beam, 420 nm to 720 nm. Even if the optical element has the antireflection coating for which each optical film thickness is designed, setting the reference wavelength λ to that of d-line (wavelength: 587.6 nm) in Table 12, the spectral characteristics are hardly influenced, and are approximately the same as in the case of the spectral characteristics shown in FIG. 22.

Figure 23:
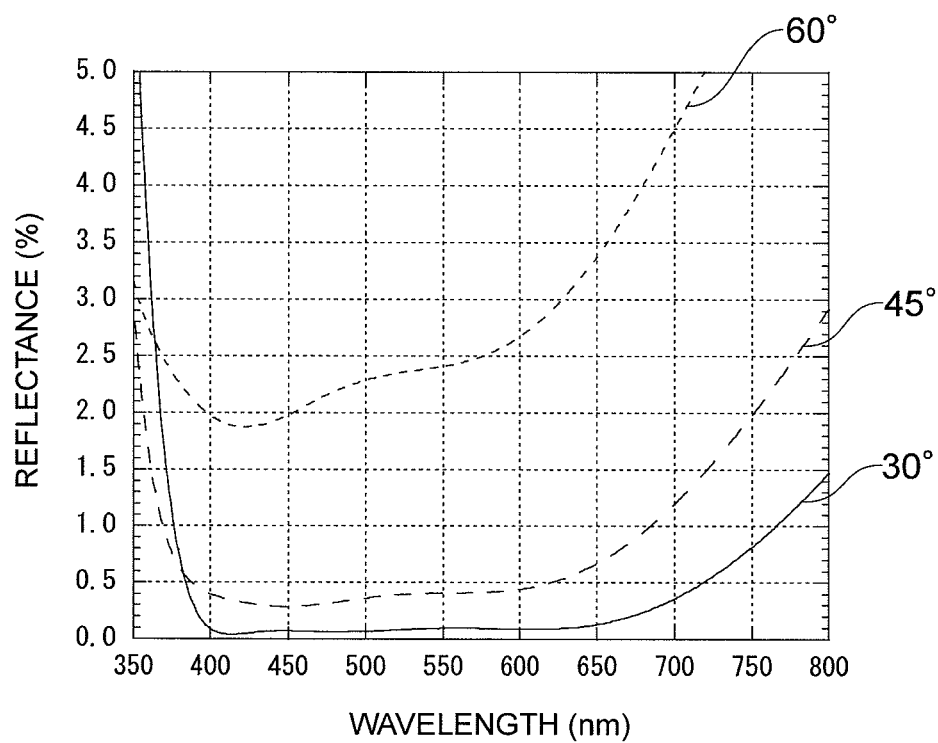
FIG. 23 is a graph depicting an incident angle dependency in the spectral characteristic of the antireflection coating according to the variant form.

FIG. 23 shows spectral characteristics when the incident angle of the beam to the optical element having the spectral Characteristics shown in FIG. 22, is 30°, 45° and 60° respectively. FIG. 22 and FIG. 23 do not include the spectral characteristics of the optical element having the antireflection coating of which substrate refractive index is 1.46, as shown in FIG. 12, but the spectral characteristics are approximately the same as those of the case of the substrate refractive index is 1.52.

Figure 24:
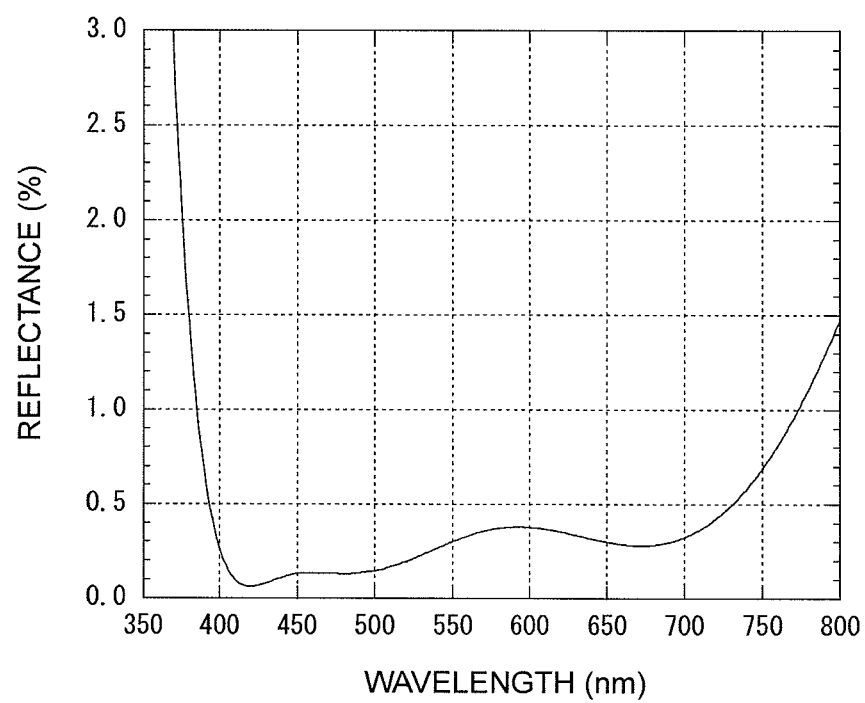
FIG. 24 is a graph depicting a spectral characteristic of an antireflection coating formed according to a prior art.
Figure 25:
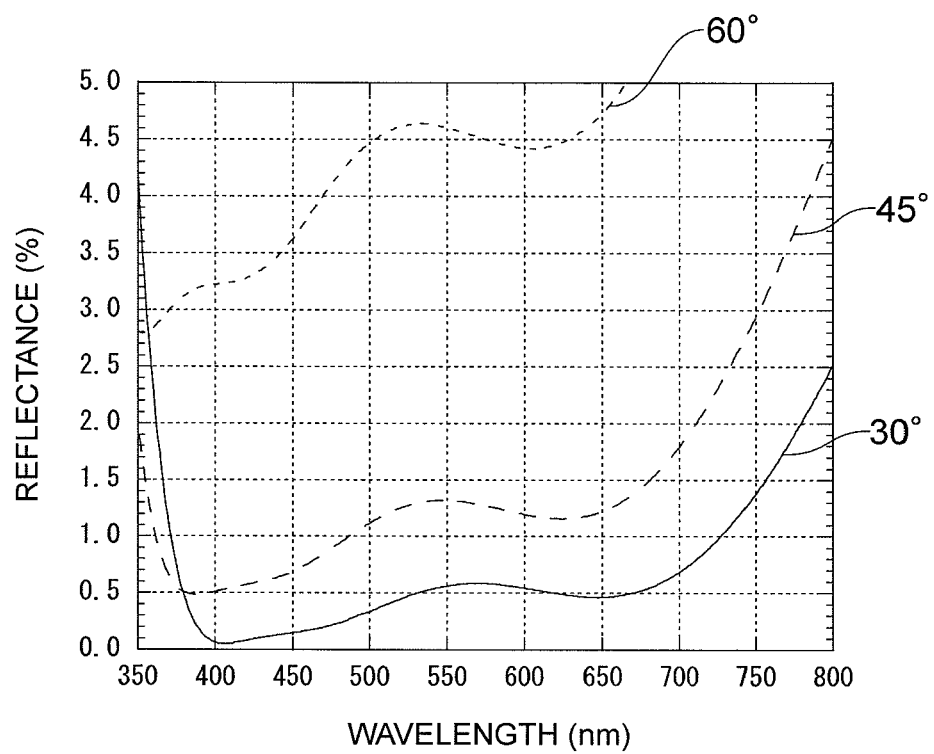
FIG. 25 is a graph depicting an incident angle dependency in the spectral characteristic of the antireflection coating formed according to the prior art.

For comparison, an example of an antireflection coating formed using only a dry process, such as a conventional vacuum deposition method, is shown in FIG. 24. FIG. 24 shows spectral characteristics when a beam vertically enters an optical element of which antireflection coating is designed under the conditions shown in Table 13, with the substrate refractive index 1.52, which is the same as in Table 12. FIG. 25 shows spectral characteristics when the incident angle of the beam to the optical elements having the spectral characteristics shown in FIG. 24 is 30°, 45° and 60° respectively.

TABLE 13

| | material | refractive index | optical film thickness |
| --- | --- | --- | --- |
| medium | air | 1 | |
| seventh layer | $MgF_2$ | 1.39 | 0.243λ |
| sixth layer | $ZrO_2 + TiO_2$ | 2.12 | 0.119λ |
| fifth layer | $Al_2O_3$ | 1.65 | 0.057λ |
| fourth layer | $ZrO_2 + TiO_2$ | 2.12 | 0.220λ |
| third layer | $Al_2O_3$ | 1.65 | 0.064λ |
| second layer | $ZrO_2 + TiO_2$ | 2.12 | 0.057λ |
| first layer | $Al_2O_3$ | 1.65 | 0.193λ |
| substrate refractive index | | 1.52 | |

As shown in the comparison of the spectral characteristics of the optical element having the antireflection coating according to the present embodiment in FIG. 21 to FIG. 23 with the spectral characteristics of prior art in FIG. 24 and FIG. 25, the antireflection coating according to the present embodiment has low reflectance at any incident angle, and the reflectance thereof is low in wide band zones.

Examples of applying the antireflection coatings shown in Table 11 and Table 12 to Example 5 to Example 8 of the present invention will now be described.

In the optical system WLS1 of Example 5, the refractive index nd of the third negative meniscus lens L22 constituting the second lens group G2 is nd=1.51742, as shown in Table 6, and the refractive index nd of the fourth positive lens L25 constituting the second lens group G2 is nd=1.77250. Therefore the antireflection coating 101, corresponding to the substrate refractive index 1.52 (see Table 12), is used for the lens surface of the third negative meniscus lens L22 facing the image plane I, and the antireflection coating, corresponding to the substrate refractive index 1.74 (see Table 11), is used for the lens surface of the fourth positive lens L25 facing the image plane I. The lens surface of the third negative meniscus lens L22 facing the image plane I (surface 14) is a lens surface having a concave form when viewed from the image plane I, and the lens surface of the fourth positive lens L25 facing the image plane I (surface 19) is a lens surface having a concave form when viewed from the aperture stop S. Thereby reflected light from each lens surface (surface 14 and surface 19) can be decreased, and ghosts and flares can be decreased.

In the optical system WLS2 of Example 6, the refractive index nd of the first negative meniscus lens L11 constituting the first lens group G1 is nd=1.69679, as shown in Table 7, and the refractive index nd of the second negative meniscus lens L12 constituting the first lens group G1 is nd=1.51680. Therefore the antireflection coating 101, corresponding to the substrate refractive index 1.74 (see Table 11), is used for the lens surface of the first negative meniscus lens L11 facing the image plane I, and the antireflection coating, corresponding to the substrate refractive index 1.52 (see Table 12), is used for the lens surface of the second negative meniscus lens L12 facing the object. The lens surface of the first negative meniscus lens L11 facing the image plane I (surface 2) is a lens surface having a concave form when viewed from the aperture stop S, and the lens surface of the second negative meniscus lens L12 facing the object (surface 3) is a lens surface having a concave form when viewed from the aperture stop S. Thereby reflected light from each lens surface (surface 2 and surface 3) can be decreased, and ghosts and flares can be decreased.

In the optical system WLS3 of Example 7, the refractive index of the fourth negative meniscus lens L22 constituting the second lens group G2 is nd=1.75519, as shown in Table 8. Therefore the antireflection coating, corresponding to the substrate refractive index 1.74 (see Table 11) is used for the lens surface of the fourth negative meniscus lens L22 facing the object. The lens surface of the fourth negative meniscus lens L22 facing the object (surface 12) is a lens surface having a concave form when viewed from the image plane I. Thereby reflected light from the lens surface (surface 12) can be decreased, and ghosts and flares can be decreased.

In the optical system WLS4 of Example 8, the refractive index of the fourth negative meniscus lens L22 constituting the second lens group G2 is nd=1.58144, as shown in Table 9, and the refractive index of the second positive meniscus lens L26 constituting the second lens group G2 is nd=1.80400. Therefore the antireflection coating 101, corresponding to the substrate refractive index 1.62 (see Table 11), is used for the lens surface of the fourth negative meniscus lens L22 facing the image plane I, and the antireflection coating, corresponding to the substrate refractive index 1.85 (see Table 11), is used for the lens surface of the second positive meniscus lens L26 facing the object. The lens surface of the fourth negative meniscus lens L22 facing the image plane I (surface 13) is a lens surface having a concave form when viewed from the image plane I, and the lens surface of the second positive meniscus lens L26 facing the object (surface 19) is a lens surface having a concave form when viewed from the aperture stop S. Thereby reflected light from each lens surface (surface 13 and surface 19) can be decreased, and ghosts and flares can be decreased.

In each of the above embodiments, the following contents can be adopted within a range where the optical performance is not diminished.

In each of the examples, a two-lens group configuration was shown, but the present invention can also be applied to a configuration using a different number of lens groups, such as three or four lens groups. In the configuration, a lens or a lens group may be added to the side closest to the object, or a lens or a lens group may be added to the side closest to the image. A "lens group" refers to a portion having at least one lens isolated by an air space which changes upon zooming.

A single or a plurality of lens group(s) or a partial lens group may be designed to be a focusing lens group which performs focusing from an object at infinity to an object at a short distance by moving in the optical axis direction. The focusing lens group can be applied to auto focus, and is also suitable for driving a motor for auto focusing (e.g. driving using an ultrasonic motor). It is particularly preferable that at least a part of the second lens group is designed to be the focusing lens group.

A lens group or a partial lens group may be designed to be a vibration-isolation lens group, which corrects image blurs generated by hand motion by moving the lens group or the partial lens group in a direction perpendicular to the optical axis, or rotating (oscillating) the lens group or the partial lens group in an in-plane direction including the optical axis. It is particularly preferable that at least a part of the rear group of the second lens group is designed to be the vibration-isolation lens group.

The lens surface may be formed to be a spherical surface or a plane, or an aspherical surface. In the case of a spherical surface or a plane, lens processing, assembly and adjustment are easy, and deterioration of optical performance due to an error in processing, assembly and adjustment can be prevented. Even if the image plane is shifted, the drawing performance is not affected very much, which is desirable. If the lens surface is aspherical, the aspherical surface can be any of: an aspherical surface generated by grinding, a glass molded aspherical surface generated by forming glass in an aspherical shape using a die, and a composite aspherical surface generated by forming resin on the surface of the glass into an aspherical shape. The lens surface may be a diffraction surface, and the lens may be a refractive index distributed lens (GRIN lens), or a plastic lens.

It is desirable that the aperture stop is disposed near the second lens group, but the role of the aperture stop may be substituted by the frame of the lens, without disposing a separate element as an aperture stop.

Each lens surface may be coated with an antireflection coating which has high transmittance in a wide wavelength region, in order to decrease ghosts and flares, and implement a high optical performance with high contrast.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical system comprising: in order from an object, a first lens group having negative refractive power; and a second lens group having positive refractive power, the first lens group being fixed and the second lens group moving upon focusing from an object at infinity to an object at a finite distance, the second lens group being formed of a front group located closer to the object than an aperture stop disposed in the second lens group, and a rear group located closer to an image than the aperture stop, and the following conditional expression being satisfied:

$$0.10 < f2a/f2b < 1.00$$

where $f2a$ denotes a focal length of the front group of the second lens group, and $f2b$ denotes a focal length of the rear group of the second lens group.

2. The optical system according to claim 1, wherein the following conditional expression is satisfied:

$$0.10 < (-f1)/f2 < 2.50$$

where $f1$ denotes a focal length of the first lens group, and $f2$ denotes a focal length of the second lens group.

3. The optical system according to claim 1, wherein the following conditional expression is satisfied:

$$0.10 < f2a/f < 1.70$$

where f denotes a focal length of the optical system upon focusing on infinity.

4. The optical system according to claim 1, wherein the following conditional expression is satisfied:

$$0.20 < f2/f < 1.55$$

where $f2$ denotes a focal length of the second lens group, and f denotes a focal length of the optical system upon focusing on infinity.

5. The optical system according to claim 1, wherein the rear group of the second lens group has at least one aspherical lens.

6. The optical system according to claim 1, wherein the rear group of the second lens group has two positive lenses disposed in order from the image.

7. The optical system according to claim 1, wherein the following conditional expression is satisfied:

$$(-f1)/f < 5.0$$

where $f1$ denotes a focal length of the first lens group, and f denotes a focal length of the optical system upon focusing on infinity.

8. The optical system according to claim 1, wherein the first lens group has two negative lenses disposed in order from the object.

9. The optical system according to claim 1, wherein the first lens group has at least one aspherical lens.

10. The optical system according to claim 1, wherein the first lens group has a positive lens, and the following conditional expressions are satisfied respectively:

$$n1p > 1.800$$

$$v1p > 28.00$$

where $n1p$ denotes a mean value of refractive indexes of the positive lenses, and $v1p$ denotes a mean value of Abbe numbers of the positive lenses.

11. The optical system according to claim 1, wherein the front group and the rear group of the second lens group move in tandem along an optical axis upon focusing from an object at infinity to an object at a finite distance.

12. An optical apparatus having an optical system which forms an image of an object on a predetermined surface, the optical system being the optical system according to claim 1.

13. The optical system according to claim 1, wherein an antireflection coating is formed at least on one surface of the optical surfaces of the first lens group and the second lens group, and the antireflection coating is structured to include at least one layer formed using a wet process.

14. The optical system according to claim 13, wherein the antireflection coating is a multilayer film, and the layer formed using the wet process is a layer on the outermost surface of layers constituting the multilayer film.

15. The optical system according to claim 13, wherein the refractive index of the layer formed using the wet process is 1.30 or less.

16. The optical system according to claim 13, wherein the antireflection coating is formed on the optical surface having a concave form when viewed from the aperture stop.

17. The optical system according to claim 16, wherein the optical surface having a concave form when viewed from the aperture stop is a lens surface closest to the object in the lenses of the first lens group and the second lens group.

18. The optical system according to claim 16, wherein the optical surface having a concave form when viewed from the aperture stop is a lens surface closest to the image in the lenses of the first lens group and the second lens group.

19. The optical system according to claim 13, wherein the antireflection coating is formed on the optical surface having a concave form when viewed from the image plane.

20. The optical system according to claim 19, wherein the optical surface having a concave form when viewed from the image plane is a lens surface closest to the object in the lenses of the second lens group.

21. The optical system according to claim 19, wherein the optical surface having a concave form when viewed from the image plane is a lens surface closest to the image in the lenses of the second lens group.

22. A method for manufacturing an optical system having, in order from an object, a first lens group having negative refractive power, and a second lens group having positive refractive power,
the method comprising assembling each lens group in a lens barrel such that:
the first lens group is fixed and the second lens group is moved upon focusing from an object at infinity to an object at a finite distance,
the second lens group is formed by a front group located closer to the object than an aperture stop disposed in the second lens group, and a rear group located closer to an image than the aperture stop, and
the following conditional expression is satisfied:

$$0.10 < f2a/f2b < 1.00$$

where f2a denotes a focal length of the front group of the second lens group, and f2b denotes a focal length of the rear group of the second lens group.

23. The method for manufacturing the optical system according to claim 22, wherein an antireflection coating is formed at least on one surface of the optical surfaces of the first lens group and the second lens group, and the antireflection coating is structured to include at least one layer formed using a wet process.

24. An optical system comprising: in order from an object, a first lens group having negative refractive power; and a second lens group having positive refractive power,
the first lens group being fixed and the second lens group moving upon focusing from an object at infinity to an object at a finite distance, and
the following conditional expressions being satisfied respectively:

$$0.10 < (-f1)/f2 < 2.50$$

$$0.20 < f2/f < 1.55$$

where f1 denotes a focal length of the first lens group, f2 denotes a focal length of the second lens group, and f denotes a focal length of the optical system upon focusing on infinity.

25. The optical system according to claim 24, wherein the second lens group is formed of a front group located closer to the object than an aperture stop disposed in the second lens group, and a rear group located closer to an image than the aperture stop, and
the following conditional expression is satisfied:

$$0.10 < f2a/f2b < 1.00$$

where f2a denotes a focal length of the front group of the second lens group, and f2b denotes a focal length of the rear group of the second lens group.

26. The optical system according to claim 24, wherein the second lens group is formed of a front group located closer to the object than an aperture stop disposed in the second lens group, and a rear group located closer to an image than the aperture stop, and
the following conditional expression is satisfied:

$$0.10 < f2a/f < 1.70$$

where f2a denotes a focal length of the front group of the second lens group.

27. The optical system according to claim 24, wherein the second lens group is formed of a front group located closer to the object than an aperture stop disposed in the second lens group, and a rear group located closer to an image than the aperture stop, and
the rear group of the second lens group has at least one aspherical lens.

28. The optical system according to claim 24, wherein the second lens group is formed of a front group located closer to the object than an aperture stop disposed in the second lens group, and a rear group located closer to an image than the aperture stop, and
the rear group of the second lens has two positive lenses disposed in order from the image.

29. The optical system according to claim 24, wherein the following conditional expression is satisfied:

$$(-f1)/f < 5.0.$$

30. The optical system according to claim 24, wherein the first lens group has two negative lenses disposed in order from the object.

31. The optical system according to claim 24, wherein the first lens group has at least one aspherical lens.

32. The optical system according to claim 24, wherein the first lens group has a positive lens, and
the following conditional expressions are satisfied respectively:

$$n1p > 1.800$$

$$v1p > 28.00$$

where $n1p$ denotes a mean value of refractive indexes of the positive lenses, and $v1p$ denotes a mean value of Abbe numbers of the positive lenses.

33. The optical system according to claim 24, wherein the second lens group is formed of a front group located closer to the object than an aperture stop disposed in the second group, and a rear group located closer to an image than the aperture stop, and
the front group and the rear group of the second lens group move in tandem along an optical axis upon focusing from an object at infinity to an object at a finite distance.

34. An optical apparatus having an optical system which forms an image of an object on a predetermined surface,
the optical system being the optical system according to claim 24.

35. The optical system according to claim 24, wherein an antireflection coating is formed at least on one surface of the optical surfaces of the first lens group and the second lens group, and the antireflection coating is structured to include at least one layer formed using a wet process.

36. The optical system according to claim 35, wherein the antireflection coating is a multilayer film, and the layer formed using the wet process is a layer on the outermost surface of layers constituting the multilayer film.

37. The optical system according to claim 35, wherein the refractive index of the layer formed using the wet process is 1.30 or less.

38. The optical system according to claim 35, wherein an aperture stop is disposed in the second lens group, and
the antireflection coating is formed on the optical surface having a concave form when viewed from the aperture stop.

39. The optical system according to claim 38, wherein the optical surface having a concave form when viewed from the aperture stop is a lens surface closest to the object in the first lens group and in the second lens group.

40. The optical system according to claim 38, wherein the optical surface having a concave form when viewed from the aperture stop is a lens surface closest to the image in the lenses of the first lens group and the second lens group.

41. The optical system according to claim 35, wherein the antireflection coating is formed on the optical surface having a concave form when viewed from the image plane.

42. The optical system according to claim 41, wherein the optical surface having a concave form when viewed from the image plane is a lens surface closest to the object in the lenses of the second lens group.

43. The optical system according to claim 41, wherein the optical surface having a concave form when viewed from the image plane is a lens surface closest to the image in the lenses of the second lens group.

44. A method for manufacturing an optical system having, in order from an object, a first lens group having negative refractive power; and a second lens group having positive refractive power,
the method comprising assembling each lens group in a lens barrel such that:
the first lens group is fixed and the second lens group is moved upon focusing from an object at infinity to an object at a finite distance, and
the following conditional expressions are satisfied respectively:

$$0.10 < (-f1)/f2 < 2.50$$

$$0.20 < f2/f < 1.55$$

where f1 denotes a focal length of the first lens group, f2 denotes a focal length of the second lens group, and f denotes a focal length of the optical system upon focusing on infinity.

45. The method for manufacturing the optical system according to claim 44, wherein an antireflection coating is formed at least on one surface of the optical surfaces of the first lens group and the second lens group, and the antireflection coating is structured to include at least one layer formed using a wet process.

46. An optical system comprising: in order from an object, a first lens group having negative refractive power; and a second lens group having positive refractive power,
the first lens group being fixed and the second lens group moving upon focusing from an object at infinity to an object at a finite distance,
the second lens group being formed of a front group located closer to the object than an aperture stop disposed in the second lens group, and a rear group located closer to an image than the aperture stop, and
the following conditional expression being satisfied:

$$0.10 < f2a/f < 1.70$$

where f2a denotes a focal length of the front group of the second lens group, and f denotes a focal length of the optical system upon focusing on infinity.

47. The optical system according to claim 46, wherein the following conditional expression is satisfied:

$$0.10 < f2a/f2b < 1.00$$

where f2b denotes a focal length of the rear group of the second lens group.

48. The optical system according to claim 46, wherein the following conditional expression is satisfied:

$$0.10 < (-f1)/f2 < 2.50$$

where f1 denotes a focal length of the first lens group, and f2 denotes a focal length of the second lens group.

49. The optical system according to claim 46, wherein the following conditional expression is satisfied:

$$0.20 < f2/f < 1.55$$

where f2 denotes a focal length of the second lens group.

50. The optical system according to claim 46, wherein the rear group of the second lens group has at least one aspherical lens.

51. The optical system according to claim 46, wherein the rear group of the second lens group has two positive lenses disposed in order from the image.

52. The optical system according to claim 46, wherein the following conditional expression is satisfied:

$$(-f1)/f < 5.0$$

where f1 denotes a focal length of the first lens group.

53. The optical system according to claim 46, wherein the first lens group has two negative lenses disposed in order from the object.

54. The optical system according to claim 46, wherein the first lens group has at least one aspherical lens.

55. The optical system according to claim 46, wherein the first lens group has a positive lens, and
the following conditional expressions are satisfied respectively:

$$n1p > 1.800$$

$$\nu 1p > 28.00$$

where n1p denotes a mean value of refractive indexes of the positive lenses, and ν1p denotes a mean value of Abbe numbers of the positive lenses.

56. The optical system according to claim 46, wherein the front group and the rear group of the second lens group move in tandem along an optical axis upon focusing from an object at infinity to an object at a finite distance.

57. An optical apparatus having an optical system which forms an image of an object on a predetermined surface,
the optical system being the optical system according to claim 46.

58. The optical system according to claim 46, wherein an antireflection coating is formed at least on one surface of the optical surfaces of the first lens group and the second lens group, and the antireflection coating is structured to include at least one layer formed using a wet process.

59. The optical system according to claim 58, wherein the antireflection coating is a multilayer film, and
the layer formed using the wet process is a layer on the outermost surface of layers constituting the multilayer film.

60. The optical system according to claim 58, wherein the refractive index of the layer formed using the wet process is 1.30 or less.

61. The optical system according to claim 58, wherein the antireflection coating is formed on the optical surface having a concave form when viewed from the aperture stop.

62. The optical system according to claim 61, wherein the optical surface having a concave form when viewed from the aperture stop is a lens surface closest to the object in the first lens group and that in the second lens group.

63. The optical system according to claim 61, wherein the optical surface having a concave form when viewed from the aperture stop is a lens surface closest to the image in the lenses of the first lens group and the second lens group.

64. The optical system according to claim 58, wherein the antireflection coating is formed on the optical surface having a concave form when viewed from the image plane.

65. The optical system according to claim 64, wherein the optical surface having a concave form when viewed from the image plane is a lens surface closest to the object in the lenses of the second lens group.

66. The optical system according to claim 64, wherein the optical surface having a concave form when viewed from the image plane is a lens surface closest to the image in the lenses of the second lens group.

67. A method for manufacturing an optical system comprising, in order from an object, a first lens group having negative refractive power; and a second lens group having positive refractive power, the method comprising assembling each lens group in a lens barrel such that:

the first lens group is fixed and the second lens group is moved upon focusing from an object at infinity to an object at a finite distance, the second lens group is formed of a front group located closer to the object than an aperture stop disposed in the second lens group, and a rear group located closer to an image than the aperture stop, and the following conditional expression is satisfied:

$$0.10 < f2a/f < 1.70$$

where $f2a$ denotes a focal length of the front group of the second lens group, and f denotes a focal length of the optical system upon focusing on infinity.

68. The method for manufacturing the optical system according to claim 67, wherein an antireflection coating is formed at least on one surface of the optical surfaces of the first lens group and the second lens group, and the antireflection coating is structured to include at least one layer formed using a wet process.

* * * * *